United States Patent
Takashima et al.

(10) Patent No.: US 7,930,632 B2
(45) Date of Patent: Apr. 19, 2011

(54) INFORMATION PROCESSING APPARATUS, CONTROL METHOD THEREFOR, AND COMPUTER-READABLE MEDIUM DISPLAYING A LAYOUT RESULT ON THE BASIS OF ADJUSTMENT RECORD INFORMATION STORED WITH RESPECT TO A PREDETERMINED RECORD

(75) Inventors: Keiichi Takashima, Kawasaki (JP); Hiroyasu Miyazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 11/211,516

(22) Filed: Aug. 26, 2005

(65) Prior Publication Data

US 2006/0066905 A1  Mar. 30, 2006

(30) Foreign Application Priority Data

Aug. 27, 2004 (JP) .................................. 2004-249017

(51) Int. Cl.
*G06F 17/00* (2006.01)
(52) U.S. Cl. ........ 715/243; 715/244; 715/246; 715/255; 715/271
(58) Field of Classification Search .......... 715/255–256, 715/243–247, 252, 271
See application file for complete search history.

(56) References Cited

U.S. PATENT DOCUMENTS

| | | | | |
|---|---|---|---|---|
| 5,701,500 A * | 12/1997 | Ikeo et al. | ...................... | 715/209 |
| 5,845,303 A | 12/1998 | Templeman | | |
| 5,943,679 A * | 8/1999 | Niles et al. | ..................... | 715/247 |
| 6,222,947 B1 * | 4/2001 | Koba | ............................. | 382/284 |
| 6,727,909 B1 * | 4/2004 | Matsumura et al. | .......... | 345/629 |
| 6,826,727 B1 * | 11/2004 | Mohr et al. | .................... | 715/235 |
| 7,051,276 B1 * | 5/2006 | Mogilevsky et al. | ......... | 715/209 |
| 7,133,050 B2 * | 11/2006 | Schowtka | ...................... | 345/620 |
| 7,184,167 B1 | 2/2007 | Ito et al. | | |
| 2002/0040375 A1 * | 4/2002 | Simon et al. | .................. | 707/517 |
| 2003/0023627 A1 * | 1/2003 | Kerr | ............................. | 707/507 |
| 2003/0123756 A1 * | 7/2003 | Yamamoto | .................... | 382/309 |
| 2004/0225961 A1 * | 11/2004 | Ohashi et al. | .................. | 715/517 |
| 2005/0071743 A1 * | 3/2005 | Harrington et al. | ........... | 715/500 |
| 2006/0031762 A1 | 2/2006 | Takashima | | |
| 2008/0098326 A1 * | 4/2008 | Kanzaki | ....................... | 715/783 |

FOREIGN PATENT DOCUMENTS

| | | |
|---|---|---|
| JP | 7-129658 | 5/1995 |
| JP | 2001-92820 | 4/2001 |
| JP | 2001-101179 | 4/2001 |
| WO | WO 01/39019 | 5/2001 |

* cited by examiner

*Primary Examiner* — Thu Huynh
(74) *Attorney, Agent, or Firm* — Fitzpatrick Cella Harper & Scinto

(57) ABSTRACT

A page in which field areas are laid out is displayed on the basis of a template. A field area to be adjusted is selected from the field areas in the page. The field area is adjusted on the basis of adjustment operation to the selected field area. Adjustment page information on the page in which the field area has been adjusted is stored in addition to page information on the displayed page.

6 Claims, 40 Drawing Sheets

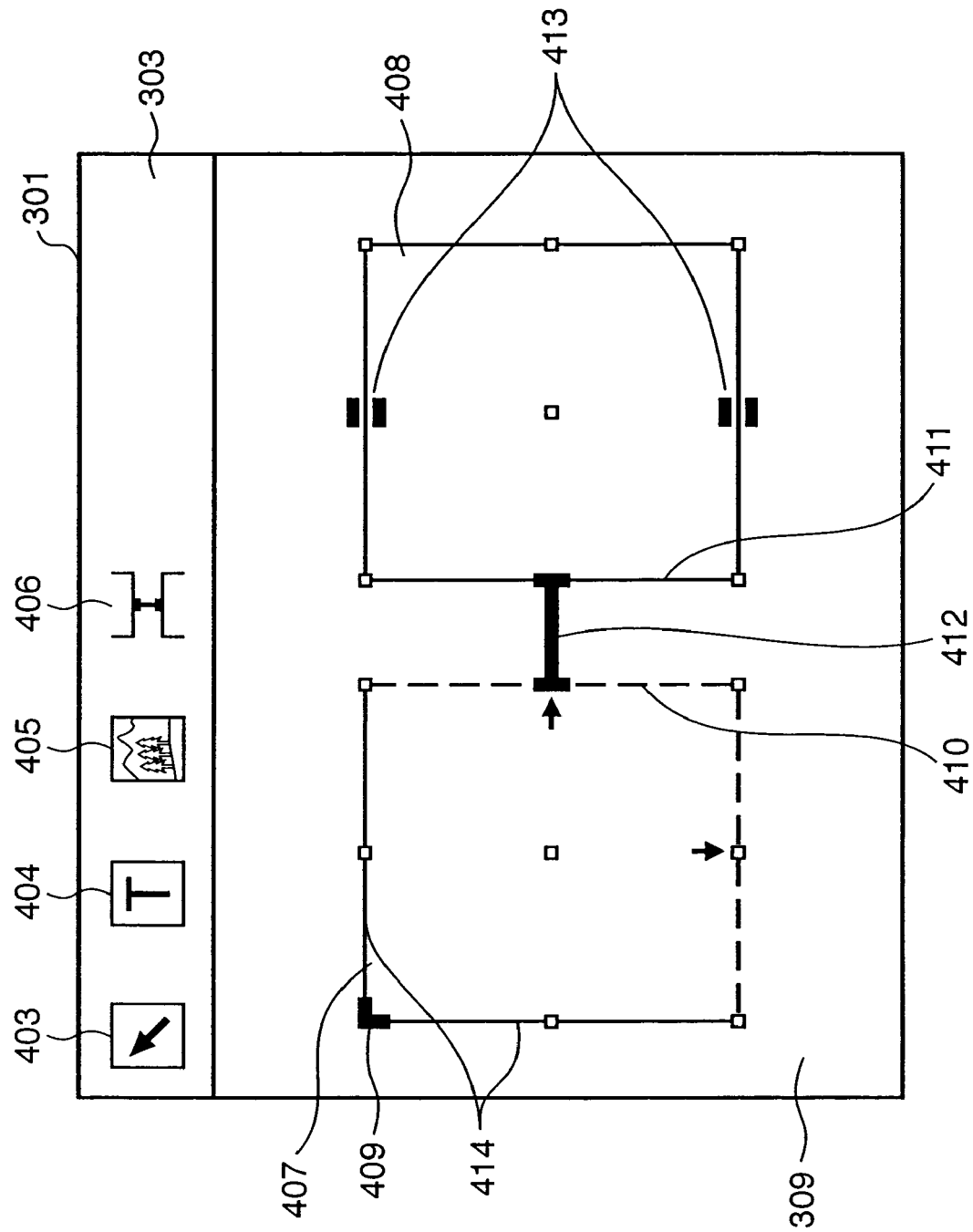

F I G. 22

| NUMBER OF SELECTED FIGURES = 1 ||
|---|---|
| PAGE NUMBER | CONTAINER ID |
| 3 | 15 |

| NUMBER OF DATA=5 | | | | |
|---|---|---|---|---|
| ADJUSTMENT ID | PAGE NUMBER | CONTAINER ID | ADJUSTMENT TYPE | ADJUSTMENT DATA |
| 1 | 1 | 1 | 1 | (10,20)-(10,140) |
| 2 | 1 | 1 | 2 | FONT= "MSP MINCHO"... |
| 3 | 1 | 4 | 1 | (55,110)-(130,200) |
| 4 | 3 | 1 | 3 | LINE TYPE = CHAIN LINE... |
| 5 | 3 | 4 | 4 | PLANE COLOR = RED... |

(∗)ADJUSTMENT TYPE
POSITION/SIZE=1
CHARACTER ATTRIBUTE=2
LINE ATTRIBUTE=3
SURFACE ATTRIBUTE=4
...

FIG. 25

| TEMPLATE INFORMATION |
|---|
| CONTENT INFORMATION |
| CONTAINER ADJUSTMENT INFORMATION |

INFORMATION PROCESSING APPARATUS, CONTROL METHOD THEREFOR, AND COMPUTER-READABLE MEDIUM DISPLAYING A LAYOUT RESULT ON THE BASIS OF ADJUSTMENT RECORD INFORMATION STORED WITH RESPECT TO A PREDETERMINED RECORD

FIELD OF THE INVENTION

The present invention relates to an information processing apparatus which lays out, in a page on the basis of a template, field areas for inserting data of data fields that are selected from a record containing a plurality of types of data fields, a control method therefor, and a program.

BACKGROUND OF THE INVENTION

The necessity for CRM (Customer Relationship Management) and one-to-one marketing has recently received a great deal of attention due to factors such as shortening of the product life as varieties of products are produced, and customer's orientation to customized services as the use of the Internet spreads. These methods try to raise the customer satisfaction, win new customers, and keep customers.

One-to-one marketing is a kind of database marketing which creates a database of individual attribute information including the age, gender, hobby, preference, and purchase log of a customer, analyzes the contents of the database, and makes a proposal complying with customer's needs. A typical method of this marketing is variable printing. These days, a variable printing system which customizes a document for each customer and outputs the document has been developed along with the development of the DTP (Desk Top Publishing) technique and the pervasion of digital printing apparatuses. The variable printing system needs to create a customized document in which contents of a different amount for each customer are optimally laid out.

Generally, when such a customized document is to be created by the variable printing system, containers are laid out in a document. The container is a drawing area for drawing contents (drawing contents (e.g., an image and text)), and is also called a field area.

A desired customized document (called a document template) can be created by performing work of laying out containers in a document and associating a database with the layout (associating various contents in the database with the containers). The contents of the customized document can be changed (made variable) by properly switching contents in the containers in the customized document (changing the association). Such a document is called a variable data document, and a printing system using the variable data document is a variable printing system.

In a conventional variable printing system, the size of a container associated with a text or image serving as contents is fixed. When contents in the database are inserted (flowed) into a container and the data amount is larger than the container size, the following problems arise. That is, if the data is a text, overlapping of the text occurs. If the data is an image, clipping of the image by the container occurs. When the data amount is smaller than the container size, no proper display may be obtained such that a gap appears between the container and its internal contents.

In order to solve these problems, as another technique of changing the layout, a technique of downsizing a container adjacent to a target container when the target container increases in size is disclosed in Japanese Patent Laid-Open No. 7-129658 (paragraph 0049, FIG. 8) "Layout Designing Apparatus".

"Document Processing Apparatus and Processing" in Japanese Patent Laid-Open No. 2001-092820 (paragraph 0051, FIG. 17) discloses a document processing apparatus having a function of changing a layout (holding the interval between objects) by using intersection inspection based on coarse drawing. One of features of Japanese Patent Laid-Open No. 2001-092820 is to display a final layout result on a custom browser.

When the variable printing technique is applied to a business system for, e.g., issuing a slip, a document template is generally created and changed by a specific person in charge, and managed by a specific system administrator. This is because, if the document template can be changed and saved by anyone, the user cannot grasp a document template for use and is confused, or the print format changes to make the preparation of the document template insignificant.

In a system via a network (e.g., a client-server system or Web system), a document template is registered in an administration server. If necessary, the document template is distributed to and utilized by a computer in which a layout engine for implementing an automatic layout system runs. In a system having a plurality of stand-alone computers which are not connected to a network, a document template is stored in a storage medium such as a CD-ROM, distributed by a physical means, e.g., by mail, and utilized.

A computer in which the layout engine runs merges a distributed document template with contents, lays out the contents, and previews or prints the layout result. The user generally uses a layout preview application which can preview and print contents, but cannot change a document template and contents. When a layout editing application capable of changing a document template is used, the changed document template cannot be registered in the system. The changed document template must be saved in a local computer or discarded, and it becomes difficult to generate the same document again.

In a variable printing system using an automatic layout process, if the design of a document template is incomplete or contents which are not assumed in design exist, an unintended layout result is output. It is, however, difficult to create a document template which provides a satisfactory layout regardless of contents.

If a layout cannot be satisfied upon previewing and confirming the layout result of contents before printing, the document template may be modified, or contents may be changed, registered in the database, merged again with the document template, and laid out. However, modification of a document template and modification of data in the database pose security problems, and in general, a general user is not authorized to perform modification.

A general user cannot easily perform modification even in a situation in which he wants to slightly increase the image size because an image is slightly small, or when he has a close look at a preview result and finds out an error in the name of the billing destination, he wants to correct the name and print.

The following problems arise when the automatic layout system is implemented by a system via a network (e.g., a client-server system or Web system). When the user wants to temporarily replace contents such as an image contained in a layout result in outputting the layout result, he must ask in advance the system administrator to modify and register contents, which puts a burden on the user. If an arbitrary user is permitted an operation including modification and registration of contents, the operation may influence the entire system. Thus, it is virtually impossible to temporarily replace an operation by a given user.

SUMMARY OF THE INVENTION

The present invention has been made to overcome the conventional drawbacks, and has as its object to provide an information processing apparatus capable of easily adjusting a layout in a page on a document template in accordance with a user's intention and application purpose while maintaining an original document template and content information, a control method therefor, and a program.

According to the present invention, the foregoing object is attained by providing an information processing apparatus which lays out, in a page on the basis of a template, field areas for inserting data of data fields that are selected from a record containing a plurality of types of data fields, comprising:

display control means for displaying a page in which the field areas where data of a predetermined record are inserted are laid out on the basis of the template;

selection means for selecting a field area to be adjusted from the field areas in the page displayed by the display control means;

adjustment means for adjusting the field area on the basis of adjustment operation to the field area selected by the selection means; and storing means for storing adjustment record information on the record for which the field area is adjusted by the adjustment means, in addition to template information on the template.

In a preferred embodiment, the apparatus further comprises update means for adjusting and updating the field areas laid out in the page by using the adjustment record information stored in the storing means.

In a preferred embodiment, the adjustment means contains, as an adjustment type for adjusting the field area, a position/size, a character attribute, a line attribute, a surface attribute, and data to be inserted into the field area. In addition, the storing means stores adjustment information on the field area for each record and each adjustment type.

In a preferred embodiment, when adjustment by the adjustment means pertains to data to be inserted into the field area, the storing means stores first adjustment information on the data, and when adjustment information on a position/size of the field area does not exist, generates and stores second adjustment information for maintaining a current position/size of the field area.

In a preferred embodiment, the storing means stores, as one file of the adjustment record information, adjustment information on the field area adjusted by the adjustment means, the template information, and data information on data to be inserted into the field area.

In a preferred embodiment, the apparatus further comprises loading means for loading the one file stored in the storing means, wherein the display control means updates a display with an adjusted page in which the field area in the page has been adjusted on the basis of the adjustment information in the file loaded by the loading means.

In a preferred embodiment, the display control means comprises search means for searching the storing means for adjustment information corresponding to the field area in a page to be processed. Further, calculation means for calculating a layout of the field area in the page on the basis of the adjustment information searched for by the search means. In addition, the display control means displays a layout result calculated by the calculation means as an adjusted page in which the field area in the page has been adjusted.

According to the present invention, the foregoing object is attained by providing an information processing apparatus which lays out, in a page on the basis of a template, field areas for inserting data of data fields that are selected from a record containing a plurality of types of data fields, comprising:

operation window generation means for generating an operation window having a page display area for displaying a page in which the field areas are laid out, and a control area for designating replacement of data to be inserted into each field area in correspondence with each field area in the page;

replacement means for replacing, with target data, data which is inserted in the field area in the page displayed in the page display area, on the basis of an operation to the control area on the operation window; and page information generation means for generating page information for updating the page displayed in the page display area to a page replaced by the replacement means and displaying the updated page.

In a preferred embodiment, the apparatus further comprises storing means for storing page information on the page displayed in the page display area before replacement by the replacement means, and temporarily storing page information on the page displayed in the page display area after replacement by the replacement means.

In a preferred embodiment, the apparatus further comprises cancellation means for canceling replacement of data by the replacement means.

In a preferred embodiment, the apparatus further comprises storing means for storing page information on the page displayed in the page display area before replacement by the replacement means, and temporarily storing page information on the page displayed in the page display area after replacement by the replacement means, wherein when cancellation by the cancellation means is executed, the page information generation means acquires, from the storing means, the page information on the page before replacement by the replacement means.

In a preferred embodiment, the information processing apparatus includes a server apparatus connected to a network.

In a preferred embodiment, the apparatus further comprises:

operation window transmission means for transmitting the operation window to a client apparatus connected to the network;

reception means for receiving, from the client apparatus, instruction information which instructs the information processing apparatus on replacement operation;

execution means for executing the replacement means and the page generation means on the basis of the instruction information received by the reception means; and page information transmission means for transmitting page information generated by the page information generation means to the client apparatus after execution by the execution means.

According to the present invention, the foregoing object is attained by providing a method of controlling an information processing apparatus which lays out, in a page on the basis of a template, field areas for inserting data of data fields that are selected from a record containing a plurality of types of data fields, comprising:

a display control step of displaying a page in which the field areas where data of a predetermined record are inserted are laid out on the basis of the template;

a selection step of selecting a field area to be adjusted from the field areas in the page displayed in the display control step;

an adjustment step of adjusting the field area on the basis of adjustment operation to the field area selected in the selection step; and a storing step of storing adjustment record information on the record for which the field area is adjusted in the adjustment step, in addition to template information on the template.

According to the present invention, the foregoing object is attained by providing a method of controlling an information processing apparatus which lays out, in a page on the basis of a template, field areas for inserting data of data fields that are selected from a record containing a plurality of types of data fields, comprising:

an operation window generation step of generating an operation window having a page display area for displaying a page in which the field areas are laid out, and a control area for designating replacement of data to be inserted into each field area in correspondence with each field area in the page;

a replacement step of replacing, with target data, data which is inserted in the field area in the page displayed in the page display area, on the basis of an operation to the control area on the operation window; and a page information generation step of generating page information for updating the page displayed in the page display area to a page replaced in the replacement step and displaying the updated page.

According to the present invention, the foregoing object is attained by providing a program for implementing control of an information processing apparatus which lays out, in a page on the basis of a template, field areas for inserting data of data fields that are selected from a record containing a plurality of types of data fields, comprising:

a program code for a display control step of displaying a page in which the field areas where data of a predetermined record are inserted are laid out on the basis of the template;

a program code for a selection step of selecting a field area to be adjusted from the field areas in the page displayed in the display control step;

a program code for an adjustment step of adjusting the field area on the basis of adjustment operation to the field area selected in the selection step; and a program code for a storing step of storing adjustment record information on the record for which the field area is adjusted in the adjustment step, in addition to template information on the template.

According to the present invention, the foregoing object is attained by providing a program for implementing control of an information processing apparatus which lays out, in a page on the basis of a template, field areas for inserting data of data fields that are selected from a record containing a plurality of types of data fields, comprising:

a program code for an operation window generation step of generating an operation window having a page display area for displaying a page in which the field areas are laid out, and a control area for designating replacement of data to be inserted into each field area in correspondence with each field area in the page;

a program code for a replacement step of replacing, with target data, data which is inserted in the field area in the page displayed in the page display area, on the basis of an operation to the control area on the operation window; and a program code for a page information generation step of generating page information for updating the page displayed in the page display area to a page replaced in the replacement step and displaying the updated page.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a view showing an example of display of a container in the user interface according to the first embodiment of the present invention;

FIG. 22 is a table showing an example of a selected-container table according to the first embodiment of the present invention;

FIG. 25 is a view showing an example of the data format of an adjusted document according to the first embodiment of the present invention;

DETAILED DESCRIPTION OF THE PREFERRED EMBODIMENTS

Preferred embodiments of the present invention will be described in detail in accordance with the accompanying drawings.

First Embodiment

<System Configuration>

The hardware configuration of an information processing system and that of a host computer as a building component of the information processing system according to the first embodiment will be described with reference to FIGS. 1A and 1B.

Figure 1A:
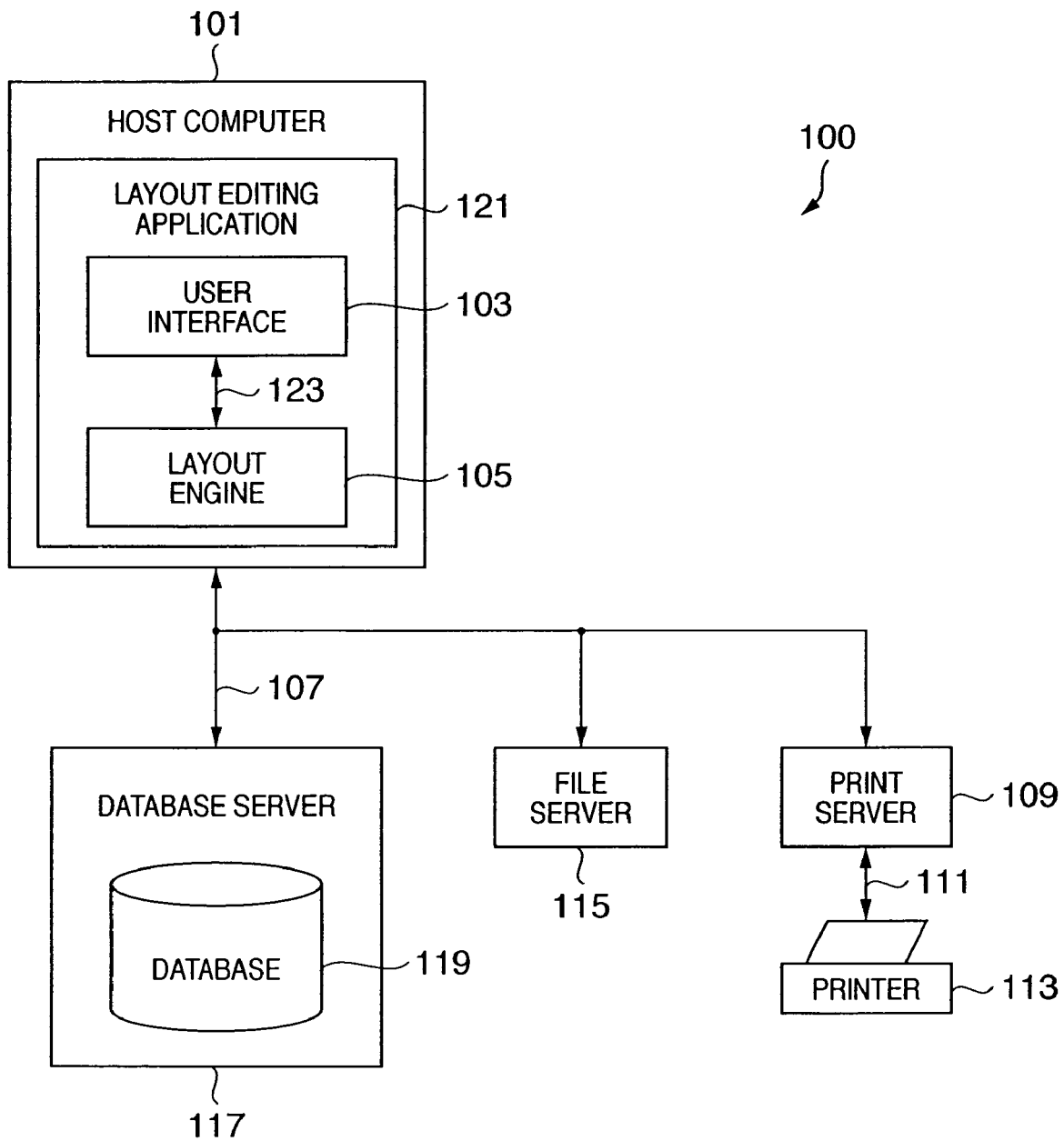
FIG. 1A is a block diagram showing an example of the configuration of an information processing system according to the first embodiment of the present invention.

FIG. 1A is a block diagram showing an example of the configuration of the information processing system according to the first embodiment of the present invention. FIG. 1B is a block diagram showing the hardware configuration of the host computer (corresponding to an information processing apparatus according to the present invention) as a building component of the information processing system according to the first embodiment of the present invention.

Figure 1B:
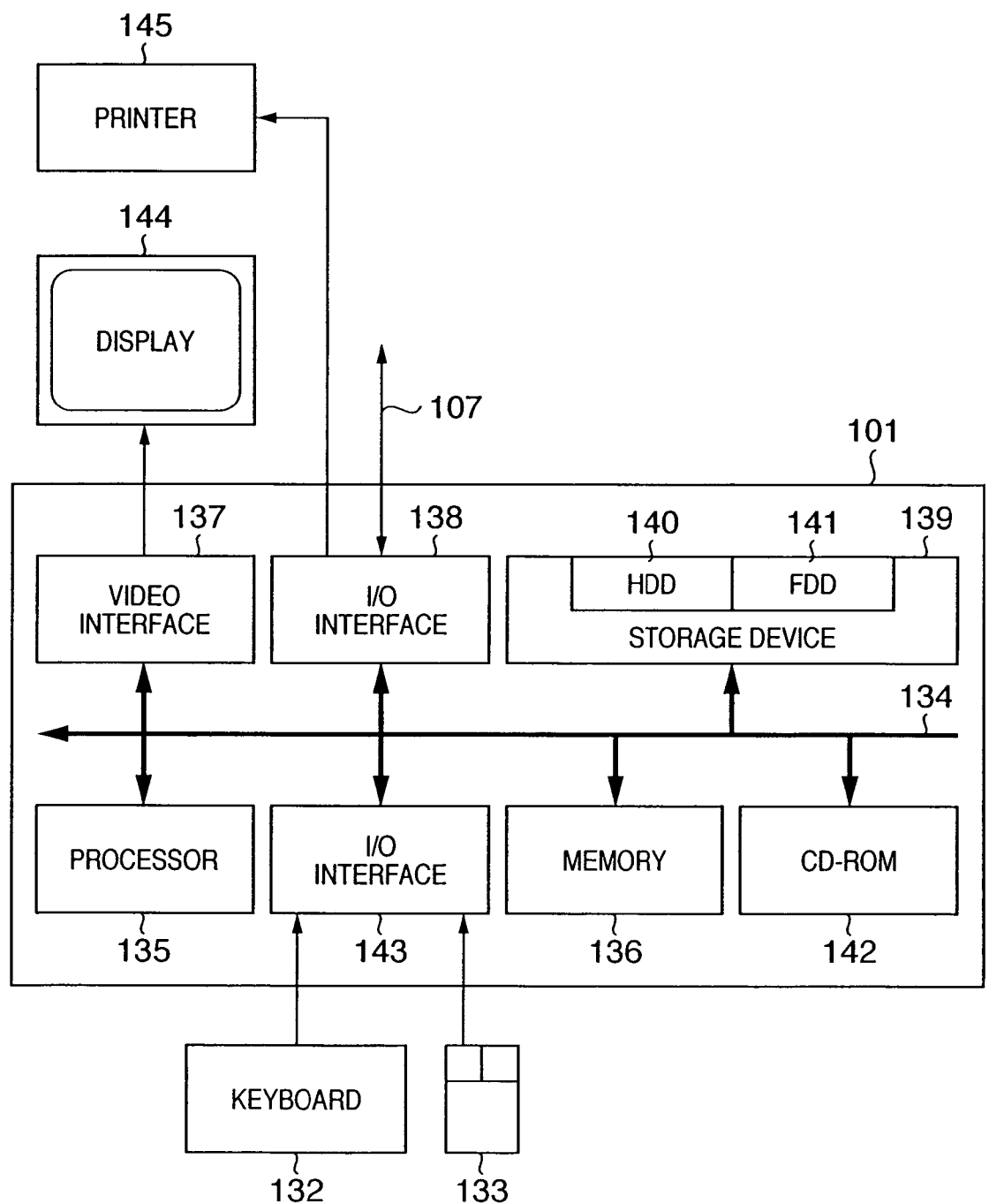
FIG. 1B is a block diagram showing the hardware configuration of a host computer as a building component of the information processing system according to the first embodiment of the present invention.

Various computers (e.g., a database server 117, file server 115, and print server 109) other than the host computer in FIG. 1A also have the same hardware configuration as, e.g., that in FIG. 1B.

In FIG. 1A, an information processing system 100 is built by connecting a host computer 101, the database server 117, the file server 115, and the print server 109 via a network 107.

The database server 117 comprises a database 119. The print server 109 is connected to a printer 113, and can properly output print data received via the network 107 to the printer 113 and cause the printer 113 to print the print data.

The information processing system 100 in FIG. 1A especially shows an example of the configuration of a variable printing system which prints a variable data document. A variable printing process to be described in the first embodiment is implemented by the host computer 101 (formed from a general-purpose computer module) which functions as a layout editing apparatus.

A layout editing application 121 which can run in the variable printing system 100 is executed completely or partially by the host computer 101. In particular, a process associated with layout editing and a process associated with printing of a variable data document are implemented by software which is executed by the host computer 101.

A layout preview application 227 (to be described later) which can run in the variable printing system 100 is also executed completely or partially by the host computer 101.

Software and computer programs such as the layout editing application 121 are stored in a computer-readable medium. The software and computer programs are loaded from the computer-readable medium into a memory 136 of the host computer 101, and executed. The computer-readable medium which stores software and computer programs is a computer program product. When the computer program product is used in, e.g., the host computer 101, an apparatus suitable for layout editing and variable printing of a variable data document is provided.

As shown in FIG. 1B, a keyboard 132 and a mouse 133 serving as a pointing device are connected as input devices to the host computer 101 via an I/O (Input/Output) interface 143. A display device 144 is also connected as an output device via a video interface 137. A printer 145 can also be connected via an I/O interface 138.

The I/O interface 138 also has a function of connecting the host computer 101 to the network 107. With the I/O interface 138, the host computer 101 can be connected via the network 107 to another computer apparatus (external device) in the variable printing system 100. Typical examples of the network 107 are a local area network (LAN) and wide area network (WAN).

As shown in FIG. 1B, the host computer 101 includes at least one processor 135, and a memory 136 which is formed from a semiconductor memory such as a random access memory (RAM) or read only memory (ROM). A storage device 139 includes a hard disk drive (HDD) 140 capable of exchanging data with a computer-readable medium which stores various data such as a program, and a Floppy® disk drive (FDD) 141.

Although not shown in FIG. 1B, various storage devices such as a magnetic tape drive and memory card can also be used as the storage device 139. A CD-ROM drive 142 is provided as a nonvolatile data source (a computer program may also be provided by a CD-ROM).

The host computer 101 communicates with the building components 135 to 143 of the host computer 101 via an interconnection bus 134. This communication is realized by an operating system such as GNU/LINUX or Microsoft Windows®, or a method in a conventional operation mode of a computer system which typically complies with an operating system or is formed by a well-known related technique. That is, the building components 135 to 143 are connected via the interconnection bus 134 so that they can communicate with each other, and are used by an operating system installed in the host computer 101.

Conceivable examples of the host computer 101 shown in FIG. 1B are an IBM-compatible PC (Personal Computer), Sparcstation available from Sun, and a computer system including them.

In the first embodiment, the layout editing application 121 is resident in the hard disk drive 140, and controls execution and loading by the processor 135. Data fetched from the intermediary storage device of the layout editing application 121 and the network 107 use the memory 136 in response to the hard disk drive 140.

For example, an encoded program of the layout editing application 121 is stored in a CD-ROM or Floppy® disk. This program is loaded into the host computer 101 via the corresponding CD-ROM drive 142 or Floppy® disk drive 141, and installed in the hard disk drive 140.

As another example, the layout editing application 121 may be loaded from the network 107 into the host computer 101, and installed in the hard disk drive 140.

Various software programs including the layout editing application 121 may be loaded into the host computer 101 from a magnetic tape, a ROM, an integrated circuit, a magneto-optical disk, radio communication (e.g., infrared communication) between the host computer 101 and another device, a computer-readable card (e.g., a PCMCIA card), or another proper computer including e-mail communication, an intranet, or the Internet having recording information on a WEB site. They are examples of the computer-readable medium, and another computer-readable medium is obviously used.

In FIG. 1A, the layout editing application 121 causes the host computer 101 to implement variable printing (to be also referred to as variable data printing (VDP)), and includes two software components: a layout engine 105 and user interface 103.

The layout engine 105 is a software component for loading records one by one from variable data which are stored as records in the database 119, under constraints in size and position on a container (rectangular range) serving as a field area (partial area), and calculating, from the loaded variable data and the container constraints, the layout including the size and position of a container to which the loaded variable data is flowed.

In the first embodiment, the layout engine 105 also performs a process of drawing variable data assigned to a container and generating an image of a variable data document. However, the present invention is not limited to this, and the layout engine 105 operates as an application which decides the size and position of each partial area (container) and outputs drawing information to a printer driver (not shown). The printer driver may perform a variable data document image drawing process and generate print data.

The user interface 103 allows the user to set the layout and attribute of a container and create a document template (also called template information). The user interface 103 provides a mechanism of associating each container in the document template with a data source (variable data (contents) in the database 119). The user interface 103 and layout engine 105 communicate with each other via a communication channel 123.

An example of the data source for generating a variable data document is the typical database 119 in the database server 117 which generally executes a database application and is formed from another computer.

The host computer 101 communicates with the database server 117 via the network 107. The layout editing application 121 generates a document template to be saved in the host computer 101 or the file server 115 which is generally formed from another computer.

The layout editing application 121 generates a variable data document which is formed from a document template merged with variable data. The variable data document is directly printed by the printer 113 via the local file system of the host computer 101, the file server 115, or the print server 109.

The print server 109 is a computer which provides a network function to the printer 113 which is not directly connected to the network 107. The print server 109 and printer 113 are connected via a typical communication channel 111 (e.g., USB, IEEE 1394, or wireless LAN).

Another example of the configuration of the variable printing system 100 will be explained with reference to FIG. 1C.

Figure 1C:
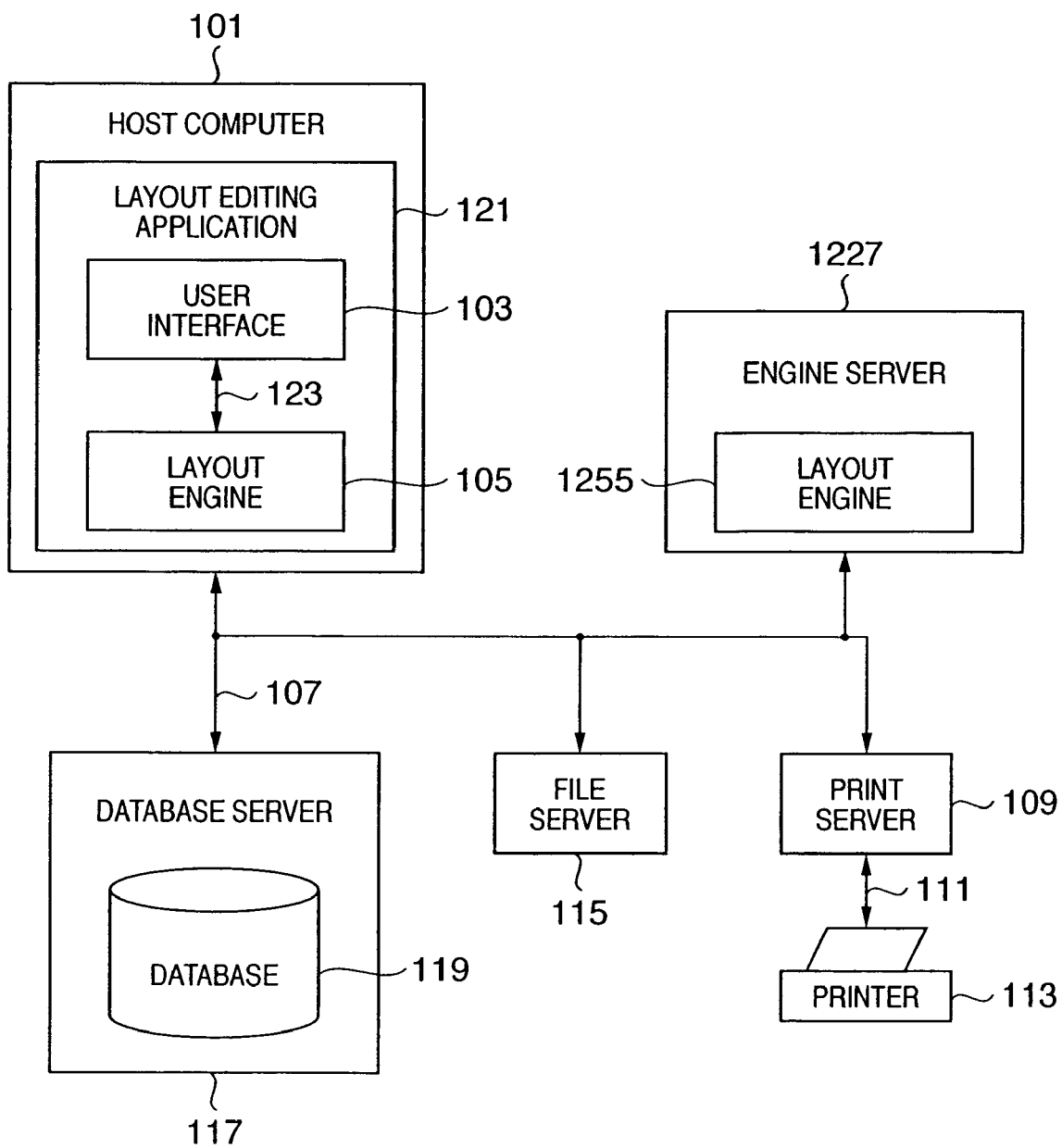
FIG. 1C is a block diagram showing another example of the configuration of the information processing system according to the first embodiment of the present invention.

FIG. 1C is a block diagram showing another configuration of the information processing system according to the first embodiment of the present invention.

FIG. 1C illustrates an example in which an engine server 1227 is added to the network 107 and a layout engine 1225 is installed in the engine server 1227. That is, in this configuration, the layout engine 105 in the host computer 101 is implemented in the engine server 1227. This configuration can reduce the process load of the host computer 101.

The engine server 1227 is formed from a typical computer, similar to the remaining servers. A document template saved in the file server 115 can be combined with data saved in the database 119 in order to generate a document by the layout engine 1225 for printing or another purpose. Such operation is requested via the user interface 103 or so requested as to print only a specific record.

The configuration of the variable printing system 100 which implements a layout preview system as a feature of the first embodiment will be explained with reference to FIG. 1D.

Figure 1D:
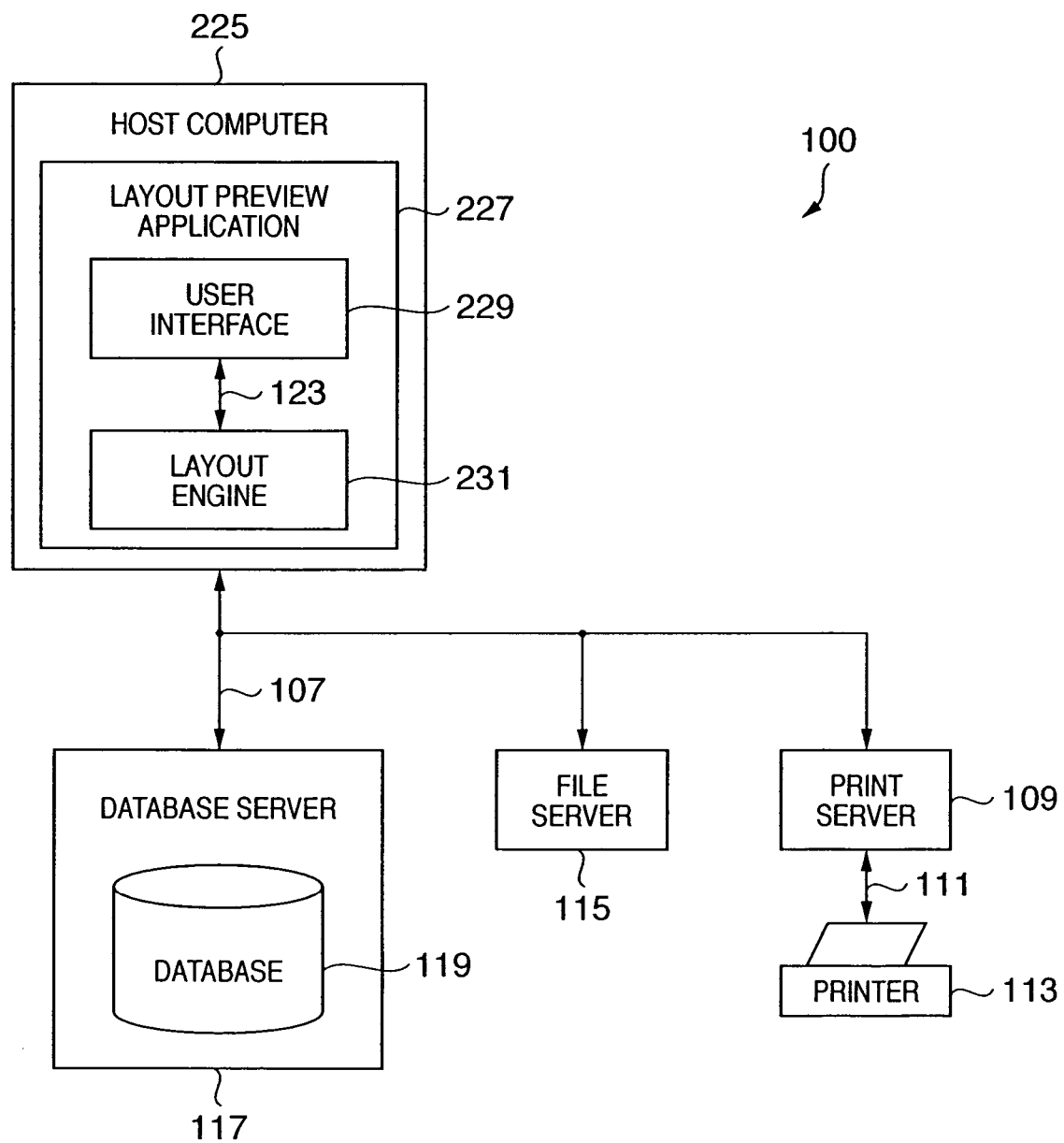
FIG. 1D is a block diagram showing an example of the configuration of a layout preview system according to the first embodiment of the present invention.

FIG. 1D is a block diagram showing an example of the configuration of the layout preview system according to the first embodiment of the present invention.

The layout preview system can be regarded as an example of an expanded configuration of the variable printing system 100 in FIG. 1A. In FIG. 1D, the same reference numerals as in the variable printing system 100 in FIG. 1A denote the same parts, and a detailed description thereof will be omitted.

In FIG. 1D, a layout preview client 225 is a typical computer, similar to the host computer 101 in FIG. 1A. Similar to the layout editing application 121, the layout preview application 227 contains two components: a user interface 229 and layout engine 231.

The user interface 229 is different from the user interface 103 in that the user interface 229 cannot designate creation and saving of a document template although the user interface 229 can designate previewing and printing. The layout engine 231 has the same function as that of the layout engine 105.

The present invention is especially directed to the layout preview client 225 and layout preview application 227.

The layout editing application 121 and layout preview application 227 have many common building components. The configuration of the layout editing application 121 will be described first.

<Outline of Layout Editing Application>

An outline of variable data printing will be explained with reference to FIG. 2.

Figure 2:
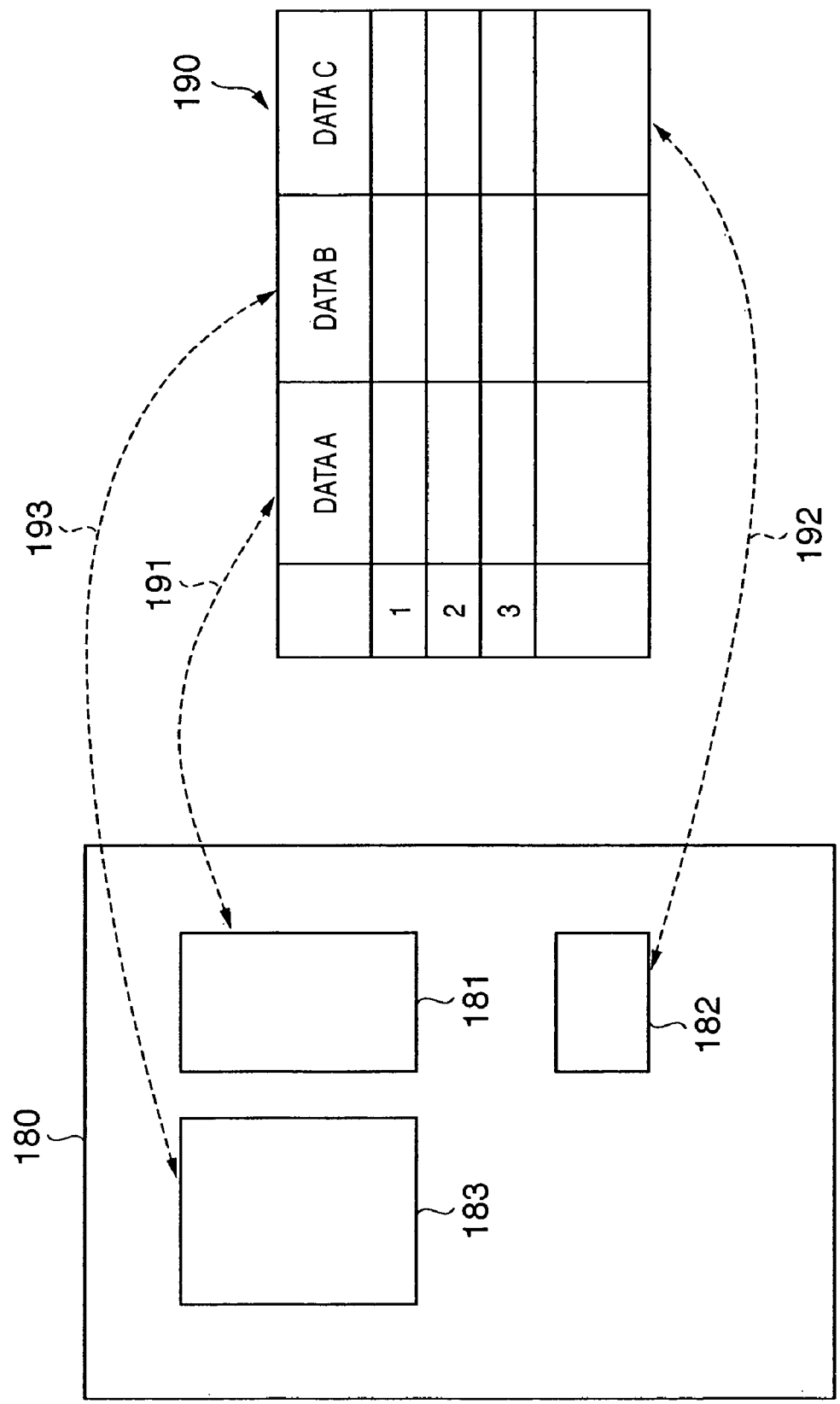
FIG. 2 is a view for explaining an outline of variable data printing according to the first embodiment of the present invention.

FIG. 2 is a view for explaining an outline of variable data printing according to the first embodiment of the present invention.

A plurality of containers 181 to 183 are laid out on a page in accordance with an operation instruction from the user via the user interface 103 of the layout editing application 121, and constraints on position and size are assigned to the containers to generate a document template 180.

The user interface 103 associates the document template 180 with a data source 190 (e.g., the database 119), and further associates each container with each data field in the data source 190. Association information representing the association between each container and each data field in the data source 190 is described in the document template 180, and the document template 180 is stored in the HDD 140. The data source 190 is a file which describes item data for each record, and is stored in the HDD 140.

The layout engine 105 loads data associated by association information from the data source 190 into the containers 181 and 182 of the document template 180 in accordance with a print instruction or preview instruction from the user. The layout engine 105 flows the loaded data of each record into the containers (e.g., flows data fields A to C of data record 1 into the containers 181 to 183). The layout engine 105 adjusts (adjusts the layout) the size of each container and the like in accordance with the flowed content data.

For a preview instruction, the layout engine 105 generates a layout-adjusted document image, and previews it on the screen of the display device 144. For a print instruction, the layout engine 105 outputs, as print data to the print server 109, a document image generated using the layout engine 105 or printer driver. By sequentially processing data records 1, 2, 3, . . . , variable data printing is implemented.

<Description of Layout Editing Application>

The layout editing application 121 will be described.

An example of a user interface realized by the user interface 103 will be explained with reference to FIG. 3.

[Main Window]

Figure 3:
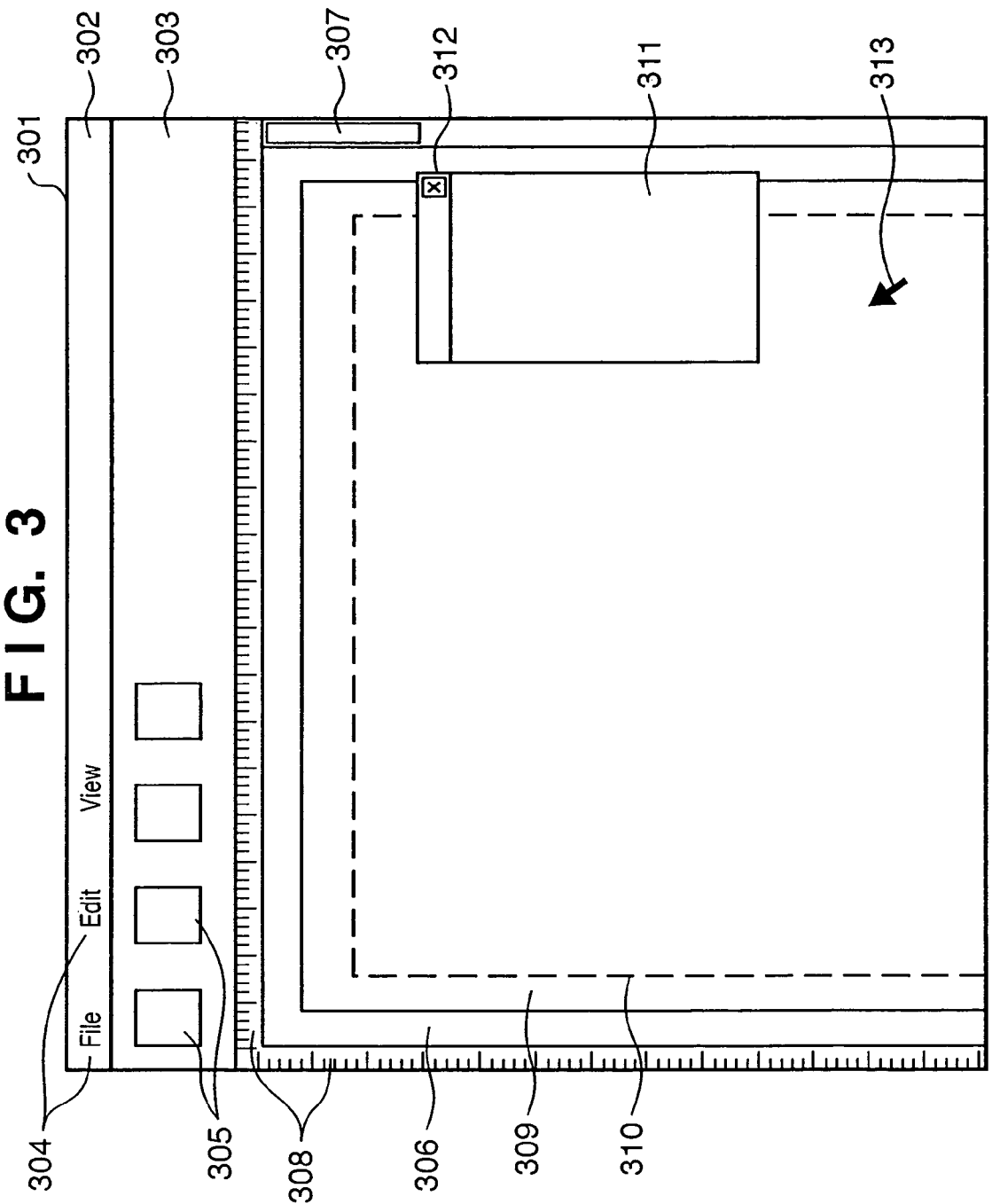
FIG. 3 is a view showing an example of a user interface according to the first embodiment of the present invention.

FIG. 3 is a view showing an example of the user interface according to the first embodiment of the present invention.

As shown in FIG. 3, the user interface 103 displays on the display device 144 a user interface which is formed by an application window 301 upon operation. The application window 301 has a menu bar 302, tool bar 303, work area 306, and optional palette 311.

The menu bar 302 and tool bar 303 can be hidden or moved to various locations in the window. The location of the work area 306 can be moved by operation of the mouse 133. The palette 311 is an option, and can be controlled to be display/hidden in accordance with a purpose. A cursor/pointer 313 indicates the hotspot of the mouse 133.

As a known technique, the menu bar 302 has many menu items 304 expanded below the layer of a menu option.

The tool bar 303 has many tool buttons and widgets (components) 305 which can be hidden or displayed in a special mode of the application.

A ruler 308 is an option, and is used to indicate the position of a pointer, page, line, margin guide, container, or object in the work area 306.

A palette 311 is used to access an additional function such as a variable data library. The palette 311 has a window control button 312 for moving, resizing, and closing the palette 311. The palette 311 can be displayed on the front surface of the work area 306 or on the back surface of an object. The palette 311 can be displayed only within the application window 301, or displayed partially or entirely outside the application window 301.

The tool bar 303 has a plurality of types of "buttons" 403 to 406 which can be selected by the user, as shown in FIG. 4.

(1) Selection tool button 403: The button 403 is used to select, move, resize, and lock/unlock the edge of a container. A container is selected by dragging a selection box around the container. A plurality of containers can be selected by selecting and operating them while pressing the CTRL key of the keyboard 132.

(2) Text container tool button 404: The button 404 is used to create a container having a static or variable text.

(3) Image container tool button 405: The button 405 is used to create a container having a static or variable image.

(4) Link tool button 406: The button 406 is used to create a link for associating containers, and also used to control the distance of a link.

As a known technique, these buttons are implemented as tool tips of icons which change in accordance with an operation status.

The application window 301 can decide a basic layout by laying out containers and links in a page. The basic layout is a base for variable data printing. When each container in the basic layout is a fixed layout, the print results of all records have the same layout.

When each container in the basic layout is a flexible container (to be described later), the size and position of the container change in accordance with the amount and size of data loaded from each record under constraints (to be described later). Hence, a document template created by the layout editing application 121 decides only the basic layout.

When the document template contains a flexible container, the layout of a finally printed material is adjusted in accordance with loaded data.

[Document Template]

In FIG. 3, the work area 306 is used to display and edit the design of the document template (180: basic layout). The work area 306 can present an outline of a document to be printed to the user while the user designs a document template. From this preview, the user can easily understand how a document merged with the data source (190) changes depending on the amount and size of variable data.

When the data source is associated with the document template, corresponding variable texts and images are displayed in laid-out containers so as to preview a current document.

A document structure and visual clues (e.g., frame, anchor, slider, and link of a container) for drawing a container in the document template are always displayed in creating the document template. In preview for flowing variable data, visual clues are displayed when the cursor is moved onto a container or a container is selected.

The work area 306 includes a scroll bar 307, the optional ruler 308, and a document template 309. The document template 309 can show that a document has a plurality of pages. The document template 309 corresponds to the document template 180 in FIG. 2.

The page size of a given document template is designated by the user using a known technique. For example, a dialog for setting a page size is displayed by selecting "page setup" from "file" on the menu, and a page size designated by the user is reflected in the dialog.

The number of actual pages of each document may change depending on variable data in an associated data source. This is because an additional page is automatically created upon loading variable data which cannot be fit in one page when a field that changes in size depending on the variable data amount, like a flexible table, is set in the document template.

A boundary 310 displayed in each page is an arbitrary page margin which represents the maximum width of a printable object on the page.

FIG. 4 shows an example of objects which can be displayed in the document template 309 for one page.

Such objects are containers 407 and 408, an arbitrarily applied anchor icon 409, fixed edges 411 and 414, an unfixed edge 410, a link 412, and a slider 413.

The anchor icon 409 can be set at a corner or edge of a rectangular container or at the center of a container. When the anchor icon 409 is set, the position of the set anchor icon 409 is fixed. In the example of FIG. 4, the anchor icon 409 is set at the upper left corner of the container 407. In this case, variable data is flowed into the container 407. The anchor icon 409 shows that the container can be enlarged to the right or down when the image size or text amount of variable data is large.

When the anchor icon 409 is set at an edge, the edge is fixed, and the container can be enlarged along the three remaining edges. When the anchor icon 409 is set at the center of a container, the center position of the container is fixed, and the container can be enlarged in four directions so as not to change the center position of the rectangular container. The link 412 represents that the containers 407 and 408 are associated, though details of the link 412 will be described later. The link 412 also represents that the container 408 can be moved to the right while maintaining a length (range can be specified) set for the link 412. The slider 413 shows that it can be moved parallel to an edge at which the slider 413 is set.

[Container]

A container serving as a field area for inserting data of a plurality of types of data fields contained in each record in the database will be explained. The container is a field area (to be referred to as a partial area) where a fixed or flexible text and image (data in a plurality of types of data fields) are flowed from a variable data file into a document template and drawn. The container is laid out together with other containers and objects, as shown in FIG. 4. The container is moved, adjusted in size, or created again by operation of the mouse 133 in accordance with an operation instruction from the user via the user interface.

More precisely, the container has a set of settings, visual representation, interaction, and editing operation. The definition of the container in the first embodiment will be described.

(1) A container has fixed or flexible contents. Flexible contents (variable data) can be said to be dynamic in a sense that data acquired from the data source may change for each document, i.e., each record. Note that flexible contents in the first embodiment are not intended to be animated contents or contents which change over time by another method because these contents are not suitable for printing.

Similarly, fixed contents are displayed in the same way for all documents generated using containers. When, however, a link to flexible contents is set, fixed contents may change in position in each document under the influence of the flexible contents.

(2) A container has decoration functions similar to text settings such as the background color, border, and font style which are applied to contents. These settings will be called container attributes. The container attributes can be set for each container, and a container can also be given the same container attributes as those of a given container.

(3) A container is merged with data from the data source when a document is generated. The decoration function is visible on a printout for any fixed contents. Flexible contents provide display of specific data from the data source. This representation of the container can be, for example, printed and/or also displayed on the screen of the display device 144.

(4) A container has a user interface as a visual clue, as shown in FIG. 4. For example, a container has an interactive graphical user interface (GUI) for editing a container and setting its display. GUI components are displayed on the screen of the display device 144, but are not printed in a document. The user interface 103 of the layout editing application 121 displays some of the container decoration functions such as the background color and font, and has a function of enabling editing and displaying container settings.

Examples of special purposes of the user interface function are a border, or a corner icon for interactively changing and displaying the size and position of a container, an overwrite count representing container operation when a container is merged with data from the data source, a line, an icon, and a text.

[Container Constraints]

The container has constraints on controlling how to link contents displayed in each document. These constraints (including linking of fixed/flexible contents to a container) are a major method of controlling generation of many documents from one document template by the user.

An example of the constraints is "the height of contents in this container is 4 inches at maximum". Another example of the constraints is "the left edge of contents in the container must be displayed at the same horizontal position in respective documents". The descriptions of the constraints provide various methods for displaying and editing these constraints by using the GUI.

A content place holder which designates the layout of fixed contents, like an image which has a defined place on a page, is well known in the digital printing technique. A container has a position and size, which are edited and displayed by a method known in a conventional technique. The following description is focused on display and editing by a method specialized in variable data printing.

By using a container, the user can designate the size (drawing size) and position of contents in a document. Since a plurality of types of documents are generated from one document template, many possibilities and constraints are set on a container. For these settings (designation) and display, a predetermined user interface is exploited.

The edge of one container defines a virtual boundary within which associated contents are displayed in a document. Hence, a discussion about the left edge of a container is a discussion about the leftmost edge in an area in which associated contents can be displayed in each document. Similarly, a discussion about the height of a container is understood to be a discussion about constraints on the height of associated contents in a generated document. In this specification, this distinction will become apparent when the edge or size of a container is discussed by referring to the user interface 103.

In the following description, a term "fixed" which defines a given value used to constrain the display of contents applies to all documents.

(1) When the width of a container is fixed, a width assigned to associated contents is equal in all documents.

(2) When the height of a container is fixed, a height assigned to associated contents is equal in all documents.

(3) When the distance (length of a link) is fixed, a designated distance acts as a constraint in all documents.

(4) When the right and left edges of a container are fixed, the horizontal positions of the edges of a page are identical in all documents. However, the height or vertical position of a container may change. For example, when the left edge of a container is fixed, the position of the left edge is identical in all documents, but the display position of associated contents may change so that they are displayed at an upper portion on a page in a given document but at a lower portion on a page in another document.

(5) When the upper and lower edges of a container are fixed, the vertical positions of the edges of a page are identical in all documents. However, the width or horizontal position of a container may change in each document.

(6) The vertical axis of a container is a virtual vertical line which is parallel to the right and left edges of the container and positioned between them. If the vertical axis of a container is fixed, the average (i.e., center position between the right and left edges) of the horizontal positions of the right and left edges of the container is identical in all documents. Under this constraint, the width of a container may change. However, the vertical axis is at the same horizontal position in all documents including a document whose right and left edges are the farthest from the vertical axis and a document whose right and left edges are the closest to the vertical axis. The height and vertical position of a container are not influenced by this constraint.

(7) Similarly, if the horizontal axis is fixed, the average of the upper and lower edges of a container coincides with the same vertical position. However, the width and horizontal position of a container are not influenced by this constraint.

(8) When both the horizontal and vertical axes are fixed, this means that the center position of a container is fixed. However, the width and height of a container are not influenced by this constraint.

(9) When the corner position of a container, the intermediate position of the edge of the container, or the center position of the container is fixed, the fixed position is identical in all documents. For example, if the upper left corner of a container is fixed, the upper left position of a laid-out container is identical in all documents.

(10) A vertical edge or axis can be fixed in association with the left or right edge of a page, a left or right page margin, or another horizontal position. Similarly, a horizontal edge or axis can be fixed in association with the upper or lower edge of a page, an upper or lower page margin, or another vertical position.

A term opposite to "fixed" is "flexible" which means that the edge, axis, corner, or intermediate position of a container, or a document constraint may change between documents (records). For example, the layout in a page is expected to dynamically change depending on the size and amount of variable data. For a specific container, its size and position may be desirably fixed or the four corners of a container at a corner of a page may be desirably fixed.

To meet these demands, the layout editing application 121 can properly set whether to fix or change (make flexible) an edge, axis, corner, intermediate position, or the like for each container (partial area). The user can create a desired basic layout when he decides the basic layout of the document template 180.

[Display and Editing of Container]
—Method of Creating New Container—

A container is described as either a text or image container. The text container has a text and buried image. The image container has only an image.

As shown in FIG. 4, a new text container or image container is created on the document template 309 by clicking the text container tool 404 or image container tool 405 with the mouse 133 and dragging a rectangle onto the document template 309.

Alternatively, a container may be created by making a desired one of the text container tool 404 and image container tool 405 active and simply clicking on the document template 309. In this case, a container of a default size is inserted into the template in accordance with clicking of the mouse 133, and a dialog box or another prompt for setting the dimensions of the new container or the like is provided.

Note that the container size may be set by various methods so that the container size is automatically defined in advance or a container is created and laid out in accordance with a calculated schema. A generated container is selected with an input device such as a mouse, and operation such as designation of properties with right clicking is performed. Then, the property dialog of a container is displayed, and constraints on the container can be set.

[Container Display Method]

FIGS. 5A to 5D illustrate display rules on the edge of a container.

The layout editing application 121 draws an edge by using a solid line 503 (item) or dotted line 504 in order to represent the state of the container edge. The layout editing application 121 also uses anchors 506, 507, and 509 (lines, shapes, or icons drawn near the edge of a container), a handle 502 (control point drawn on or near the edge of an area for movement and modification), the slider 413 (short parallel lines drawn on the two sides of an edge: see FIG. 4), a scaling icon 505, and the color.

The rules of the container display method shown in FIGS. 5A to 5D are as follows.

(1) In order to fix each edge, the edge is drawn in a solid line.

(2) When the width is fixed, the right and left edges are drawn in solid lines.

(3) When the height is fixed, the upper and lower edges are drawn in solid lines.

(4) No axis is drawn.

(5) Scaling icons are drawn near edges which are not drawn by rules (1) to (3), and these edges are drawn in dotted lines.

(6) If a pair of vertical and horizontal edges or vertical and horizontal axes is fixed, an anchor is drawn at the intersection.

(7) If no anchor is drawn on any fixed edge, a slider is drawn at the center of the edge.

(8) If neither anchor nor slider is drawn on a pair of vertical and horizontal edges or vertical and horizontal axes, a handle is drawn at the intersection.

Lines defined by rules (1), (2), and (3) are drawn in solid lines because these lines are fixed or restricted, as described above. A flexible line is drawn in a dotted line, as defined by rule (5). Anchors are displayed at fixed points defined by rules (6), (7), and (8), sliders are displayed on several fixed edges, and handles are displayed for other components.

The above rules give priority to a constraint set later by the user. More specifically, when another constraint is set later and the rules influence an edge to be drawn, the drawing contents of solid and dotted lines are changed. For example, when a container is so small that icons overlap each other or another display function becomes obscure, the icons may be changed or omitted to draw lines.

The place at which a flexible edge is drawn depends on the contents of a container. As will be described later, a "dynamic calibration process" is employed which means that contents are merged into a document template and visualized on a user interface. Alternate execution can be achieved by another means for deciding where a flexible edge is laid out in a user interface or in the content area of a container averaged in all documents.

These content representations provide a graphic function of displaying the state of each edge of a container. The representations are interpreted as follows.

(1) A dotted line means that the position of an edge in a document changes depending on the contents of a container, like the edge 410 in FIG. 4.

(2) The solid edge 414 means a fixed edge or an edge restricted because the width or height of a container is fixed (the four edges of the container 408 are drawn in solid lines and both the width and height are fixed).

(3) An anchor means that a place where edges or axes cross each other is fixed. Anchor points appear at horizontal and vertical positions in all documents, and anchors are naturally fixed. The icon 409 in FIG. 4 is an example of the anchor icon meaning that the position where the edges 414 cross each other is fixed.

(4) A slider means that the length of an associated edge is fixed but may be translated. For example, the slider 413 in FIG. 4 represents that the contents of the container 408 may be displayed left or right to a position given by a specific diagram in a document.

For example, when the image size or text amount of data flowed into the container 407 associated with the container 408 (link is set between them) is small, the size of the container 407 decreases. Thus, the container 408 is slid (translated) to the left, laid out, and displayed. When the size of the container 407 increases, the container 408 is slid to the right and laid out.

Some or all of these icons and edges are drawn or are not drawn depending on which of tools and containers is selected, highlighted, or made active. Generally, the edges and icons of a container are assistance to design a document template, and are not drawn on a printed material.

As described above, settings of a basic pattern such as the default, minimum, and maximum values of the width and height of a container are displayed in a secondary dialog window.

Figure 5A:
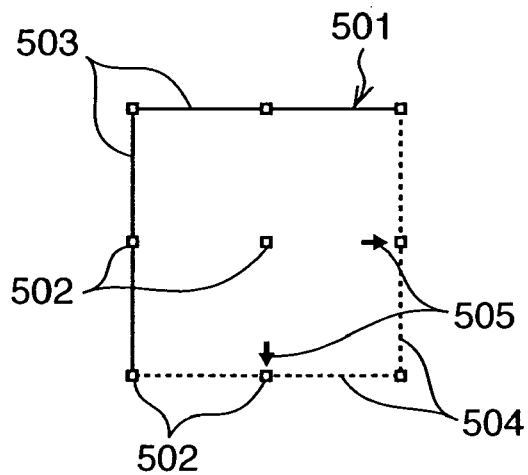
FIG. 5A is a view for explaining container display rules according to the first embodiment of the present invention.

In FIG. 5A, both the width and height of a container 501 are not fixed (are flexible). A fixed edge 503 is represented in a solid line, and a flexible edge 504 is represented in a dotted line. A scaling icon 505 exhibits that the adjacent edge 504 is flexible. An indicator in another form may be used instead or additionally.

Figure 5B:
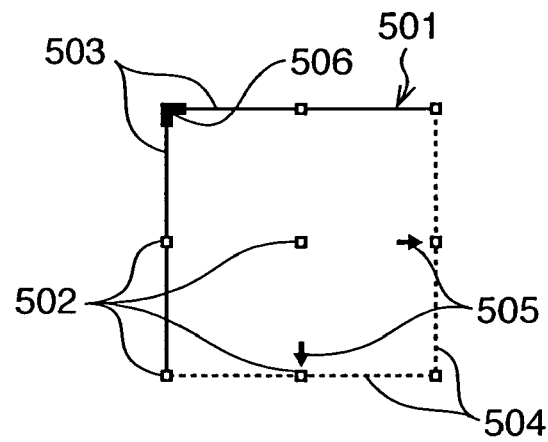
FIG. 5B is a view for explaining the container display rules according to the first embodiment of the present invention.

In FIG. 5B, both the width and height of the container 501 are flexible. An anchor icon 506 is so added as to explicitly represent that the corner position between two crossing edges 503 is fixed.

Figure 5C:
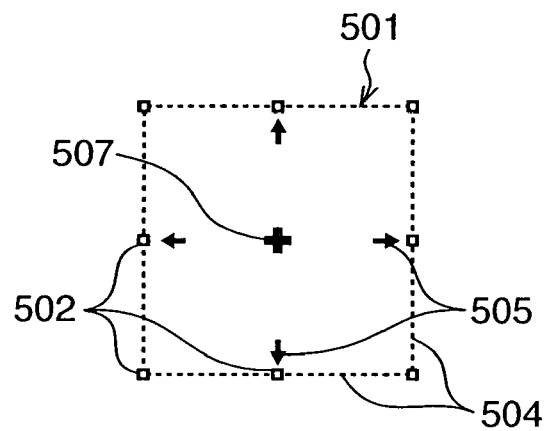
FIG. 5C is a view for explaining the container display rules according to the first embodiment of the present invention.

FIG. 5C shows a state in which both the width and height of the container 501 are flexible, and the container 501 can be equally enlarged in directions around the central point, as indicated by an arbitrary anchor icon 507. That is, the container 501 can be enlarged or reduced using the anchor icon 507 as a center. In enlargement/reduction, the layout is adjusted so that the position of the anchor icon 507 is always kept at the central point of the container 501.

Figure 5D:
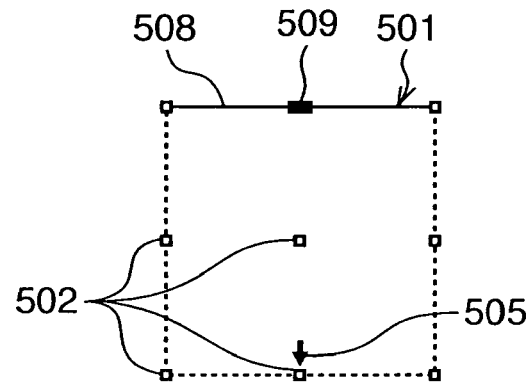
FIG. 5D is a view for explaining the container display rules according to the first embodiment of the present invention.

In FIG. 5D, an upper edge 508 of the container 501 is fixed, but both the width and height are flexible. The anchor icon 509 positioned at the center of the upper edge 508 is fixed. The left and right edges (502) of the container 501 pass the anchor icon 509 and move apart from or close to the vertical center axis (vertical axis).

[Link]

A link indicates association between containers. The association represents a distance between containers, and containers associated by a link execute layout calculation upon a change in their layouts. For example, the link 412 in FIG. 4 associates the containers 407 and 408 with each other, as described above. The link setting method and the layout calculation method for containers associated by a link will be described later.

[Link Setting Method]

Setting of a link for associating containers will be explained.

Figure 6:
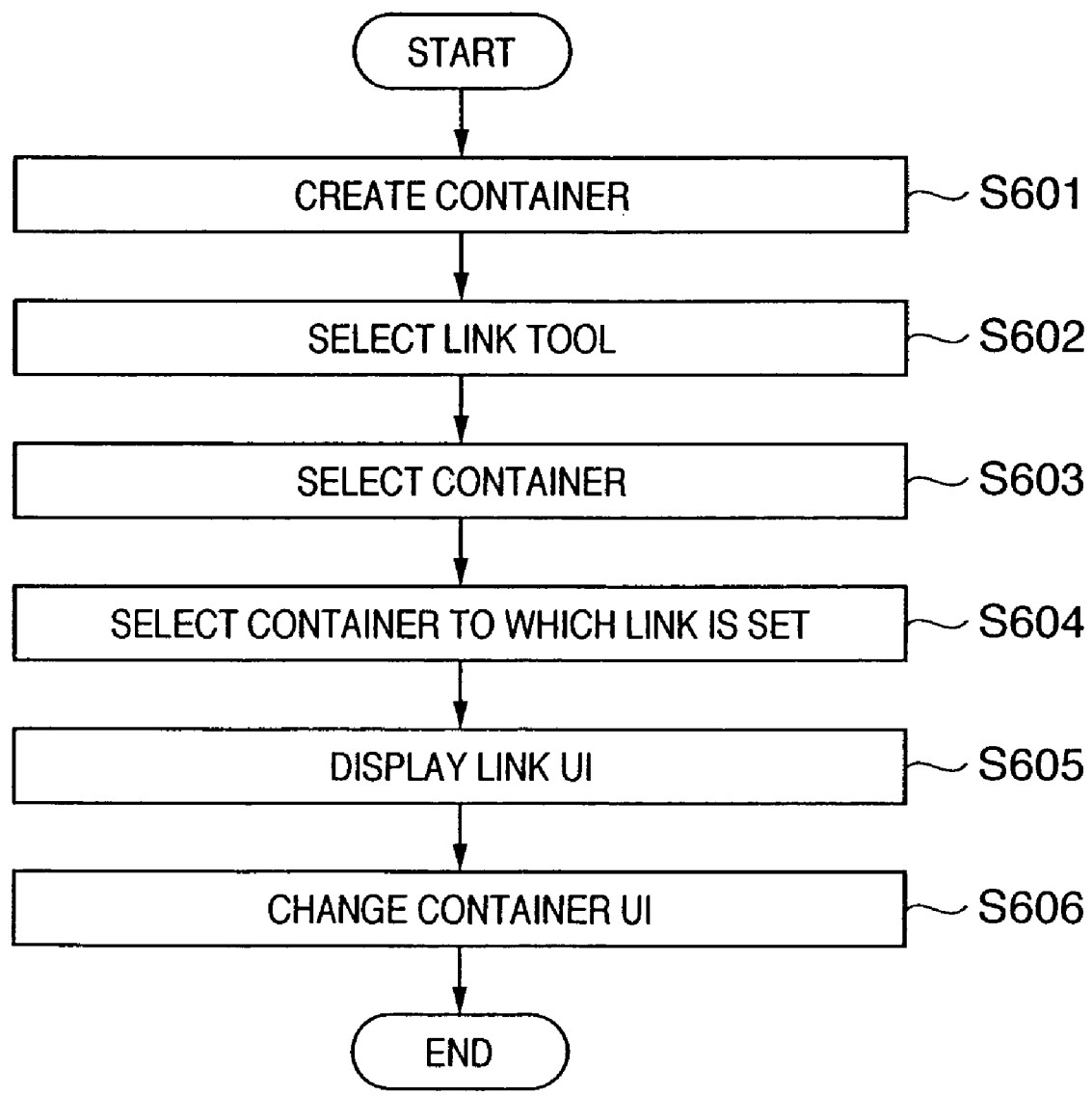
FIG. 6 is a flowchart showing a link setting process according to the first embodiment of the present invention.
Figure 7A:
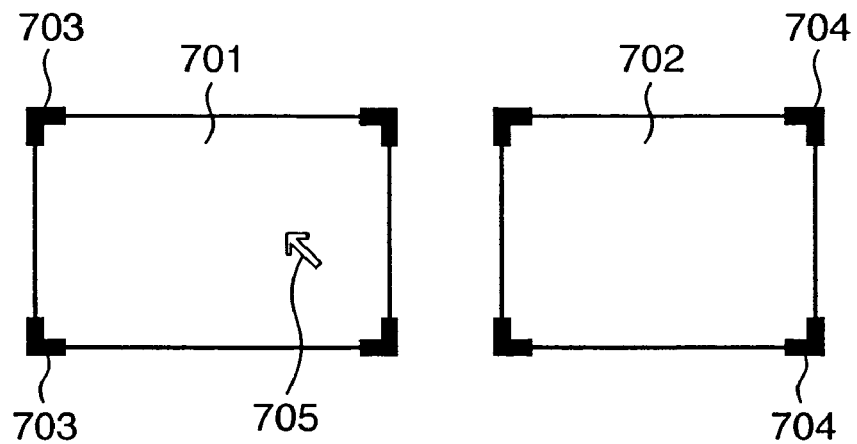
FIG. 7A is a view showing an example of transition of the user interface in setting a link according to the first embodiment of the present invention.
Figure 7B:
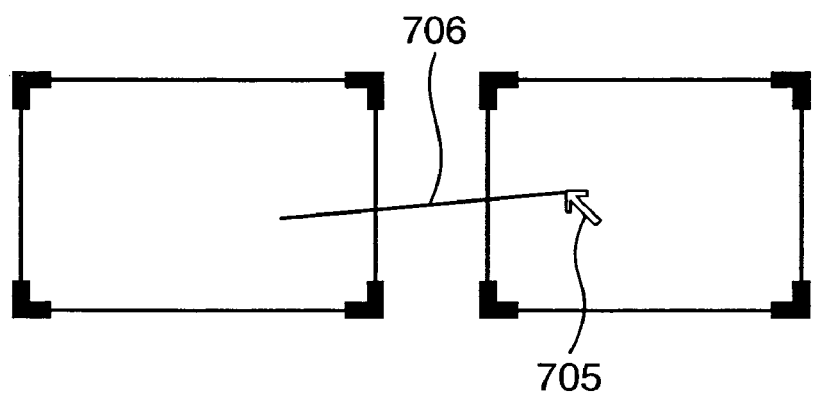
FIG. 7B is a view showing an example of transition of the user interface in setting a link according to the first embodiment of the present invention.
Figure 7C:
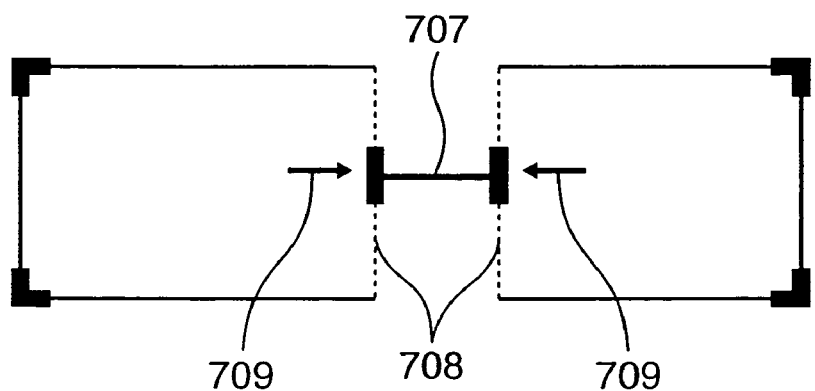
FIG. 7C is a view showing an example of transition of the user interface in setting a link according to the first embodiment of the present invention.

FIG. 6 is a flowchart showing a link setting process according to the first embodiment of the present invention. FIGS. 7A to 7C are views showing an example of transition of a user interface in setting a link according to the first embodiment of the present invention. The method of setting a link between containers will be explained with reference to FIGS. 6 and 7A to 7C.

In step S601, the layout editing application 121 displays a document template selected as an editing target in the work area 306 of the user interface. In order to set a link, (at least two) containers to which a link is to be set must be created on the document template. FIGS. 7A to 7C show an example of transition of the user interface when two containers are created and a link is set in step S601.

In step S602, the layout editing application 121 selects a link tool (the link tool is selected by clicking the button 406 in FIG. 4).

In FIG. 7A, containers 701 and 702 are made up of fixed edges. Reference numerals 703 and 704 denote anchors, similar to 409 in FIG. 4. Reference numeral 705 denotes a mouse pointer.

While the link tool is selected, the user clicks on and selects one (e.g., the container 701) of two containers to which a link is to be set. In accordance with this operation, the user interface 103 of the layout editing application 121 recognizes that the first container has been selected (step S603), and holds information which specifies the selected container.

A locus corresponding to subsequent movement of the mouse cursor is displayed on the screen. For example, a line segment 706 in FIG. 7B exhibits a line which connects a click position in the state of FIG. 7A and the current position of the mouse pointer 705. A UI indicated by the line segment 706 can present the user with a position at which a link is set.

As shown in FIG. 7B, the user moves the mouse pointer 705 to the other container (container 702) and clicks. In accordance with this operation, the user interface 103 recognizes that the second container has been selected (step S604), and holds information which specifies the selected container.

The layout editing application 121 sets a link between the first container selected in step S603 and the second container selected in step S604.

After the link is set between the two containers 701 and 702 selected by the user, a link 707 is displayed (step S605). In response to the link setting, the container display state changes to a state in FIG. 7C (step S606).

That is, the container UI is automatically changed upon setting the link. In this case, edges associated by the link become flexible and are drawn in dotted lines. In FIG. 7C, reference numeral 708 denotes an edge which is drawn in a dotted line and is a flexible edge, as described above.

The state of the container edge as shown in FIG. 7C is automatically changed when the need for making the container edge flexible arises upon setting a link. A purpose of this operation is to prevent a contradictory state in which all edges are fixed though a link is set. Reference numeral 709 denotes a mark which, similar to 505 in FIG. 5, visually presents the user with a direction in which a container can be changed upon setting a link. In the example of FIG. 7C, the right edge of the left container and the left edge of the right container change to a flexible state, but this is merely an example. The right container may change to a setting having the slider 413 in FIG. 4.

<Layout Calculation Process by Layout Engine>
[Layout Calculation Method (Overall Flow)]

The layout editing application 121 according to the first embodiment has at least two modes. One is a layout mode in which containers are created using the user interface 103 and associated (link is set) to create a layout. The other is a preview mode in which each record in the data source is inserted into a created layout by the layout engine 105 and a layout result to which the record is actually inserted is previewed.

In the preview mode, an actual record is inserted, and the layout is calculated. In the preview mode, layout calculation on the display is performed. In actual printing, the layout engine 105 inserts data into each container and calculates the layout, and the calculation method at this time is the same as that in the preview mode.

Figure 8:
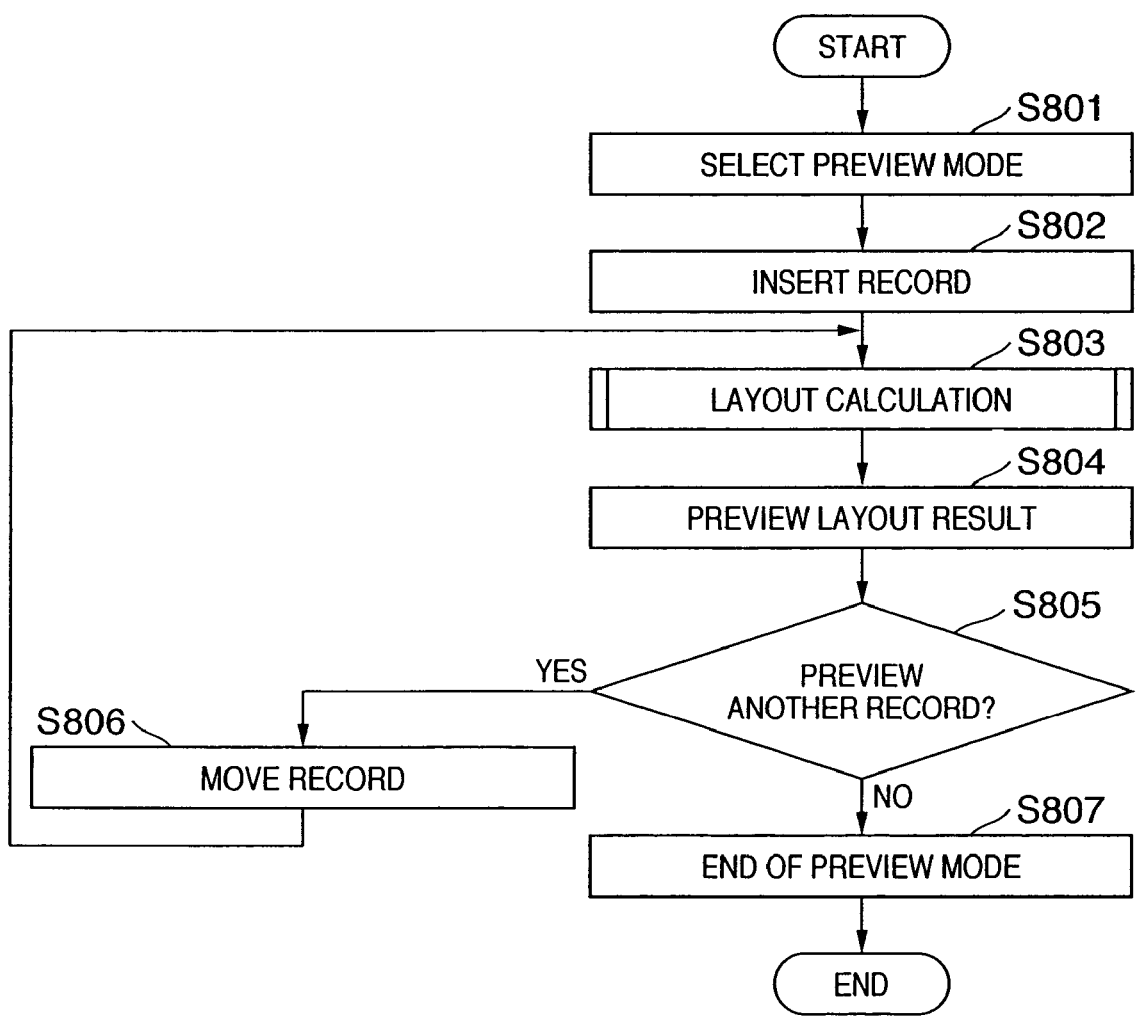
FIG. 8 is a flowchart showing a layout calculation process according to the first embodiment of the present invention.

FIG. 8 is a flowchart showing the layout calculation process according to the first embodiment of the present invention.

The preview mode is selected (step S801). In the preview mode, the layout editing application 121 prompts the user to select a record to be previewed from the data source, and inserts each field data of the selected record into each container (step S802).

After the field data is inserted into each container, the layout editing application 121 executes layout calculation for laying out the record, and if necessary, adjusts the layout (step S803). Details of layout calculation in step S803 will be described later.

The layout editing application 121 displays (previews) the layout calculated in step S803 (step S804). The layout editing application 121 determines on the basis of an instruction from the user whether to preview another record (step S805). If another record need not be previewed in step S805 (NO in step S805), the preview mode ends (step S807).

If another record needs to be previewed (YES in step S805), the layout editing application 121 selects another record, executes layout calculation again, and previews the calculated layout (step S806).

In printing, unlike the preview mode, layout calculation is sequentially performed for all records to be printed. In printing, therefore, step S804 is omitted, and whether all records to be printed have been processed is determined in step S805. In step S803, the results of layout calculation are drawn, output, and generated as print data using the printer driver, thereby outputting the print data to the printer. In this case, the process ends when print data are output for all records (all records to be printed).

[Layout Calculation Method (Details)]

Details of layout calculation in step S803 will be explained with reference to FIG. 9.

Figure 9:
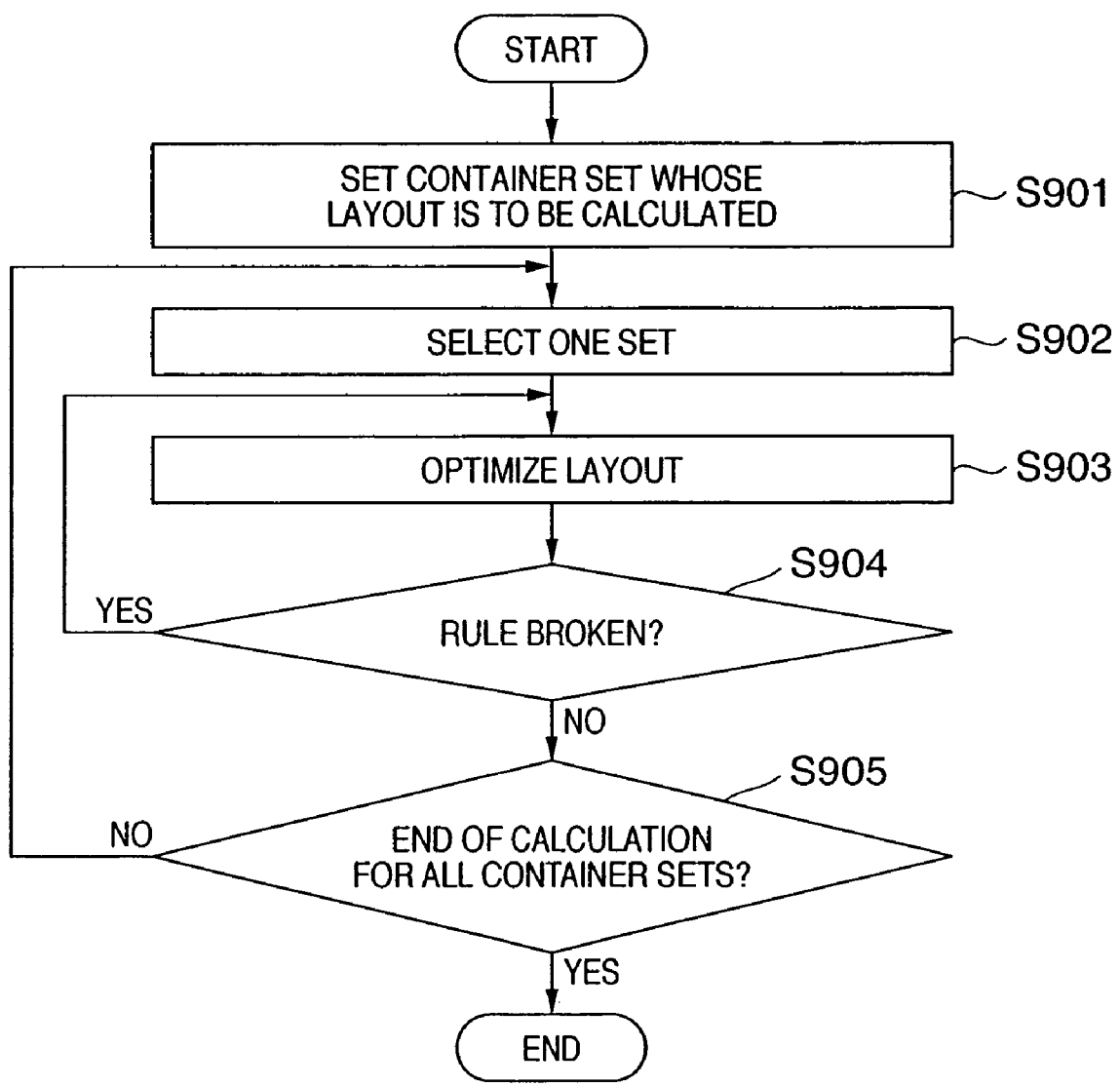
FIG. 9 is a flowchart showing details of the layout calculation process according to the first embodiment of the present invention.

FIG. 9 is a flowchart showing details of the layout calculation process according to the first embodiment of the present invention.

FIG. 9 is a flowchart for explaining only the layout calculation process, and this flow corresponds to a layout calculation process in printing/previewing of one record in variable data printing. For a plurality of records, the following process is repeated.

The layout editing application 121 sets a set of containers whose layout is to be calculated (step S901). Layout calculation is done for associated containers as one set.

Figure 10:
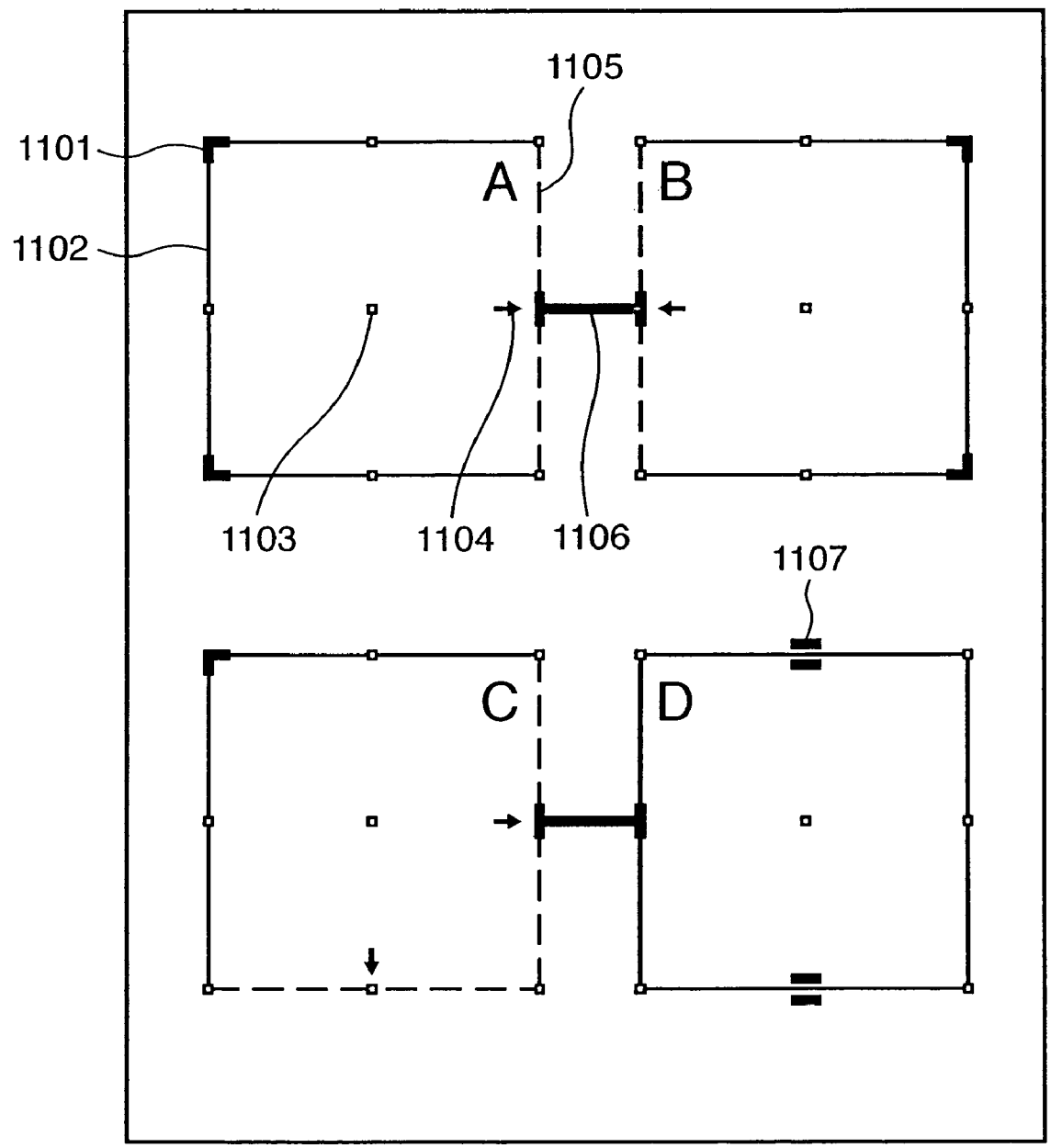
FIG. 10 is a view for explaining a set of containers in the layout calculation process according to the first embodiment of the present invention.

For example, referring to FIG. 10, four containers are laid out on a page, and association is set between the containers. In this case, containers A and B are associated by a link, whereas containers C and D are associated by a link.

Containers A and B are specified as set 1, whereas containers C and D are specified as set 2. In other words, containers connected by a link are specified as one set. As described above, reference numeral 1101 denotes an anchor; 1102, a fixed edge; 1103, a controller; 1104, an arrow indicating a direction in which a flexible edge changes; 1105, a flexible edge; 1106, a link; and 1107, a slider.

The layout editing application 121 selects one of the container sets obtained in step S901 in order to calculate a layout (step S902). The layout is calculated for the selected container set.

For two containers A and B as flexible elements contained in the selected container set, a size when each container is free from any constraint is calculated from the image size or text amount of data to be flowed.

More specifically, the layout editing application 121 determines whether container A is an image data container or text container. This determination is made on the basis of an attribute set for the container, as described above.

Then, the layout editing application 121 loads data flowed into container A. When container A is an image data container, the size (the numbers of pixels corresponding to the width and height, and resolution) of the image data is a size when container A is free from any constraint.

When container A is a text container, the amount of text data to be flowed into container A can be calculated on the basis of the number of characters and character attributes (e.g., the font type, font size, character pitch, and line pitch) designated by the container attributes of container A.

For a text container, constraints are imposed because the aspect ratio of container A cannot be decided unless constraints are taken into consideration. In the example of FIG. 10, anchors are set at the upper and lower left corners of container A, and its height (longitudinal direction) is fixed. The layout editing application 121 determines whether characters of a calculated data amount (text amount) can be flowed into container A having a width (lateral direction) set as the basic pattern of container A.

If the layout editing application 121 determines that all characters can be flowed, the size (width and height) of container A that are set by the basic pattern is not changed. If the layout editing application 121 determines that all characters cannot be flowed, container A extends in the lateral direction because the height is fixed by anchor setting. The layout editing application 121 calculates the width of container A at which characters of the calculated data amount can be flowed, and thereby calculates the size of container A.

The layout editing application 121 optimizes the layout so as to minimize the difference between the size of the laid-out container and that of actual contents (step S903).

The layout is optimized so that the difference between the layout size and the size of contents to be inserted into a container is minimized in each of containers which are so associated as to dynamically change their sizes.

The layout editing application 121 calculates the size of the container set that is calculated in step S902, i.e., the total size of containers A and B and link 1106 (in this case, fixed link). The layout editing application 121 calculates the difference between the total size and the size (in the example of FIG. 10, corresponding to the distances of the anchor icons of containers A and B) of the container set in the basic layout. If containers A and B become wider, a difference value is generated after calculation in the previous step. The layout editing application 121 adjusts the layout by equally distributing the difference value to respective elements of the container set.

The layout editing application 121 optimizes the layout, and determines whether the layout breaks the rules (step S904). If the layout does not break rules (YES in step S904), the process advances to step S905. If the layout breaks the rules (NO in step S904), the process returns to step S903 to calculate the layout again so as not to break the rules.

The rules are constraints set by the user in creating a layout, and include constraints on the flexible range of the size of a container, and the position of the container, and for a flexible link, a constraint on a change of the length of the link. After the layout editing application 121 calculates the layout so as not to break the rules, the layout of the set is completed.

The process from steps S902 to S904 is performed for all sets on the page, and the layout editing application 121 determines whether the layout of the entire page has been calculated (step S905). If the calculation has not ended (NO in step S905), the process returns to step S902. If the calculation has ended (YES in step S905), the process ends.

An example of a UI in the above-described layout calculation will be explained with reference to FIGS. 11A to 11C.

Figure 11A:
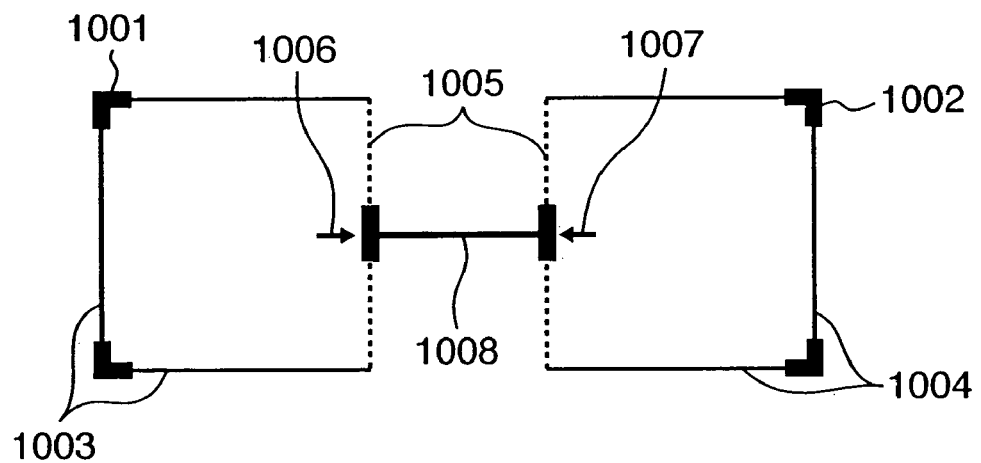
FIG. 11A is a view showing an example of the user interface in the layout calculation process according to the first embodiment of the present invention.
Figure 11B:
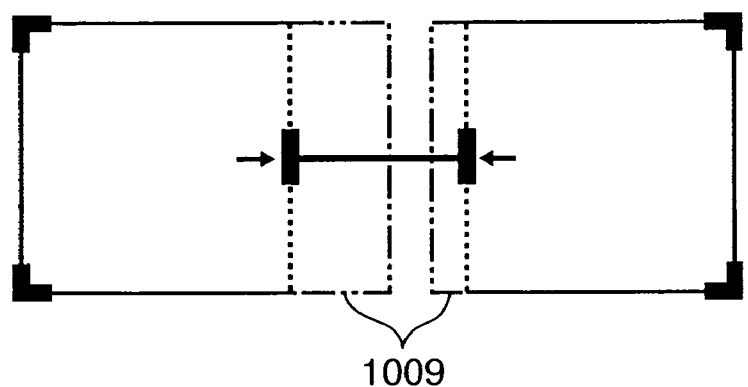
FIG. 11B is a view showing the example of the user interface in the layout calculation process according to the first embodiment of the present invention.
Figure 11C:
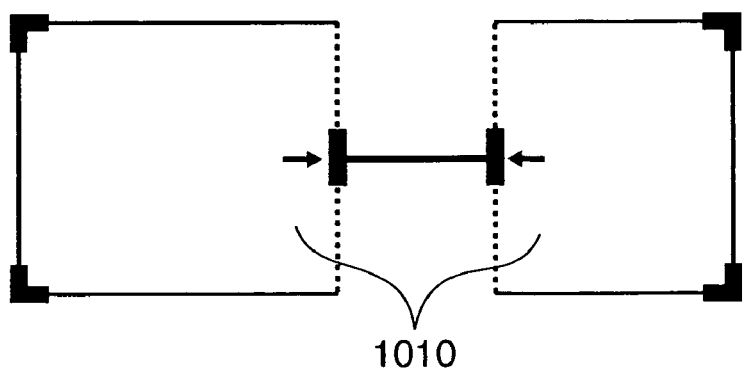
FIG. 11C is a view showing the example of the user interface in the layout calculation process according to the first embodiment of the present invention.

FIGS. 11A to 11C are views showing an example of a user interface in the layout calculation process according to the first embodiment of the present invention.

FIG. 11A shows a state in which a given record is inserted and the layout is decided. Reference numerals 1001 and 1002 denote anchors; 1003 and 1004, fixed edges; 1005, a flexible edge; 1006, an arrow indicating a direction in which a flexible edge changes; and 1108, a link. In this state, a record is changed, and contents of different sizes are inserted.

FIG. 11B shows the size of new contents over the state of FIG. 11A. Reference numeral 1009 denotes a size of contents which are inserted into each container. After that, the layout is calculated.

FIG. 11C shows the result of layout calculation. The size of each container after calculation is so calculated as to have a difference equal to that of the size of contents to be actually inserted, and not to break the above-mentioned rules. As shown in FIG. 11C, the inserted-content size 1009 shown in FIG. 11B and a calculated content size 1010 have the same difference.

[Setting of Flexible Link]

Figure 12:
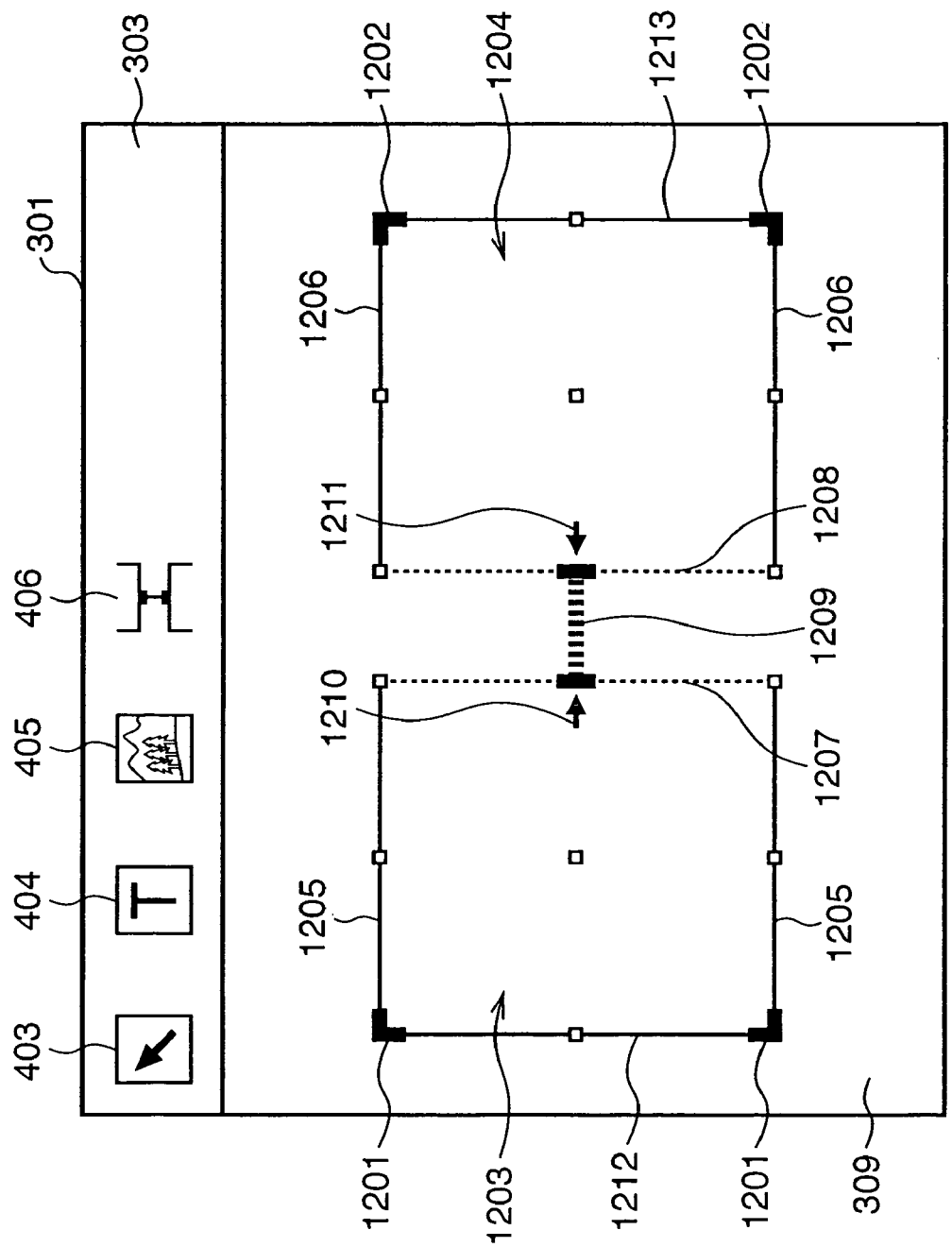
FIG. 12 is a view showing an example of a user interface for setting a flexible link according to the first embodiment of the present invention.

FIG. 12 is a view showing an example of a user interface for setting a flexible link according to the first embodiment of the present invention.

In FIG. 12, similar to FIG. 4, the application window 301 and tool bar 303 are provided. In the state of FIG. 12, containers 1203 and 1204 exist on the document template 309. These containers include anchor icons 1201 and 1202, and fixed edges 1205 and 1206, respectively.

A link 1209 of a flexible size is set between the containers 1203 and 1204, and links them. Since the link 1209 is set between the containers 1203 and 1204, a right edge 1207 of the container 1203 and a left edge 1208 of the container 1204 are represented in dotted lines. Indicators 1210 and 1211 are displayed on the respective containers to exhibit that the edges 1207 and 1208 are flexible.

Figure 13:
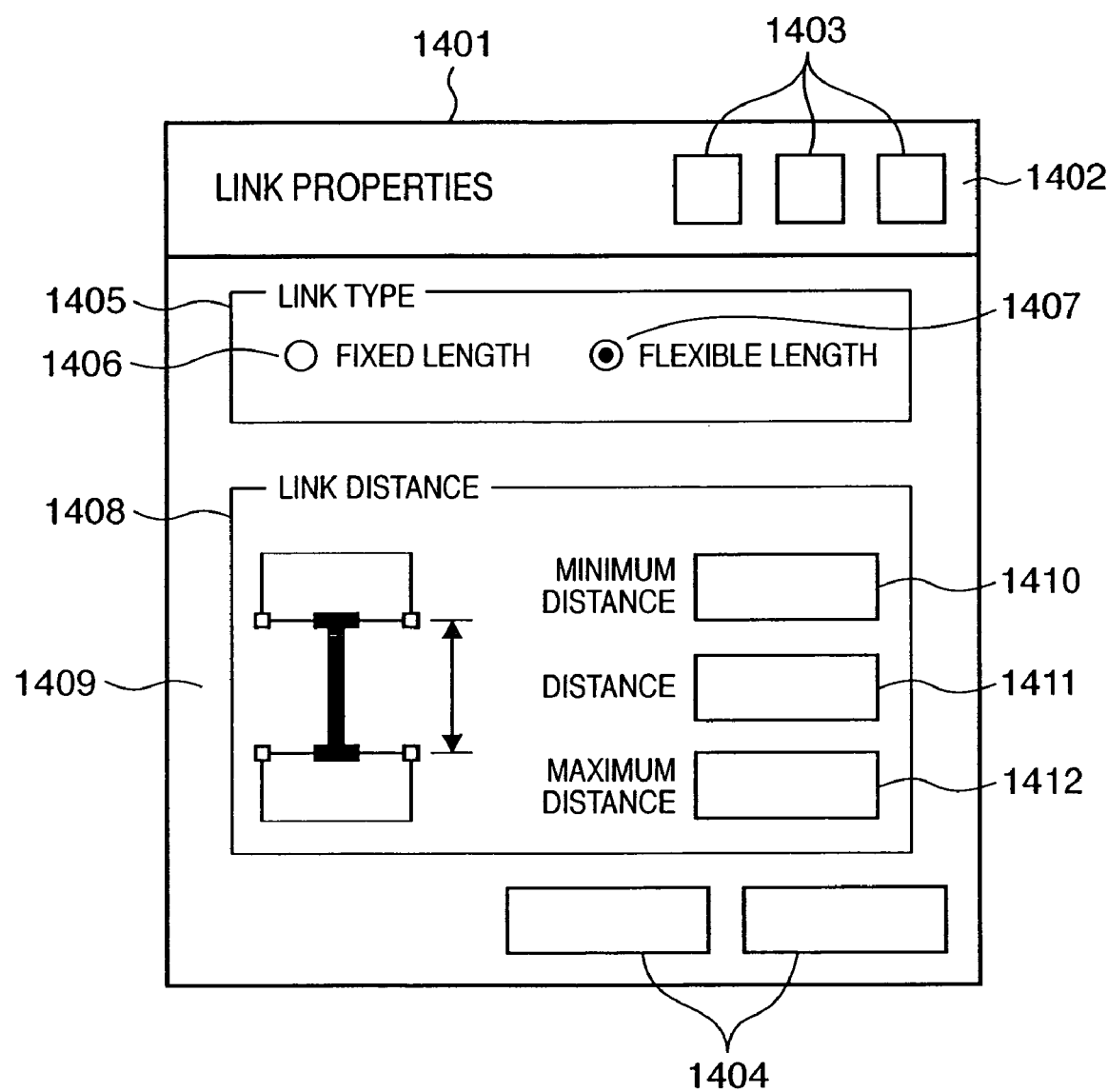
FIG. 13 is a view showing an example of a user interface which implements a link setting function according to the first embodiment of the present invention.

FIG. 13 is a view showing an example of a user interface which implements a link setting function according to the first embodiment of the present invention.

FIG. 13 illustrates an example of a dialog window 1401 for setting information on the link 1209. The dialog window 1401 is made up of a title bar 1402, a tool button 1403, a button 1404 for opening/closing the dialog window 1401, and an area 1409 for setting various pieces of information.

The dialog window 1401 provides a link type field 1405 having radio buttons for alternatively selecting whether the link type is a link of a flexible length (1407) or a link of a fixed length (1406).

When the link type exhibits a flexible length, a link distance field 1408 is highlighted which is made up of a minimum value field 1410 (minimum distance) for the link length, a maximum value field 1412 (maximum distance), and a reference value field (distance).

The dialog window 1401 in FIG. 13 is displayed when, for example, a link is set between two containers by link setting operation described with reference to FIGS. 6 and 7A to 7C, and the set link is then selected by operation such as clicking. Alternatively, the dialog window 1401 associated with a link may be automatically displayed immediately after the link is set. A reference value 1411 of the distance between containers is a link length used when the size of each container is not changed upon flowing data.

A flexible link setting method will be explained with reference to FIG. 14.

Figure 14:
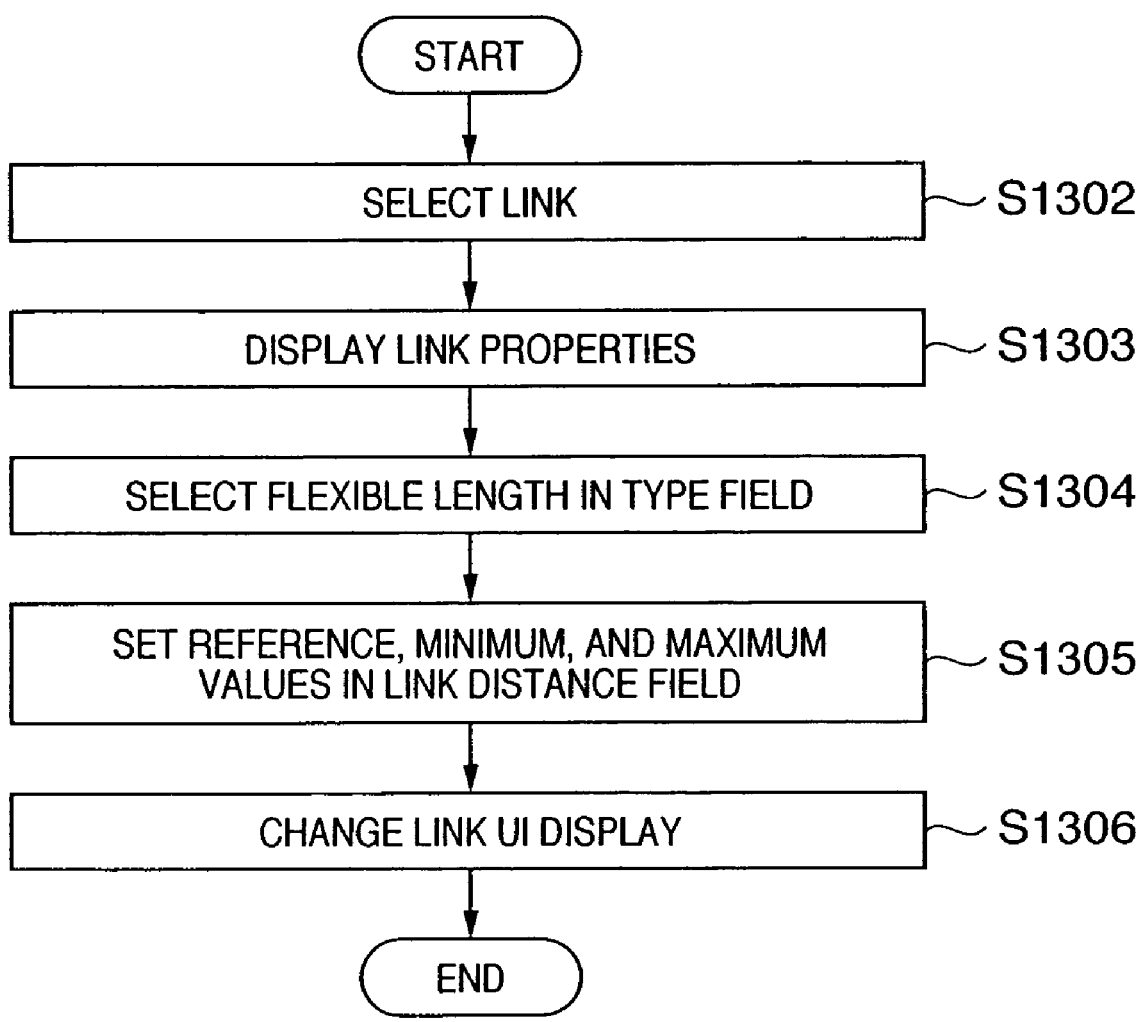
FIG. 14 is a flowchart showing a flexible link setting process according to the first embodiment of the present invention.

FIG. 14 is a flowchart showing a flexible link setting process according to the first embodiment of the present invention.

For example, when a link is set between two containers A and B in FIG. 10 by link setting operation described with reference to FIGS. 6 and 7A to 7C, a link of a fixed size is set. By selecting the link and executing a process shown in FIG. 14, the link can be changed from the link 1106 (FIG. 10) of the fixed size to the link 1209 (FIG. 12) of the flexible size.

A desired link (e.g., the link 1106 in FIG. 10) is selected with the mouse 133 (step S1302). After predetermined operation for displaying link properties is done, the user interface 103 of the layout editing application 121 displays the dialog window 1401 (FIG. 13) corresponding to the selected link (to be referred to as a target link hereinafter) (step S1303).

Link selection operation may be any operation such as right clicking of the mouse 133 or operation of a specific key of the keyboard 132, similar to setting of the basic pattern of a container.

The displayed dialog window 1401 shows the current state of the selected link. Since the link 1106 is selected in this example, the link size is fixed at this state, and the distance 1406 representing a fixed length is selected in the link type field 1405.

In order to change the link from the fixed size to a flexible size in the dialog window 1401, the flexible length button 1407 for setting a flexible link size is selected in the link type field 1405 (step S1304).

Accordingly, the maximum distance field 1412, minimum distance field 1410, and reference value field 1411 which are arranged in the link distance field 1408 become effective, allowing setting of numerical values. In order to set a flexible size of the link, the user sets the maximum value of the link length in the maximum distance field 1412, the minimum value in the minimum distance field 1410, and the current value in the reference value field 1411 (step S1305).

After setting, the user instructs the layout editing application 121 to apply these settings with the general dialog window open/close button 1404. When the user interface 103 detects this instruction, the user interface 103 reflects the setting state on the target link. Consequently, the link UI display is changed to a state as indicated by the link 1209 in FIG. 12 (step S1306).

Setting information of the dialog window 1401 is stored in, e.g., the memory 136.

An example of a layout result will be described with reference to FIGS. 15 and 16.

Figure 15:
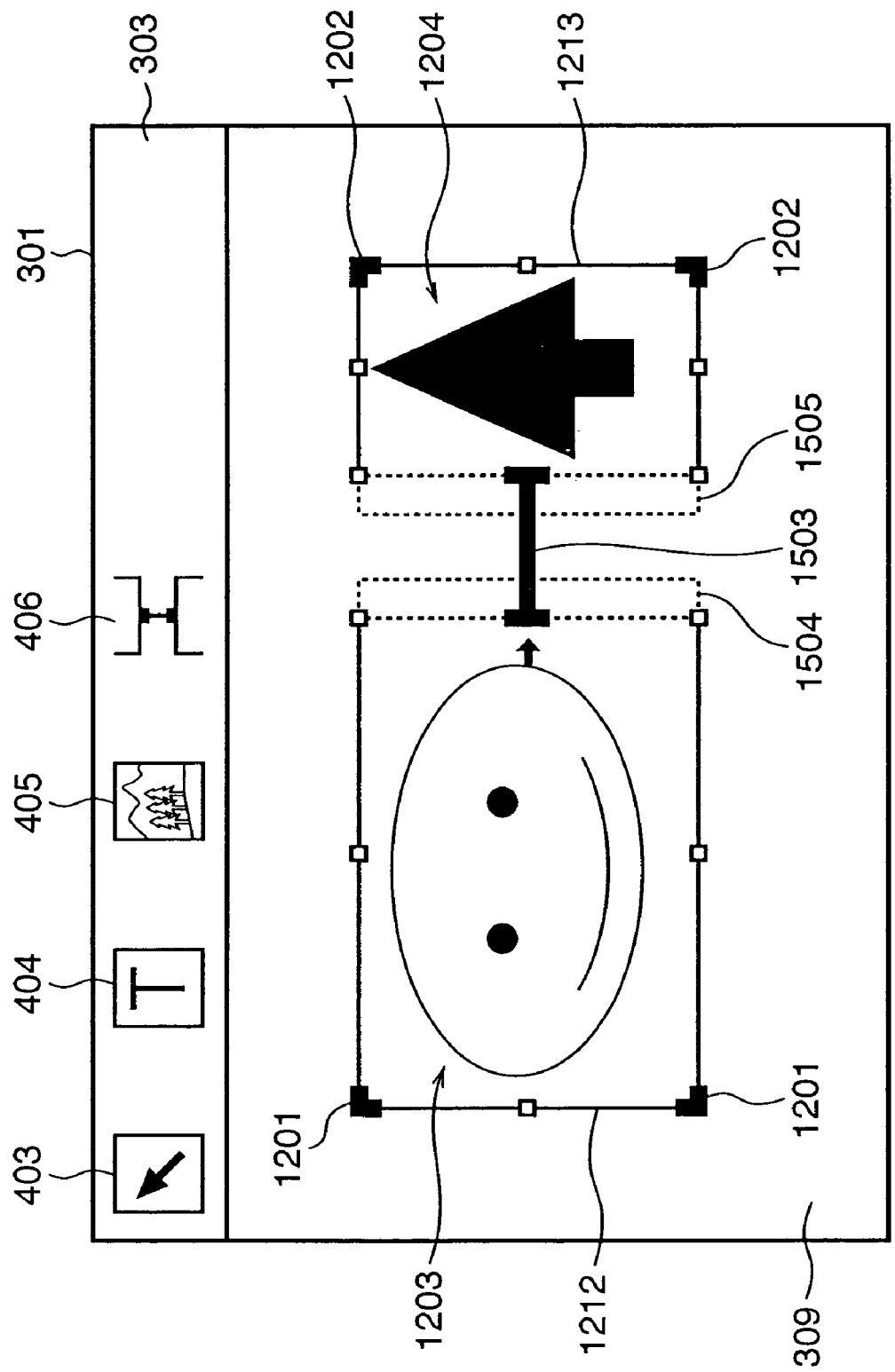
FIG. 15 is a view showing a layout result when a link of a fixed size is used according to the first embodiment of the present invention.

FIG. 15 is a view showing a layout result when a link of a fixed size is used according to the first embodiment of the present invention.

The layout calculation method is executed in the above-described way. For example, assume that image data of different sizes are inserted into the containers 1203 and 1204 in FIG. 15. In this case, each container regards the data size to be optimal. The container 1203 tries to change its size to the right so as to move close to a frame 1504 (optimal container size) which corresponds to the size of the inserted image. Similarly, the container 1204 tries to change its size to the left so as to move close to a frame 1505 (optimal container size) which corresponds to the size of the inserted image.

Since the containers 1203 and 1204 cannot move a left edge 1212 and right edge 1213 owing to the anchors 1201 and 1202, respectively, the interval between the containers 1203 and 1204 must be narrowed to change the size. However, a link 1503 of a fixed size is set between the containers 1203 and 1204, the length of the link 1503 is maintained in layout calculation, and thus the sizes of the containers 1203 and 1204 are changed.

As a result, the containers 1203 and 1204 cannot ensure optimal sizes corresponding to the aspect ratio of data, and finally become smaller than the optimal sizes (frames 1504 and 1505), as shown in FIG. 15. Since the size of the link 1503 is fixed, the containers 1203 and 1204 cannot achieve their optimal sizes (in FIG. 15, a range indicated by a chain line in each container represents the aspect ratio of data).

Figure 16:
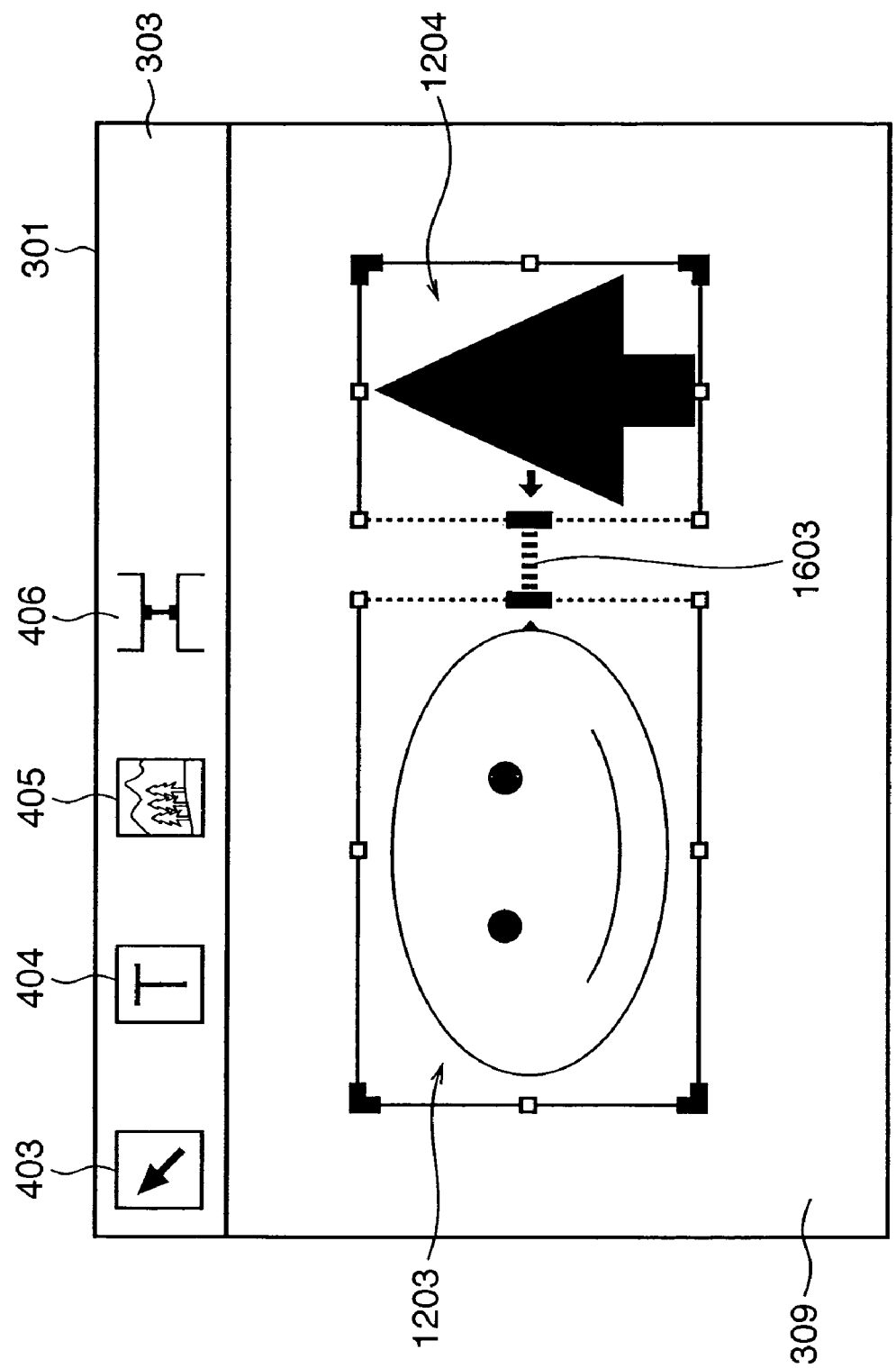
FIG. 16 is a view showing a layout result when a link of a flexible size is used according to the first embodiment of the present invention.

FIG. 16 shows a case wherein the link has a flexible size in the same state as that in FIG. 15.

In this case, a link 1603 of a flexible size is set between the containers 1203 and 1204 in the above example, as shown in FIG. 16. When the sizes of the containers 1203 and 1204 are changed, the link size decreases to make the sizes of the containers 1203 and 1204 larger than those in the example of FIG. 15.

Hence, an optimal size corresponding to the size of data to be inserted can be achieved, or a container frame closer to the size (optimal size) of data to be inserted can be set. FIG. 16 shows this result, and the flexible link 1209 in FIG. 12 has a size state as given by the flexible link 1603 as a result of layout calculation. In this case, the containers 1203 and 1204 change to optimal sizes (sizes complying with their data sizes), respectively.

The basic configuration as a premise of the present invention has been described.

The configuration of the layout preview application 227 will be explained.

<Description of Layout Preview Application>

An example of a user interface implemented by the user interface 229 of the layout preview application 227 will be described with reference to FIG. 17.

[Main Window]

Figure 17:
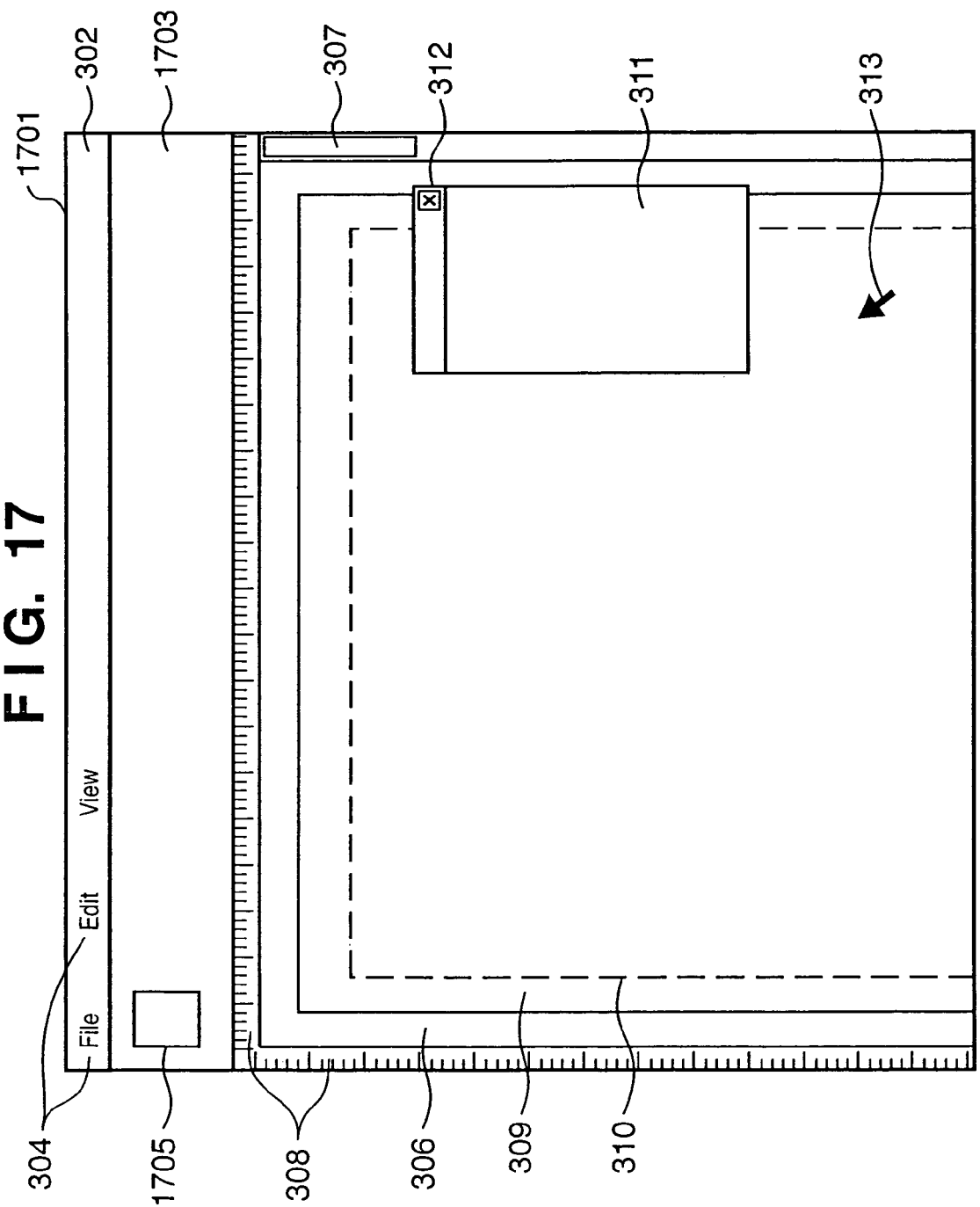
FIG. 17 is a view showing an example of a user interface according to the first embodiment of the present invention.

FIG. 17 is a view showing an example of the user interface according to the first embodiment of the present invention.

In FIG. 17, the same reference numerals as those of the user interface in FIG. 3 denote the same parts.

As shown in FIG. 17, the user interface 229 displays on the display device 144 a user interface formed in an application window 1701 upon operation. The application window 1701 is almost identical to the application window 301 of the layout editing application 121 except that the application window 1701 cannot perform creation of a new container, and creation and saving of a document template. That is, in FIG. 17, the numbers of tool buttons and widgets (components) 1705 which are provided on a tool bar 1703 are limited in comparison with the tool bar 303 in FIG. 3.

In the following description, a difference of the layout preview application 227 from the layout editing application 121 will be mainly explained.

Figure 18:
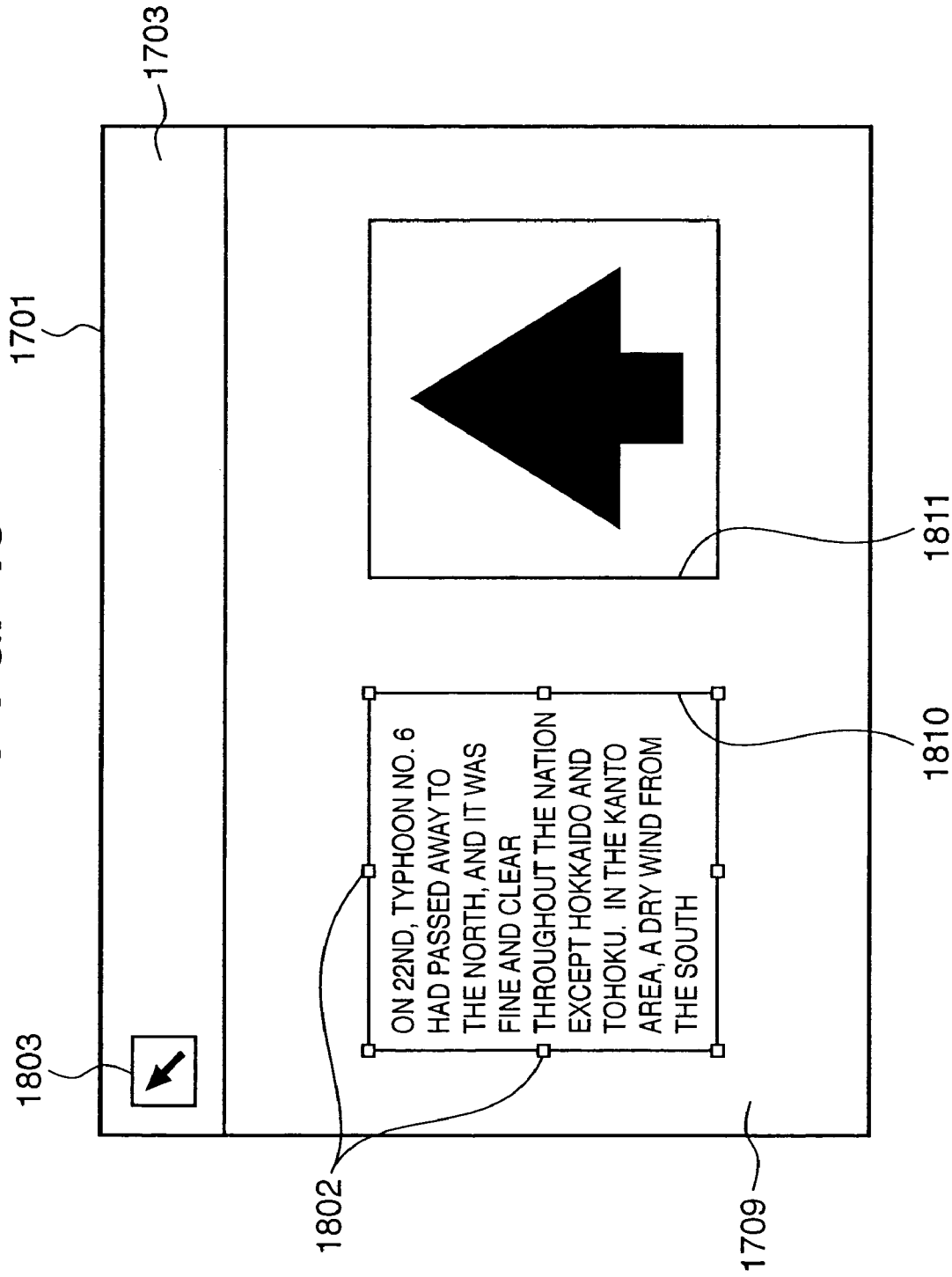
FIG. 18 is a view showing a display example of a container in the user interface according to the first embodiment of the present invention.

The tool bar 1703 has at least a "button" 1803 selectable by the user, as shown in FIG. 18.

(1) Selection tool button 1803: The button has the same function as that of the selection tool button 403 of the layout editing application 121.

[Document Template]

In FIG. 18, when the user opens a document template directly or indirectly, the layout engine 231 creates a document which is merged with contents from the data source 190 and undergoes layout calculation. In some systems, a document template designated by the system may be automatically opened without selecting a document template by the user via the user interface 229, or an icon, document name, or the like may be designated or selected instead of designating a file.

In general, modification of a document template and modification of data in the database pose security problems, and a general user is not authorized to perform modification. For this reason, the user interface 229 can designate previewing and printing of a generated document, but cannot designate editing and saving of a document template itself. However, partial modification is permitted as an item which is applied when a given general user prints (which does not influence other general users). This will be explained.

[Display and Editing of Container]

As a temporal modification item, the user interface 229 of the layout preview application 227 can designate editing (adjustment) of a document template such as movement of a container, resizing of the container, or a change of decoration attributes. However, editing is targeted not on the document template itself but on each container for each record (each page when the document template is designed for one page). Even if, therefore, a predetermined container is edited during previewing of a given record, the document template does not influence a container for another record that corresponds to the predetermined container.

Also, the layout preview application 227 cannot perform creation of a new container, setting of constraints on a container, setting of a link between containers, or a change of an external source from which data is merged with a container. The document template is edited by a user (administrator) who can utilize the layout editing application 121, as described above.

[Save and Reloading]

When the user interface 229 of the layout preview application 227 designates saving, a result of adjusting a document in a container is saved in a file. Details of this process will be described later.

A schematic flow when the layout preview application 227 is executed will be explained with reference to FIG. 19.

Figure 19:
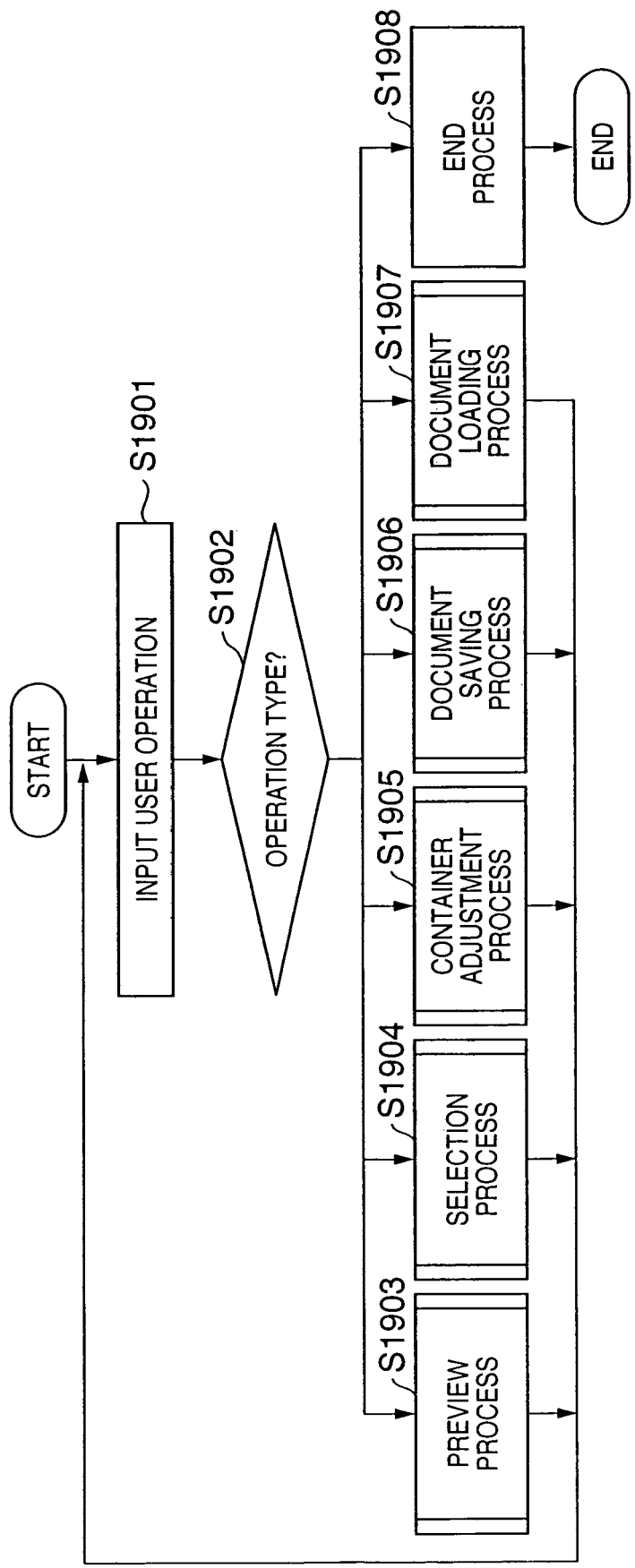
FIG. 19 is a flowchart showing a schematic flow by a layout preview application according to the first embodiment of the present invention.

FIG. 19 is a flowchart showing a schematic flow by the layout preview application according to the first embodiment of the present invention.

The layout preview application 227 accepts user operation via the user interface 229 (step S1901). The layout preview application 227 determines the contents of the user operation (step S1902). The flow branches to processes in steps S1903 to S1908 in accordance with the user operation, and each process is executed.

Each process executed in accordance with user operation will be explained.

If the user issues a preview instruction via the user interface 229, the layout preview application 227 executes a preview process for a result of calculation using the layout engine 231 in step S1903.

Details of the preview process will be described with reference to FIG. 20.

Figure 20:
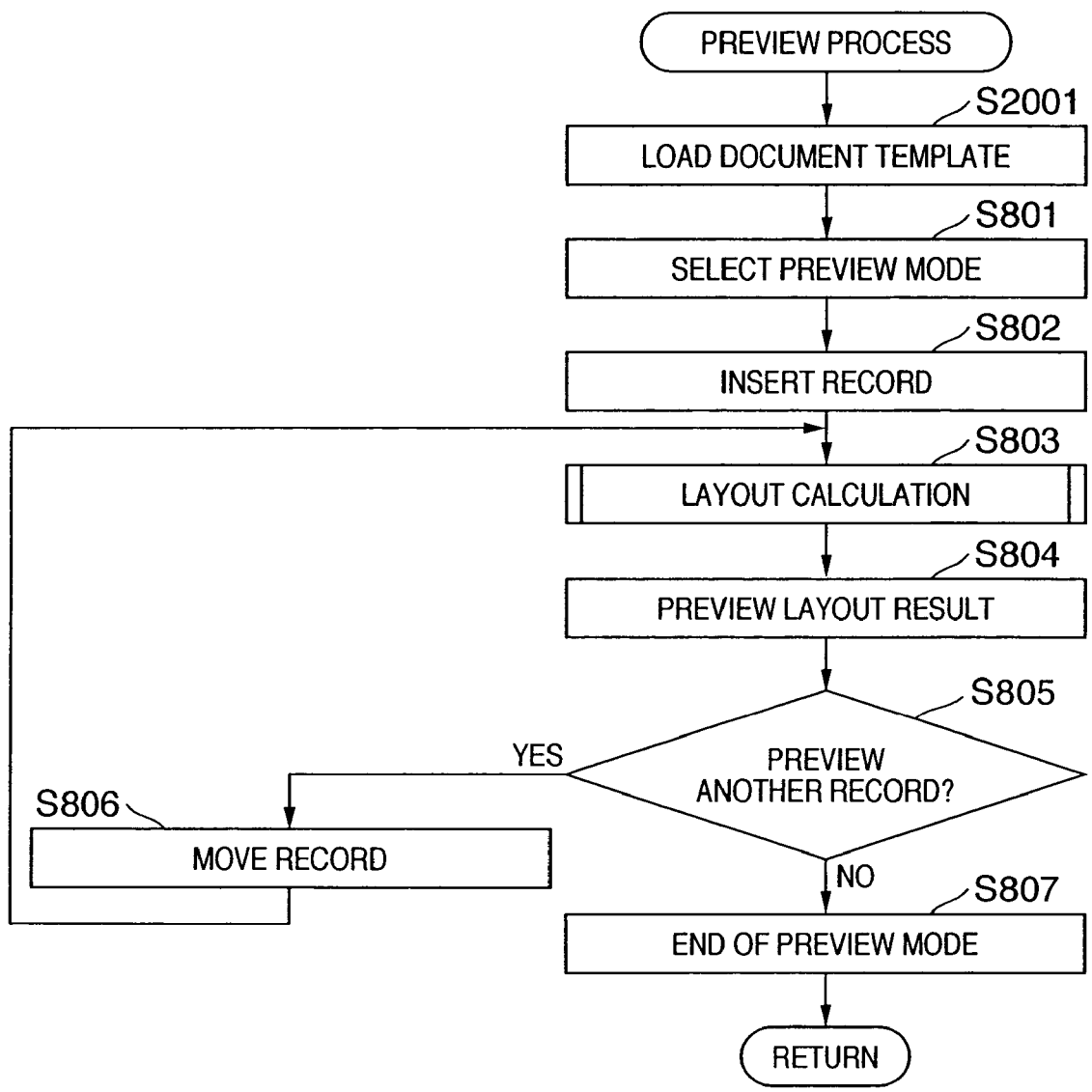
FIG. 20 is a flowchart showing details of a preview process according to the first embodiment of the present invention.

FIG. 20 is a flowchart showing details of the preview process according to the first embodiment of the present invention.

In FIG. 20, the same step numbers as in FIG. 8 denote the same steps, and details thereof will be omitted.

The layout preview application 227 loads a document template designated via the user interface 229 (step S2001). Subsequent processes are the same as those in FIG. 8. As a result of the preview process, a document template 1709 is displayed in the application window 1701, as shown in FIG. 18. At this time, a button on the tool bar 1703 is switched to the selection tool button 1803.

In FIG. 19, when containers 1810 and 1811 on the document template 1709 are clicked by user operation of the mouse 133 with the cursor/pointer 313, the layout preview application 227 recognizes that the containers have been selected. In response to this, a selection process in step S1904 is executed.

Details of the selection process in step S1904 will be explained with reference to FIG. 21.

Figure 21:
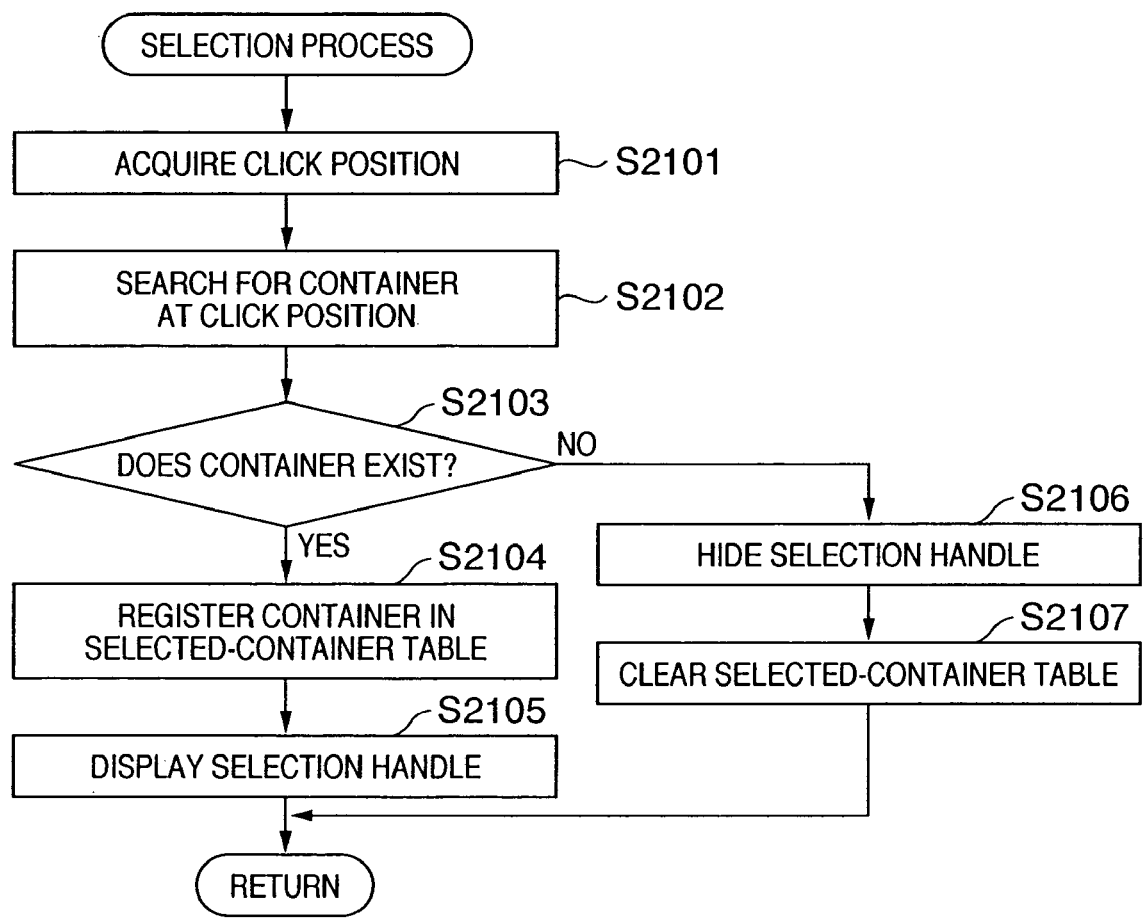
FIG. 21 is a flowchart showing details of a selection process according to the first embodiment of the present invention.

FIG. 21 is a flowchart showing details of the selection process according to the first embodiment of the present invention.

The layout preview application 227 acquires a position (click position) at which the cursor/pointer 313 has been clicked (step S2101). The layout preview application 227 searches for a container which exists on the uppermost layer at the click position in the document template 1709 (step S2102). The layout preview application 227 determines the presence/absence of a container on the basis of the search result (step S2103).

The presence/absence of a container is determined by determining whether the coordinates of the click position belong to a coordinate area where the container exists.

If a container exists (YES in step S2103), the layout preview application 227 registers the container in a selected-container table in a work area which is ensured in the memory 136 and used by the layout preview application 227 (step S2104). Further, the layout preview application 227 displays a selection handle for operating the selected container (step S2105).

If no container exists (NO in step S2103), the layout preview application 227 hides the selection handle for operating the selected container (step S2106). Then, the layout preview application 227 clears the contents of the selected-container table (step S2107).

The selected-container table is made up of a page number to which a selected container belongs, and an ID (container ID) which uniquely represents the container in the document template. Even if the same container is selected in the document template but a generated document has a different page number, the container is registered as another container in the selected-container table.

An example of the selected-container table will be described with reference to FIG. 22.

FIG. 22 is a table showing an example of the selected-container table according to the first embodiment of the present invention.

In the example shown in FIG. 22, a container having a container ID "15" is selected in a document template for the third page (page number 3) of a document.

The layout preview application 227 is different from the layout editing application 121 in that even when different pages are previewed, the layout editing application 121 treats the identical containers as the same one in the document template.

In the first embodiment, the number of containers which can be selected at once is one, but a plurality of containers can also be selected at once by a well-known technique. In this case, it is desirable to inhibit selection of a container on a different page in terms of user friendliness and in order to avoid confusion in determining whether a container can be selected.

The container selection handle is represented by, e.g., a control point 1802 which is drawn to determine a selected container, and move and resize a container. A total of eight control points 1802 are displayed at four vertexes of a selected container and four midpoints on four edges.

In FIG. 19, the layout preview application 227 accepts from the user via the user interface 229 an instruction to adjust a selected container, and performs an adjustment process. In response to this, a container adjustment process in step S1905 is executed. Adjustment of a container includes movement, size adjustment, and a change of decoration attributes.

The container adjustment process in step S1905 will be described with reference to FIG. 23.

Figure 23:
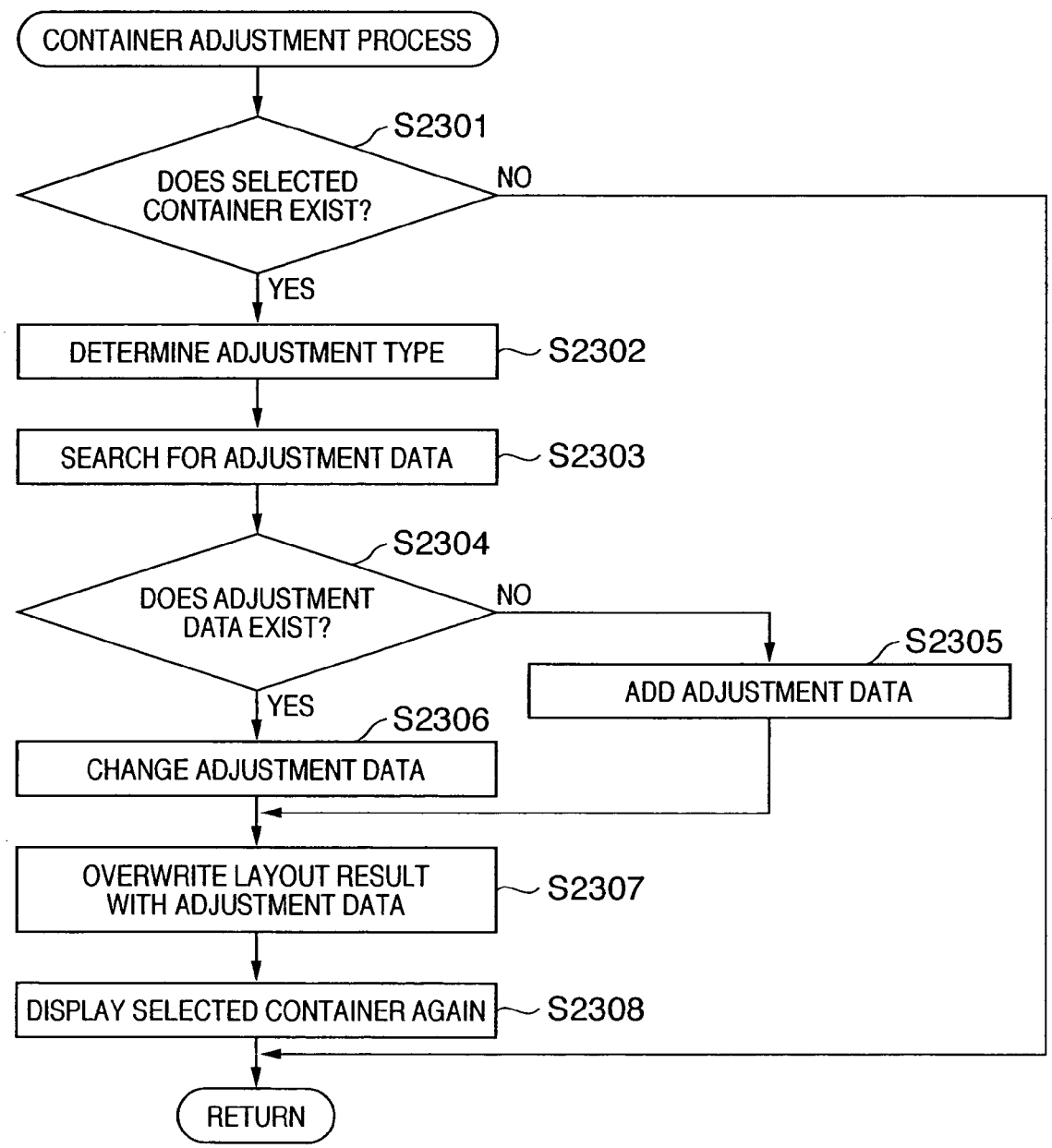
FIG. 23 is a flowchart showing details of a container adjustment process according to the first embodiment of the present invention.

FIG. 23 is a flowchart showing details of the container adjustment process according to the first embodiment of the present invention.

The layout preview application 227 determines whether a selected container exists, i.e., the number of selected containers in the selected-container table is not 0 (step S2301). If no selected container exists (NO in step S2301), the layout preview application 227 completes the process. If a selected container exists (YES in step S2301), the layout preview application 227 determines the type of adjustment (step S2302).

The layout preview application 227 determines whether the selected container has already undergone adjustment of a type designated by the user, i.e., searches for adjustment data (step S2303).

In this search, the layout preview application 227 searches a container adjustment table which manages the page number (record number) and container ID of the selected-container table, and adjustment data having the adjustment type determined in step S2303. The container adjustment table is stored in a work area which is ensured in the memory 136 and used by the layout preview application 227.

In the first embodiment, the document template is generated for one page, and one record corresponds to one page. Thus, adjustment data is held in correspondence with a page number, and this item corresponds to a record number.

An example of the container adjustment table will be explained with reference to FIG. 24.

Figure 24:
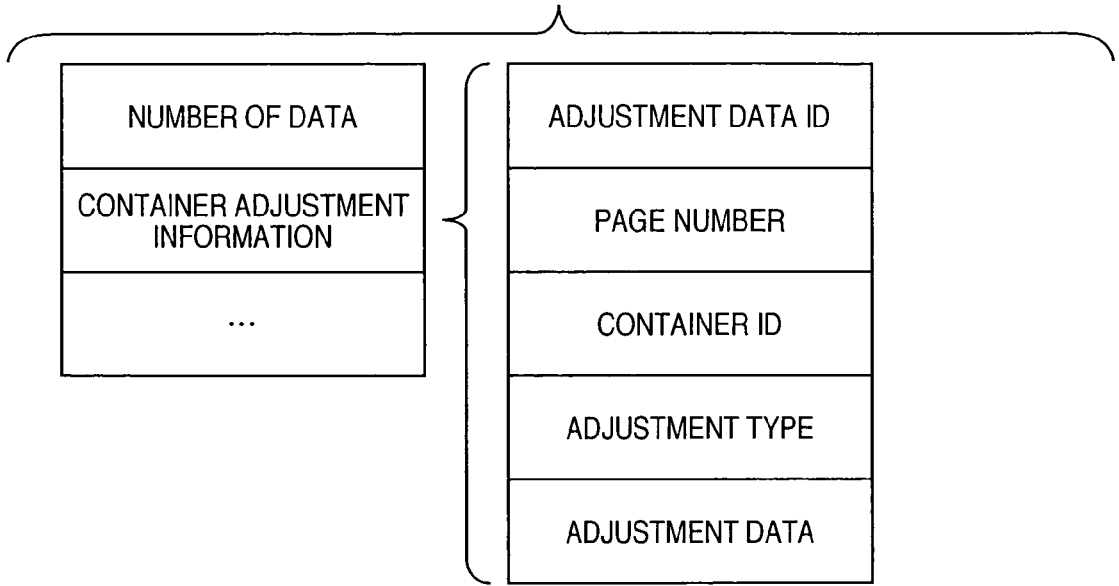
FIG. 24 is a view showing an example of a container adjustment table according to the first embodiment of the present invention.

FIG. 24 is a view showing an example of the container adjustment table according to the first embodiment of the present invention.

The container adjustment table manages an adjustment data ID for uniquely identifying adjustment data, a page number to which a container belongs, the container ID of the container, an adjustment type (e.g., position/size=1, character attribute=2, line attribute=3, surface attribute=4), container adjustment information formed from actual adjustment data, and the number of data representing the number of actual adjustment data managed by the container adjustment information.

In the example shown in FIG. 24, for adjustment of each decoration attribute, the adjustment data holds all the attribute values of the decoration attribute. For example, for adjustment of an adjustment ID "2", only the typeface name has been changed, but all character attributes such as the character size and character color are stored in practice. In order to save the storage area, attribute types may be more finely classified.

Referring back to the description of FIG. 23, the layout preview application 227 determines whether adjustment data of the adjustment type for the selected container exists in the container adjustment table (step S2304). If no adjustment data exists (NO in step S2304), the layout preview application 227 adds adjustment data (step S2305). If the adjustment data exists (YES in step S2304), the layout preview application 227 changes the selected container by overwriting it with the searched adjustment data (step S2306).

In step S2305, adjustment data may be added to the end of the container adjustment table, but is desirably so added as to sort adjustment data in an order of the page number (record number), container ID, and adjustment type. Since the adjustment type is also separately searched in step S2303, another adjustment data is created for the same container having a different adjustment type. In the example of FIG. 24, a container having a container ID "1" for a page number "1" undergoes two types of adjustment: a change of the position/size and a change of the character attribute.

After adjustment data is added and changed, the layout preview application 227 overwrites layout container data (layout result) with the adjustment data (step S2307). The layout preview application 227 displays again the adjusted layout container data containing the selected container which has been adjusted on the basis of the adjustment data (step S2308). Thereafter, the layout preview application 227 completes the process.

The layout container data is made up of a container position and size which are calculated in the layout calculation process of step S803, adjustment data for a corresponding container in the document template, and contents. The layout container data is enough to display and print a container.

After container adjustment is executed once or a plurality of number of times, the user instructs the layout preview application 227 via the user interface 229 to save the adjusted document (adjusted layout container data).

An example of the data format of the adjusted document will be explained with reference to FIG. 25.

FIG. 25 is a view showing an example of the data format of the adjusted document according to the first embodiment of the present invention.

The adjusted document contains, as adjustment page information (to be also referred to as adjustment record information), template information, content information, and container adjustment information. The template information holds a document template. The template information may hold not the entity of a document template but link information.

The content information holds contents to be merged with respective containers for all the containers of all pages. The content information can also hold not the entity of contents but link information to contents or information (e.g. file path information) for extracting contents from a database.

With the template information and content information, an original document before a container is adjusted can be generated. The container adjustment information holds the above-mentioned container adjustment table. With the container adjustment information, a document after an original document is adjusted can be generated.

If the user instructs the layout preview application 227 via the user interface 229 to save an adjusted document, the layout preview application 227 executes a document saving process in step S1906.

Details of the document saving process in step S1906 will be explained with reference to FIG. 26.

Figure 26:
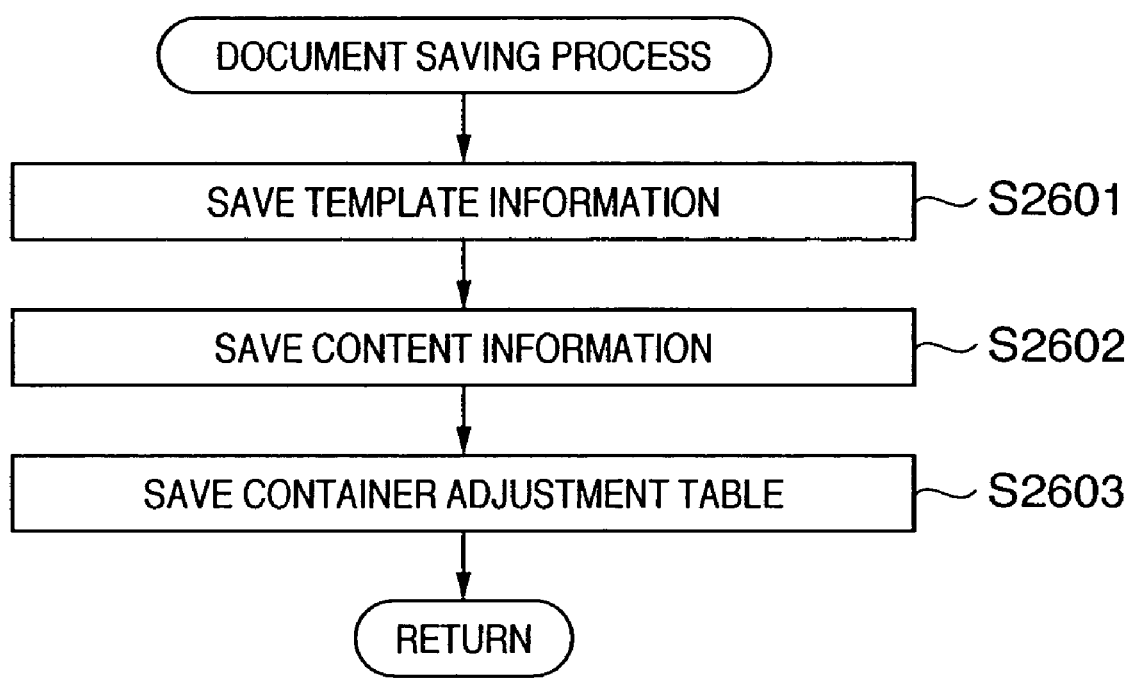
FIG. 26 is a flowchart showing details of a document saving process according to the first embodiment of the present invention.

FIG. 26 is a flowchart showing details of the document saving process according to the first embodiment of the present invention.

The layout preview application 227 first saves a document template (step S2601). Then, the layout preview application 227 saves data (content information) to be inserted into all the contents of all pages (step S2602). The layout preview application 227 also saves a container adjustment table (container adjustment information) (step S2603).

An adjusted document can be loaded later and previewed, subjected to container adjustment again, and printed. For example, if the user instructs the layout preview application 227 via the user interface 229 to load an adjusted document, the layout preview application 227 executes a document loading process in step S1907.

Details of the document loading process in step S1907 will be explained with reference to FIG. 27.

Figure 27:
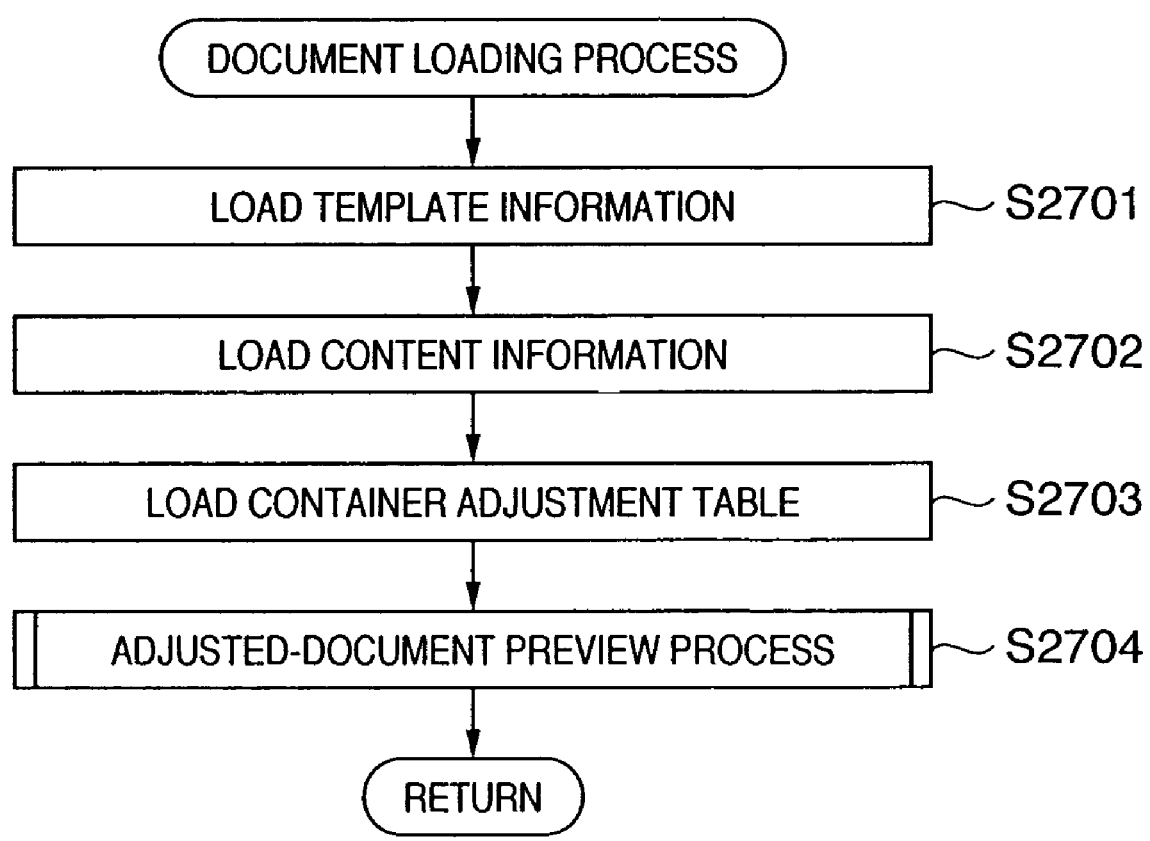
FIG. 27 is a flowchart showing details of a document loading process according to the first embodiment of the present invention.

FIG. 27 is a flowchart showing details of the document loading process according to the first embodiment of the present invention.

The layout preview application 227 first loads data (template information) of a document template (step S2701). Then, the layout preview application 227 loads data (content information) of all the contents of all pages (step S2702). The layout preview application 227 also loads a container adjustment table (container adjustment information) (step S2703). The layout preview application 227 performs a preview process for an adjusted document made up of various loaded data (step S2704).

Details of the adjusted-document preview process in step S2704 will be explained with reference to FIG. 28.

Figure 28:
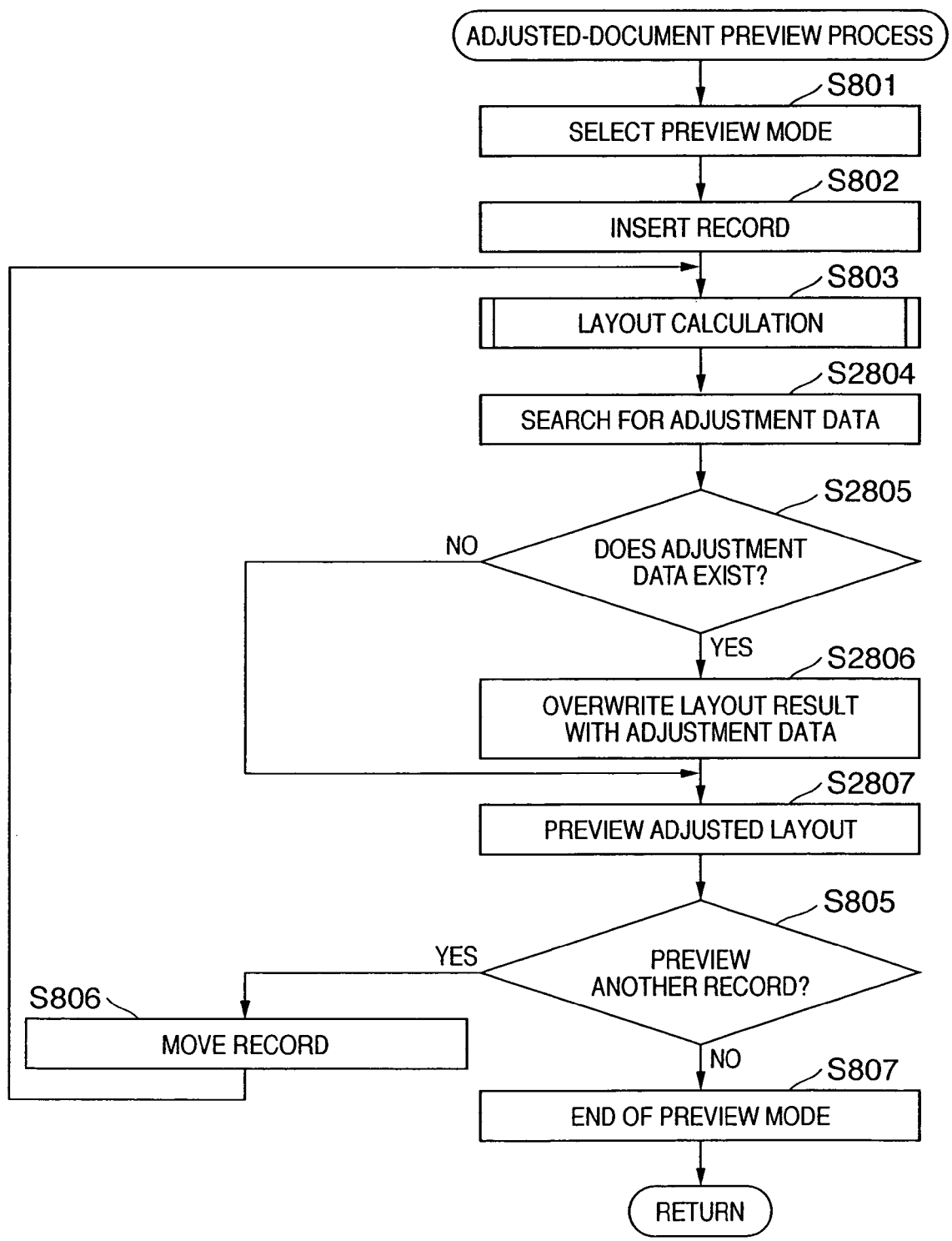
FIG. 28 is a flowchart showing details of an adjusted-document preview process according to the first embodiment of the present invention.

FIG. 28 is a flowchart showing details of the adjusted-document preview process according to the first embodiment of the present invention.

In FIG. 28, the same step numbers as in FIG. 20 denote the same steps, and a detailed description thereof will be omitted. Most of the adjusted-document preview process in FIG. 28 is the same as the preview process in FIG. 20. However, instead of directly previewing a layout result, the container adjustment table is searched for adjustment data of a target container after the process in step S803 (step S2804).

The layout preview application 227 determines the presence/absence of adjustment data on the basis of the search result (step S2805). If no adjustment data exists (NO in step S2805), the flow advances to step S2806. If adjustment data exists (YES in step S2805), the layout preview application 227 adjusts the layout result by overwriting layout container data of the layout result with the searched adjustment data (step S2806). The layout preview application 227 displays (previews) the adjusted layout result (step S2807).

The layout preview application 227 can also execute printing in addition to previewing. In printing, the layout preview application 227 calculates the layout sequentially for all records to be printed, similar to the adjusted-document preview process in step S2704. In this case, steps S805 and S810 are omitted, and the process ends when print data for all records (all designated records to be printed) are output.

If the user instructs the layout preview application 227 via the user interface 229 to end the application, the layout preview application 227 executes in step S1908 a series of application end processes of, e.g., clearing the work area of the memory used, and the process ends.

As described above, according to the first embodiment, the layout of a container and decoration attributes (e.g., the font size and ruled lines) can be adjusted. In addition, an adjustment result can be saved as a file, and a document can be adjusted again later, previewed, or printed using the file.

That is, the first embodiment enables modification of a layout and contents, which cannot be performed by a general user except an administrator because the contents of a database which stores a document template and contents must be changed. Since the layout (position, size, and the like) of a container can be freely adjusted, a layout which is impossible in the prior art can be implemented.

Since template information of a document template and associated original content information are held in addition to container adjustment information, an adjusted document can also be returned to an original state before adjustment. To effectively use the storage resource, the original content information can be deleted, as needed.

Second Embodiment

In the first embodiment, move/resize and a change of decoration attributes have been exemplified as container adjustment types. A configuration capable of changing contents such as a character string or image to be merged with (inserted into) a container can also be provided.

Details of the container adjustment process in step S1905 in the configuration capable of changing contents will be explained with reference to FIG. 29.

Figure 29:
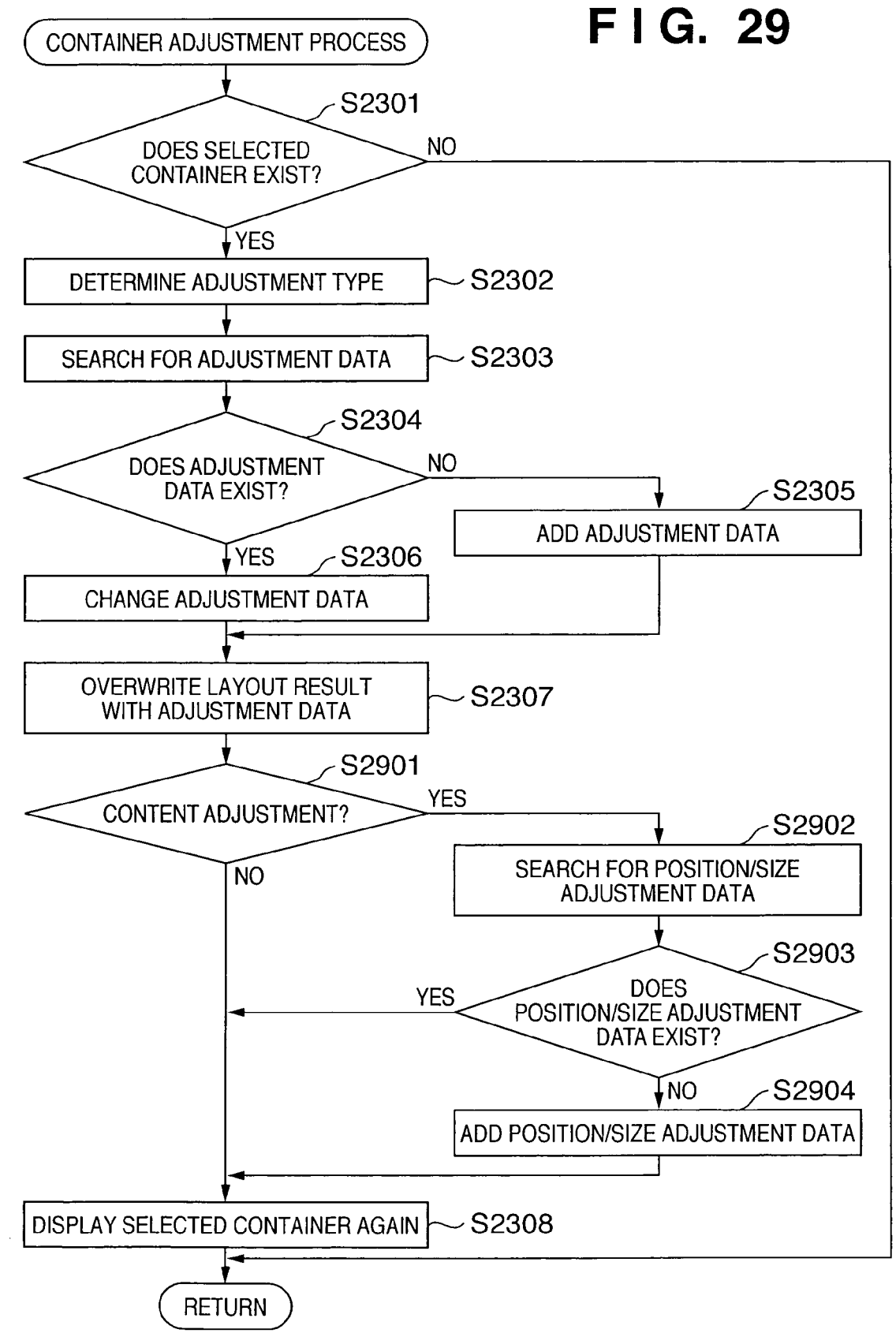
FIG. 29 is a flowchart showing details of a container adjustment process according to the second embodiment of the present invention.

FIG. 29 is a flowchart showing details of the container adjustment process according to the second embodiment of the present invention.

In the flowchart of FIG. 29, steps S2901 to S2904 are newly added to the flowchart of FIG. 23 according to the first embodiment.

If the user instructs a layout preview application 227 via a user interface 229 to adjust contents, adjustment data whose adjustment type is "contents" is added to or changed in a container adjustment table in step S2305 or S2306. As operation of designating the adjustment type of contents, for example, a container is clicked with a content editing tool to enter a content editing mode, and a character string is deleted/input.

If only contents are changed, the layout of a plurality of containers including other linked contents may also change. To keep the current container position/size unchanged, position/size adjustment data for maintaining a current container position/size is added, as needed.

The layout preview application 227 determines whether the adjustment type is content adjustment (step S2901). If the adjustment type is not content adjustment (NO in step S2901), the layout preview application 227 completes the process. If the adjustment type is content adjustment (YES in step S2901), the layout preview application 227 searches the container adjustment table for adjustment data (position/size adjustment data) whose adjustment type is "position/size" for a target container (step S2902).

The layout preview application 227 determines on the basis of the search result whether position/size adjustment data exists (step S2903). If no position/size adjustment data exists (NO in step S2903), the layout preview application 227 newly generates position/size adjustment data for adjusting the position/size of the current layout, and adds the position/size adjustment data to the container adjustment table. The layout preview application 227 further overwrites adjusted layout container data obtained in step S2307 with the position/size adjustment data (step S2904). After that, the process advances to step S2308.

If position/size adjustment data exists (YES in step S2903), the layout preview application 227 displays again adjusted layout container data containing a selected container which has been adjusted on the basis of the position/size adjustment data (step S2308).

In step S2602 of FIG. 26 which is related to details of the document saving process in step S1906, the layout preview application 227 searches the container adjustment table for adjustment data whose adjustment type is "contents". If adjustment data exists, it can also be so configured as not to save, in content information, contents before adjustment which are to be inserted into a corresponding container. This configuration can downsize an adjusted document.

As described above, according to the second embodiment, contents to be merged with (inserted into) a container can also be adjusted, in addition to the effects described in the first embodiment.

Third Embodiment

In the first and second embodiments, the layout editing application 121 and layout preview application 227 are implemented in a client in a client-server system. The configuration in the first or second embodiment may also be implemented by building an application server which incorporates these applications, and accessing the application server by a client.

In the third embodiment, e.g., a Web client-server system is constructed, a layout editing application 121 and layout preview application 227 are installed in the Web server, and the configuration of the first or second embodiment is implemented between the Web server and the Web client.

An outline of the configuration of the Web client-server system according to the third embodiment will be explained with reference to FIG. 30.

Figure 30:
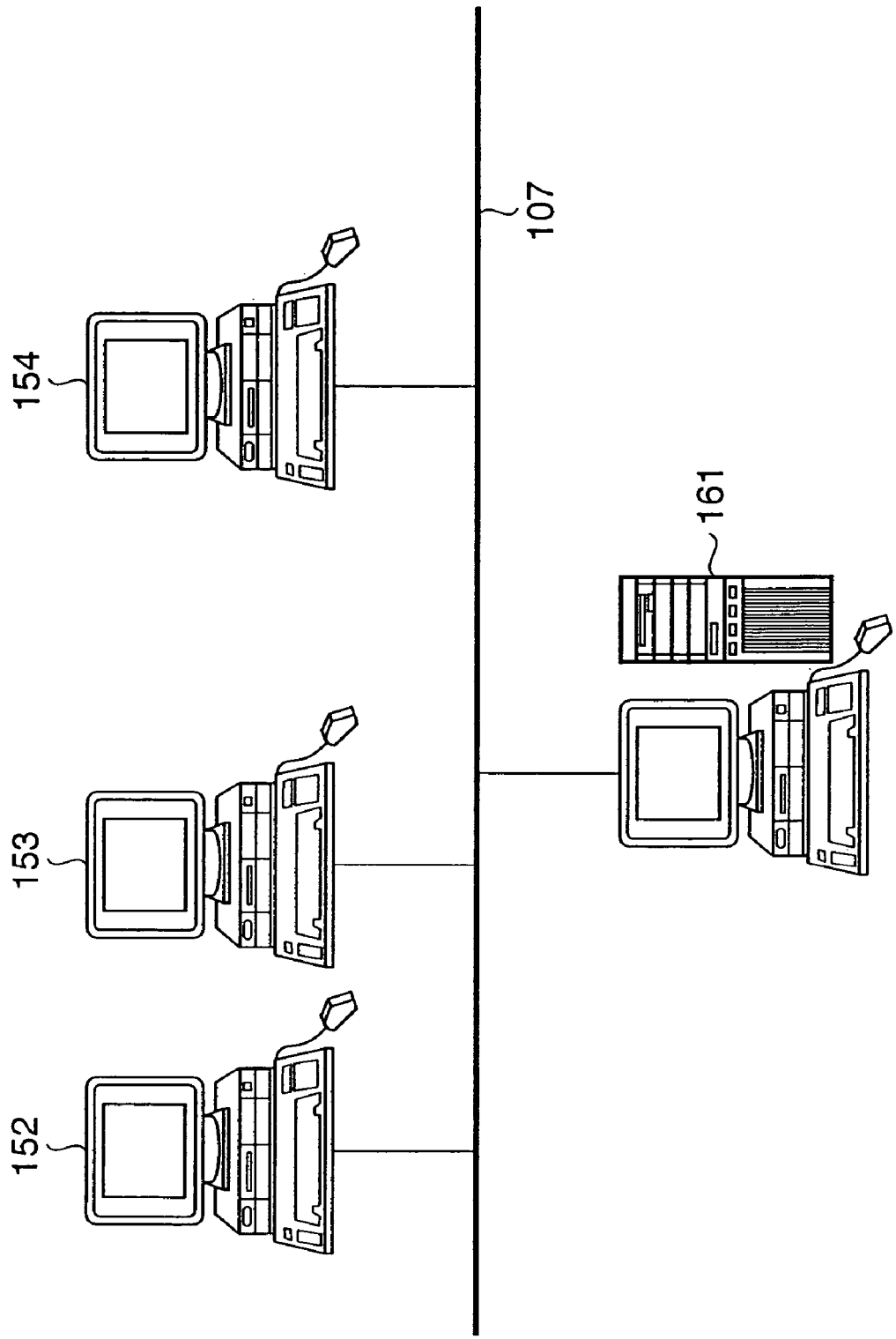
FIG. 30 is a view showing the configuration of a Web client-server system according to the third embodiment of the present invention.

FIG. 30 is a view showing the configuration of the Web client-server system according to the third embodiment of the present invention.

FIG. 30 illustrates a configuration which implements instructions/operations from Web clients 152 to 154 each having a Web browser to a Web server 161 in which the layout editing application 121 and layout preview application 227 are installed.

In FIG. 30, the client personal computers (to be referred to as "client PCs" hereinafter) 152 to 154, and the server personal computer (to be referred to as a "server PC" hereinafter) 161 are connected to a network 107. These computers have the same hardware configuration as that in FIG. 1B.

The server PC 161 has a Web server function, receives instructions from the client PCs 152 to 154 via the Web browser, and sends back process results to the Web browsers of the client PCs which have issued the instructions. Note that the present invention does not particularly limit a communication method between the server PC 161 and the client PCs 152 to 154. The single server PC 161 may implement the configuration of the first or second embodiment.

The functional configuration of the Web client-server system will be explained with reference to FIG. 31.

Figure 31:
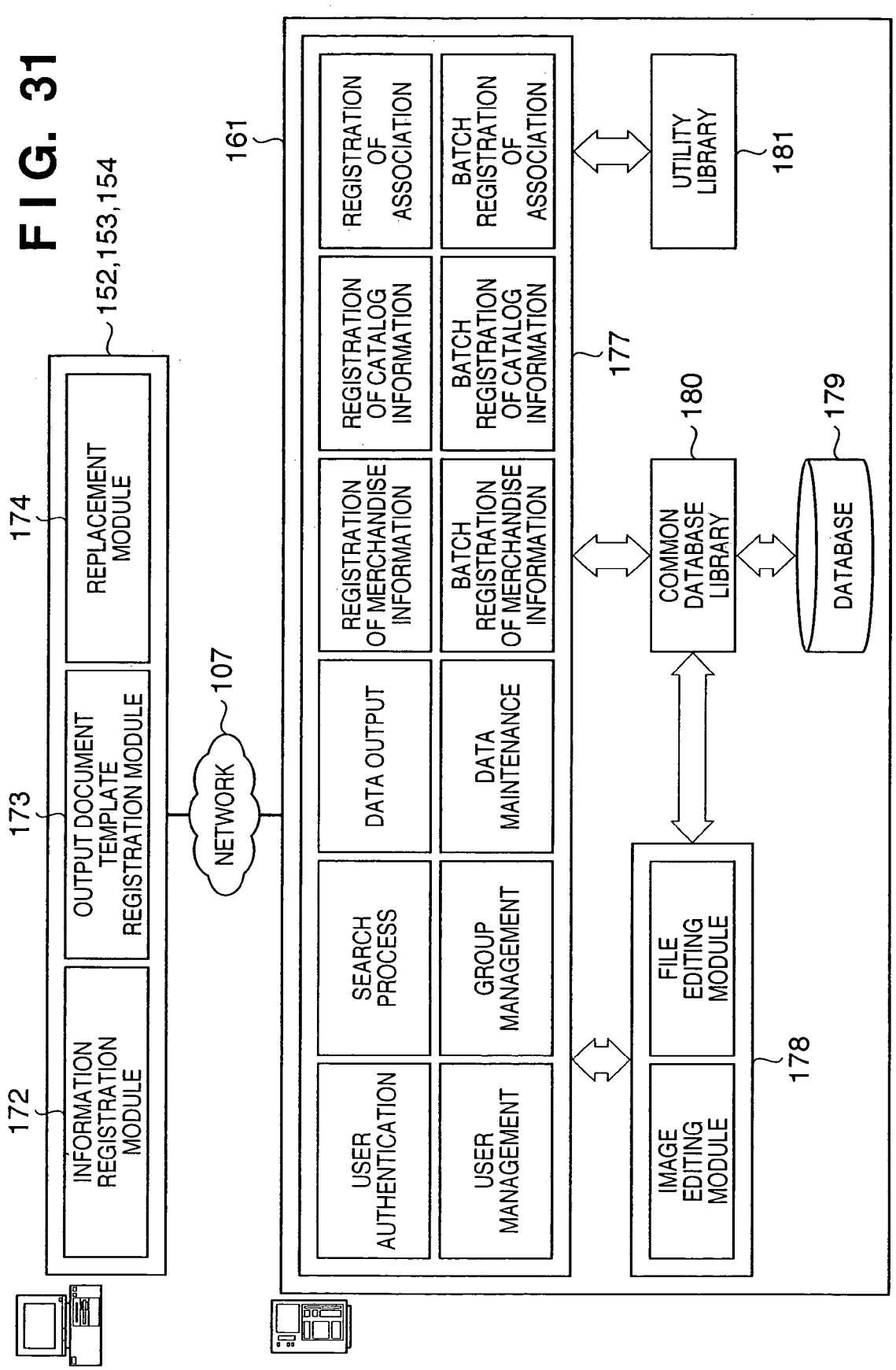
FIG. 31 is a block diagram showing the functional configuration of the Web client-server system according to the third embodiment of the present invention.

FIG. 31 is a block diagram showing the functional configuration of the Web client-server system according to the third embodiment of the present invention.

The client PC 152 has a Web browser function. In addition to this, the client PC 152 has an information registration module 172 for registering contents such as catalog information or image data in the server PC 161, an output document template registration module 173 for registering an output document template, and a replacement module 174.

These modules are automatically distributed as plug-ins of the Web browser from the server PC 161, as needed. Hence, the client PC 152 need not perform an installation process.

The server PC 161 has an HTTP Web application server function. The server PC 161 comprises a module set 177 including various modules for processing a request from the client PC 152.

The module set 177 includes a user authentication module, a search process module, a batch registration module for various data (merchandise information, catalog information, and association information), various maintenance modules, and a data output module based on a document template.

These modules are loaded into a memory in the server PC 161 in accordance with a request from the client PC 152, and the server PC 161 executes a process.

In addition to these modules, the server PC 161 comprises an editing module 178 which is comprised of an image editing module for editing an image such as a PDF file by using a layout engine, and a file editing module for performing editing such as merging and division for a data file. The editing module 178 is implemented by, e.g., the layout editing application 121 or layout preview application 227 in the first or second embodiment.

The server PC 161 further comprises a common database library 180 for exchanging data with a database 179 (corresponding to the database 119 in FIG. 1) in the server PC 161, and a utility library 181 which implements various functions for realizing a process to be executed in the third embodiment.

An example of the structures of a container and document template will be described with reference to FIG. 32 when describing a concrete example of the third embodiment.

Figure 32:
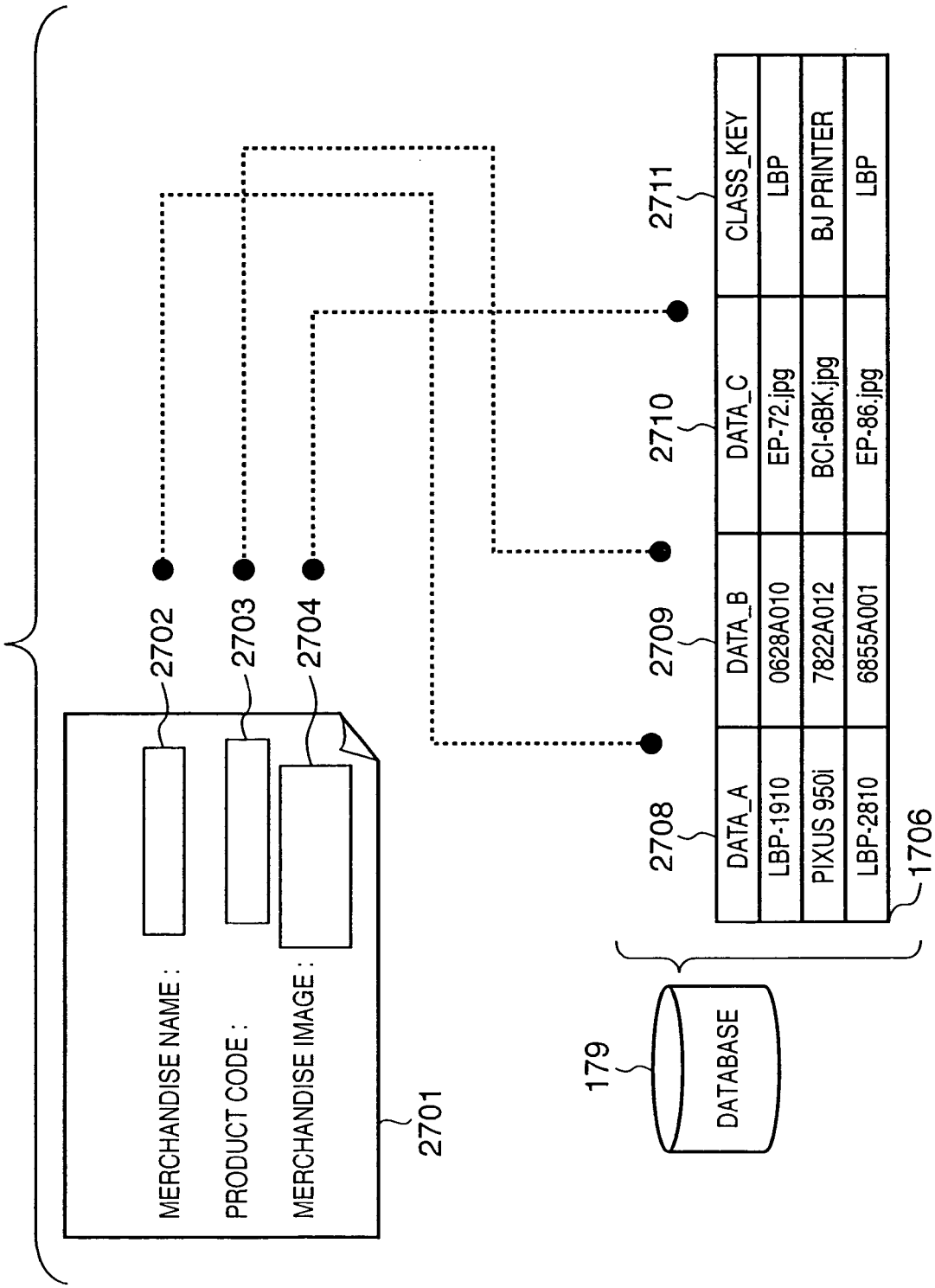
FIG. 32 is a view showing an example of the structures of a container and document template according to the third embodiment of the present invention.

FIG. 32 is a view showing an example of the structures of the container and document template according to the third embodiment of the present invention.

In FIG. 32, reference numeral 2701 denotes a document template having a plurality of containers. The document template 2701 has a container (field area) 2702 for inserting "merchandise name" data serving as content data, a container 2703 for inserting "product code" data serving as content data, and a container 2704 for inserting "merchandise image" data serving as content data.

The database 179 stores various data to be inserted into the containers 2702 to 2704. The database 179 manages a container management table made up of at least data fields 2708 to 2710 which store data corresponding to respective containers, and a classification key name management field 2711. The document template 2701 is also managed in the database 179.

A container management table 2706 manages data to be actually inserted into the containers 2702 to 2704. The container 2702 is associated with the data field key 2708 (DATA_A), the container 2703 is associated with the data field key 2709 (DATA_B), and the container 2704 is associated with the data field key 2710 (DATA_C).

[Previewing and Content Replacement]

An example of the window of the Web browser on the client PC 152 will be described with reference to FIG. 33.

Figure 33:
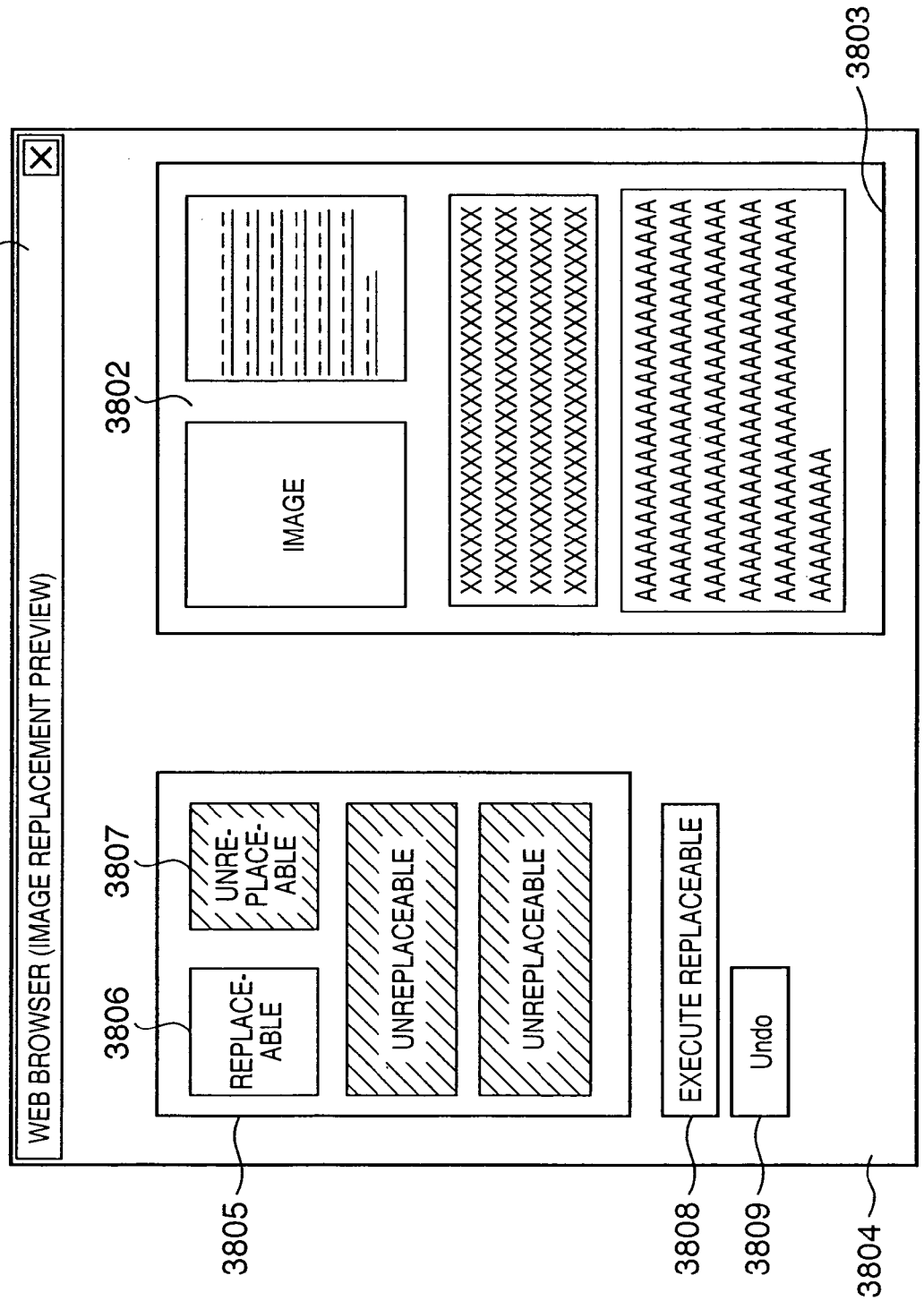
FIG. 33 is a view showing an example of the window of a Web browser on a client PC according to the third embodiment of the present invention.

FIG. 33 is a view showing an example of the window of the Web browser on the client PC according to the third embodiment of the present invention.

FIG. 33 illustrates a configuration which implements previewing of a document and replacement of contents (image) on the Web browser of the client PC 152 by using content data and a document template in the database 179 which is present in the server PC 161. Replacement of contents (image) corresponds to one of adjustment operations for contents in a container, which have been described in the second embodiment. In the third embodiment, the layout and decoration attributes of a container can also be changed.

In FIG. 33, reference numeral 3801 denotes a general Web browser which is a preview/content replacement window UI. Reference numeral 3802 denotes a layout result (laid-out document) which is created by a process in FIG. 34 (to be described later). Reference numeral 3803 denotes a frame for displaying the layout result 3802. Reference numeral 3804 denotes a frame for inputting a content (image) file to be replaced when contents are to be replaced in the layout result 3802 displayed in the frame 3803.

Reference numeral 3805 denotes a control area (content replacement area) for notifying the user by a rectangle (rectangular area corresponding to the layout and size of a container on the layout result 3802) whether each container on the document template (layout result 3802) allows replacing content data. Especially in the control area 3805, a control capable of inputting a content file to be replaced is presented for a replaceable container.

When a content file to be replaced is input, the display form (e.g., colored display or blinking display) of the outer frame of a rectangle representing a container is changed to notify the user that the content file has been input. The control area 3805 is provided using the plug-in function of the Web browser 3801. More specifically, an applet provided by Java® or ActiveX as a technique available from Microsoft is utilized.

Reference numeral 3806 denotes a rectangular area representing a replaceable container in the control area 3805. Reference numeral 3807 denotes a rectangular area representing an unreplaceable container in the control area 3805. In the third embodiment, the rectangular area 3807 is grayed out to notify the user that contents in the rectangular area 3807 cannot be replaced. The display form of the rectangular area 3807 is not limited to this, and any display form can be adopted as far as the user can visually recognize whether contents can or cannot be replaced.

Reference numeral 3808 denotes a replacement execution button. If the replacement execution button 3808 is clicked, a request (repreview request information) to, when a content file is input to a replaceable container in the control area 3805, replace a current content file with the input content file and create the layout result 3802 on the basis of the replacement is transmitted to the server PC 161. Reference numeral 3809 denotes an undo button for, when the replacement execution button 3808 is clicked to replace contents, transmitting a request to cancel (undo) the operation to the server PC 161.

A display process up to display of the window of FIG. 33 by the server PC 161 on the Web browser of the client PC 152 will be explained with reference to FIG. 34.

Figure 34:
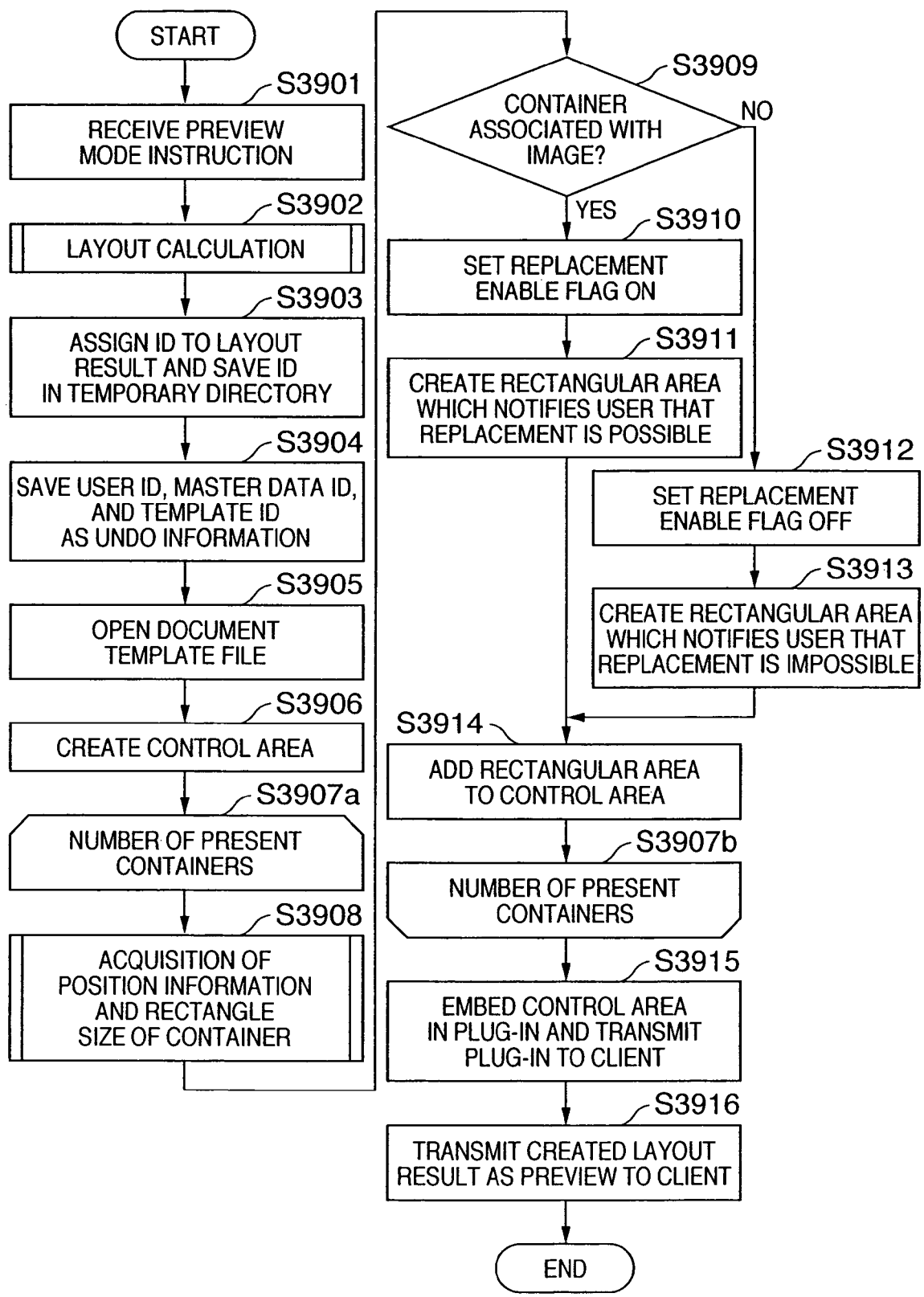
FIG. 34 is a flowchart showing a display process according to the third embodiment of the present invention.

FIG. 34 is a flowchart showing the display process according to the third embodiment of the present invention.

In FIG. 34, a method of selecting a document template for use and content data to be inserted is not specified. In the display process, the server PC 161 generates preview data (layout container data) of a layout result generated by a document template and a control (UI) used to replace contents, and transmits the preview data to, e.g., the Web browser of the client PC 152 to display the preview data.

The server PC 161 receives a preview mode instruction via the Web browser of the client PC 152 (step S3901). The server PC 161 calculates the layout of content data to be inserted by using a document template (step S3902). This process corresponds to step S803 in FIG. 8.

The server PC 161 assigns an identification number (ID) to the calculated layout result (laid-out document), and saves the ID in a temporary directory in a memory (step S3903). In case the process is canceled (undid) by the client PC 152, the server PC 161 saves, as undo information, a template ID for identifying the document template, a master ID for identifying the content data to be inserted, and the user identification number (user ID) of the client PC 152 (step S3904).

The server PC 161 then opens the document template file to be processed (step S3905). The server PC 161 newly creates the control area 3805 (FIG. 33) to be transmitted to the client PC 152 as a rectangular area which expresses the entire document template (step S3906).

The server PC 161 executes steps S3908 to S3914 as a (loop) process to be repeated by the number of containers present in the document template file. Steps S3907a and S3907b represent the start and end of the loop process.

In the loop process, the server PC 161 acquires container information containing the position (coordinate) information and rectangle size of a container to be processed in the document template file (step S3908). The server PC 161 determines whether the container to be processed is associated with image contents in the database (step S3909). If the container is associated with the image contents (YES in step S3909), the server PC 161 sets ON a replacement enable flag representing that contents can be replaced (step S3910). On the basis of the acquired container information, the server PC 161 creates a rectangular area for notifying the user that the image contents can be replaced (step S3911).

If the container is not associated with image contents (NO in step S3909), the server PC 161 sets the replacement enable flag OFF (step S3912). On the basis of the acquired container information, the server PC 161 creates a rectangular area for notifying the user that the image contents cannot be replaced (step S3913).

As described above, according to the third embodiment, a rectangular area is grayed out to notify the user that contents cannot be replaced. The set value of the replacement enable flag is stored in the memory of the server PC 161.

The server PC 161 adds the rectangular area created in step S3911 or S3913 to the control area created in step S3906 (step S3914). The server PC 161 embeds, in the plug-in of the Web browser of the client PC 152, the control area to which the rectangular area is added, and transmits the plug-in to the client PC 152 (step S3915). The server PC 161 transmits the layout result saved in step S3903 as a preview to the client PC 152 (step S3916).

A content replacement process when the client PC 152 requests the server PC 161 to replace a content image in a layout result (laid-out document) will be explained with reference to FIG. 35.

Figure 35:
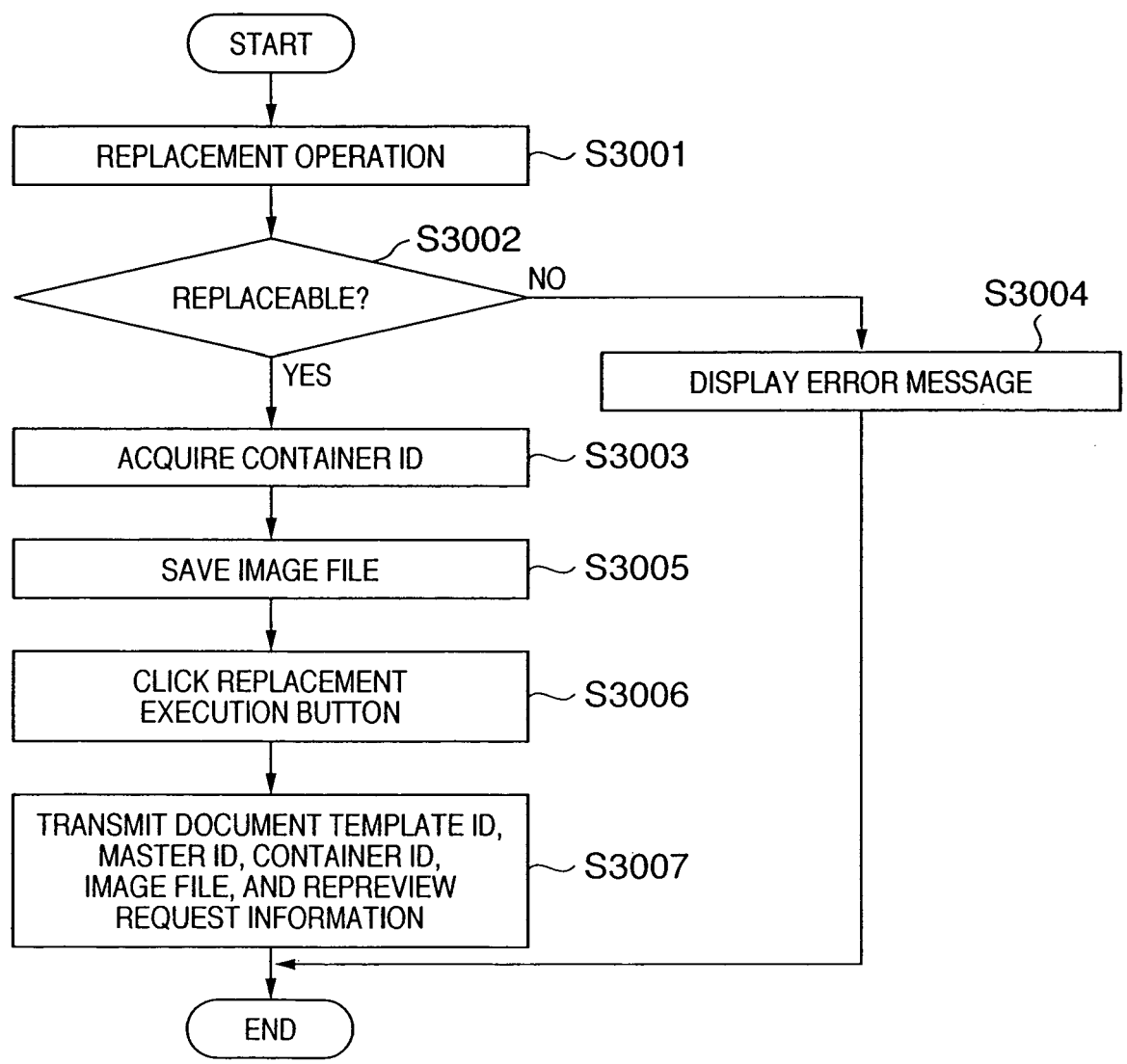
FIG. 35 is a flowchart showing a content replacement process according to the third embodiment of the present invention.

FIG. 35 is a flowchart showing the content replacement process according to the third embodiment of the present invention.

Replacement operation for a content image file is performed in the window of FIG. 33 (step S3001).

The third embodiment realizes replacement operation by dragging and dropping a content image file into a desired rectangular area in the control area 3805 of FIG. 33. However, replacement operation is not limited to this method, and may be realized by another control operation such as menu operation or button operation.

It is determined whether a rectangular area subjected to replacement operation is a replaceable container (step S3002). In the third embodiment, it is determined whether a rectangular area as the drop destination of the content image file is a replaceable container.

If the container cannot be replaced (NO in step S3002), an error message that the content image file cannot be replaced is displayed (step S3004).

If the container can be replaced (YES in step S3002), the identification number (container ID) of a container in a document template subjected to replacement is acquired from the position of the rectangular area (step S3003). Then, the content image to be replaced is saved (step S3005). Clicking of the replacement execution button 3808 in FIG. 33 is accepted (step S3006). The client PC 152 transmits, to the server PC 161, repreview request information containing a template ID for identifying the document template, a master ID for identifying the content image file to be replaced, a container ID, and the content image file to be replaced (step S3007).

A repreview process executed when the server PC 161 receives repreview request information from the client PC 152 will be explained with reference to FIG. 36.

Figure 36:
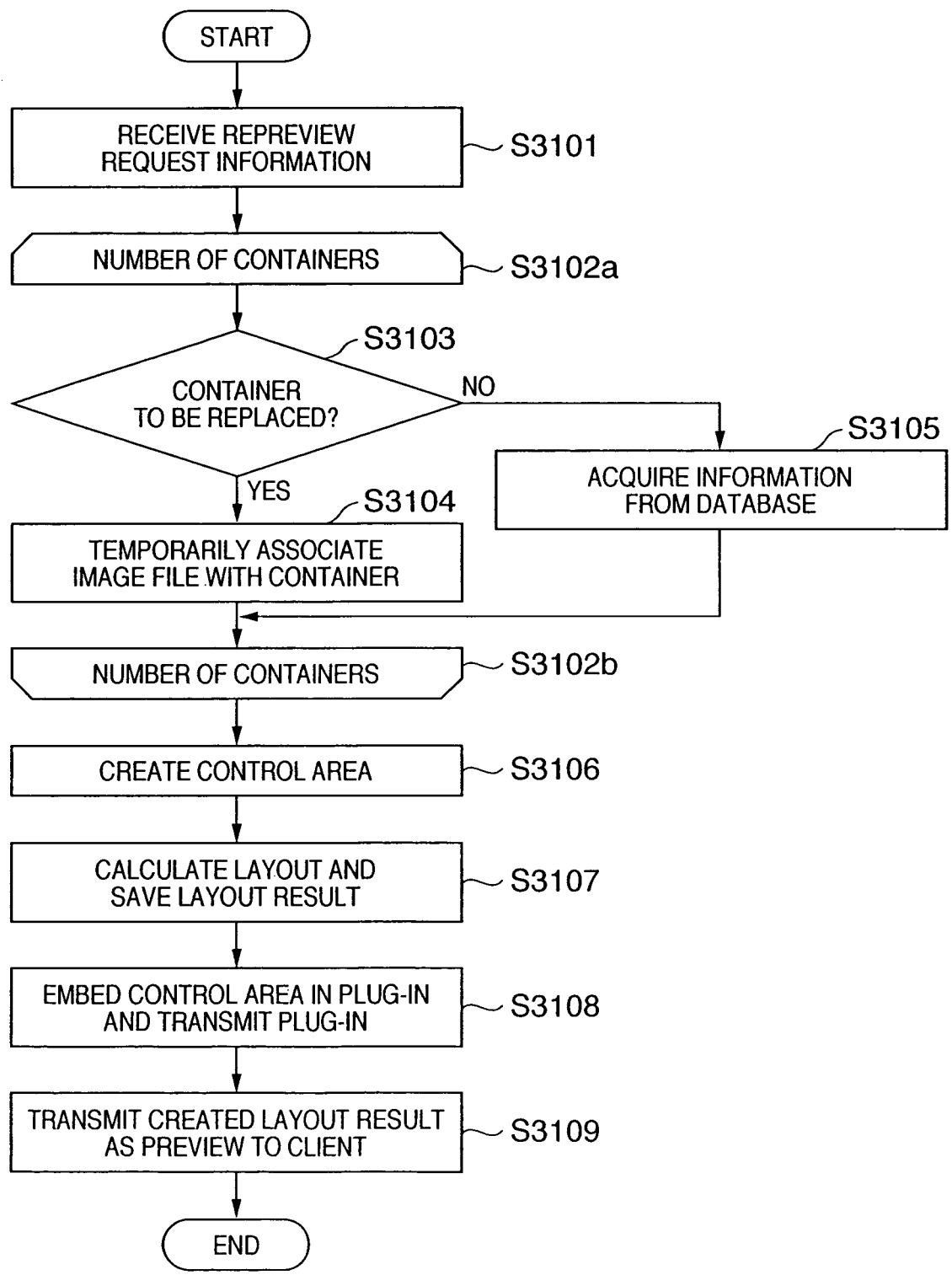
FIG. 36 is a flowchart showing a repreview process according to the third embodiment of the present invention.

FIG. 36 is a flowchart showing the repreview process according to the third embodiment of the present invention.

The server PC 161 receives repreview request information from the client PC 152 (step S3101). In the third embodiment, data communication between the server PC 161 and the client PC 152 is, e.g., HTTP communication.

The server PC 161 executes steps S3103 to S3105 as a (loop) process to be repeated by the number of containers present in the document template file. Steps S3102a and S3102b represent the start and end of the loop process.

In the loop process, the server PC 161 determines on the basis of a container ID in the repreview request information whether to replace a corresponding container (step S3103). If the container is to be replaced (YES in step S3103), the server PC 161 associates the container with a content image file in the repreview request information, and temporarily replaces the content image file (step S3104).

If the container is not to be replaced (NO in step S3103), the server PC 161 acquires information registered in the database (step S3105).

The server PC 161 creates a control area (step S3106). This process corresponds to the process in steps S3905 to S3914 in FIG. 34. The server PC 161 calculates a layout and saves the layout result by using the document template (step S3107). This process corresponds to the process in steps S3902 and S3903 in FIG. 34.

Accordingly, a layout result in which the content image file has been replaced with the content image file transmitted from the client PC 152 is created.

The server PC 161 embeds the created control area in the plug-in of the Web browser of the client PC 152, and transmits the plug-in to the client PC 152 (step S3108). This process corresponds to step S3915 in FIG. 34. The server PC 161 transmits the layout result saved in step S3107 as a preview to the client PC 152 (step S3109). This process corresponds to step S3916 in FIG. 34.

An undo process executed by the server PC 161 when the undo button 3809 is clicked on the client PC 152 will be explained with reference to FIG. 37.

Figure 37:
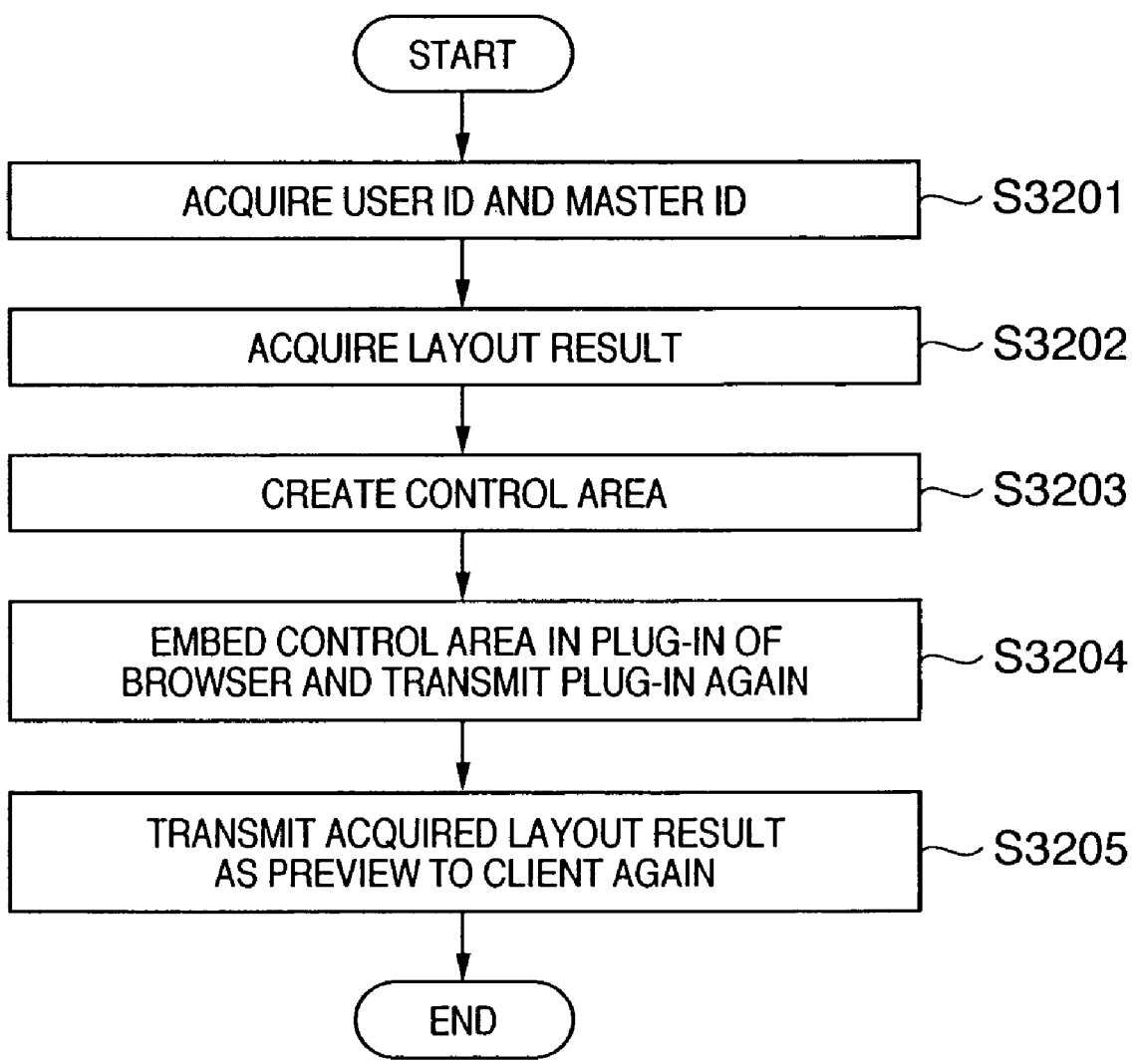
FIG. 37 is a flowchart showing an undo process according to the third embodiment of the present invention.

FIG. 37 is a flowchart showing the undo process according to the third embodiment of the present invention.

If the undo button 3809 is clicked on the client PC 152, the client PC 152 transmits undo request information to the server PC 161. The server PC 161 acquires a user ID and master ID corresponding to the undo request information transmitted from the client PC 152 (step S3201). Based on the acquired user ID and master ID, the server PC 161 acquires from a temporary directory a layout result which has already been created by the process in FIG. 34 (step S3202).

The server PC 161 creates a control area (step S3203). This process corresponds to the process in steps S3905 to S3914 in FIG. 34. The server PC 161 embeds the created control area in the plug-in of the Web browser of the client PC 152, and transmits the plug-in to the client PC 152 (step S3204). This process corresponds to step S3915 in FIG. 34. The server PC 161 transmits the layout result acquired in step S3202 as a preview to the client PC 152 (step S3205). This process corresponds to step S3916 in FIG. 34.

By the above process, replacement of a content image file by the client PC 152 can be undone (canceled).

As described above, according to the third embodiment, when a layout result based on a document template is output, the user can visually temporarily replace contents as an output result on the Web browser without asking the system administrator to modify and register (replace) contents. Since a dynamic layout process is done upon temporary replacement, the user can obtain an optimal layout output result.

In the third embodiment, contents are temporarily replaced. However, it is also possible that a client PC instructs a server PC to perform adjustment operation of a container and contents, and the server PC generates and manages adjustment data in accordance with the instruction, like the first and second embodiments.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-249017 filed on Aug. 27, 2004, the entire contents of which are hereby incorporated by reference herein.

What is claimed is:

1. An information processing apparatus having a CPU and a memory, comprising:
 a generating unit adapted to generate a template on which a plurality of field areas for inserting contents data included in a record are arranged;
 a displaying unit adapted to display an editing screen including a layout result decided on the basis of the contents data of a predetermined record selected from a plurality of records and the template generated by said generating unit;
a selection unit adapted to select a first field area to be adjusted from the plurality of field areas in which the contents data has been inserted on the editing screen;
an adjustment unit adapted to adjust at least one of a position and a size of the first field area selected by said selection unit such that the adjustment is reflected for the layout result of the predetermined record and is not reflected for a layout result of a record different from the predetermined record selected for display in the adjusted template;
a storing unit adapted to store, as adjustment record information for the predetermined record, adjustment information of the first field area adjusted by said adjustment unit, wherein the adjustment record information for the predetermined record is used only for the predetermined record when the predetermined record is later selected for preview;
a searching unit adapted to search the adjustment information of the predetermined record and the record different from the predetermined record for the first field area; and
a display control unit adapted (i) to display the layout result in which the contents data of the predetermined record is inserted in the first field area where at least one of the size and the position has been adjusted by said adjustment unit by overwriting a calculated layout result of the predetermined record, using the adjustment information of the predetermined record for the first field area located by said searching unit, when the predetermined record is selected for preview, and (ii) to display the layout result in which the contents data of the record different from the predetermined record is inserted in the first field area of the template generated by said generating unit without overwriting a calculated layout result of the record different from the predetermined record by said adjustment unit, when the record different from the predetermined record is selected from the plurality of records for preview and the adjustment information of the record different from the predetermined record for the first field area does not exist according to said searching unit.

2. The apparatus according to claim 1, wherein, when said adjustment unit replaces layout image data with new image data as an adjustment processing, said display control unit distinguishably displays between a field area which can layout the new image data and a field area which cannot layout the new image data.

3. A method of controlling an information processing apparatus, comprising:
a generating step of generating a template on which a plurality of field areas for inserting the contents data included in a record are arranged;
a displaying step of displaying an editing screen including a layout result decided on the basis of the contents data of a predetermined record selected from a plurality of records and the template generated in said generating step;
a selection step of selecting a first field area to be adjusted from the plurality of field areas in which the contents data has been inserted on the editing screen;
an adjustment step of adjusting at least one of a position and a size of the first field area selected in said selection step such that the adjustment is reflected for the layout result of the predetermined record and is not reflected for a layout result of a record different from the predetermined record selected for display in the adjusted template;

storing step of storing, as adjustment record information for the predetermined record, adjustment information of the first field area adjusted in said adjustment step, wherein the adjustment record information for the predetermined record is used only for the predetermined record when the predetermined record is later selected for preview;
searching step of searching the adjustment information of the predetermined record and the record different from the predetermined record for the first field area; and
a display control step of (i) displaying the layout result in which the content data of the predetermined record is inserted in the first field area where at least one of the size and the position has been adjusted in said adjustment step by overwriting a calculated layout result of the predetermined record, using the adjustment information of the predetermined record for the first field area located in said searching step, when the predetermined record is selected for preview and (ii) displaying the layout result in which the contents data of the record different from the predetermined record is inserted in the first area of the template generated in said generating step without overwriting a calculated layout result of the record different from the predetermined record, when the record different from the predetermined record is selected from the plurality of records for preview and the adjustment information of the record different from the predetermined record for the first field area does not exist according to said searching step.

4. The method according to claim 3, wherein, when said adjustment step replaces layout image data with new image data as an adjustment processing, said display control step distinguishably displays between a field area which can layout the new image data and a field area which cannot layout the new image data.

5. A non-transitory computer-readable medium comprising:
a program code for a generating step of generating a template on which a plurality of field areas for inserting contents data included in a record are arranged;
a program code for a displaying step of displaying an editing screen including a layout result decided on the basis of the contents data of a predetermined record selected from a plurality of records and the template generated in said generating step;
a program code for a selection step of selecting a first field area to be adjusted from the plurality of field areas in which the contents data has been inserted on the editing screen;
a program code for an adjustment step of adjusting at least one of a position and size of the first field area selected in said selection step such that the adjustment is reflected for the layout result of the predetermined record and is not reflected for a layout result of a record different from the predetermined record selected for display in the adjusted template;
a program code for a storing step of storing, as adjustment record information for the predetermined record, adjustment information of the first field area adjusted in said adjustment step, wherein the adjustment record information for the predetermined record is used only for the predetermined record when the predetermined record is later selected for preview;
a program code for a searching step of searching the adjustment information of the predetermined record and the record different from the predetermined record for the first field area; and
a program code for a display control step of (i) displaying the layout result in which the contents data of the predetermined record is inserted in the first field area where at least one of the size and the position has been adjusted in said adjustment step by overwriting a calculated layout result of the predetermined record, using the adjustment information of the predetermined record for the first field area located in said searching step, when the predetermined record is selected for preview, and (ii) displaying the layout result in which the contents data of the record different from the predetermined record is inserted in the first field area of the template generated in said generating step without overwriting a calculated layout result of the record different from the predetermined record, when the record different from the predetermined record is selected from the plurality of records for preview and the adjustment information of the record different from the predetermined record for the first field area does not exist according to said searching step.

6. The computer-readable recording medium product according to claim 5, wherein, when said adjustment step replaces layout image data with new image data as an adjustment processing, said display control step distinguishably displays between a field area which can layout the new image data and a field area which cannot layout the new image data.

* * * * *